United States Patent
Panga et al.

(10) Patent No.: US 10,954,432 B2
(45) Date of Patent: Mar. 23, 2021

(54) ON THE FLY MIXING OF ACIDS AND DIVERSION FLUIDS WITH WATER-SOLUBLE RETARDING AGENTS

(71) Applicant: SCHLUMBERGER TECHNOLOGY CORPORATION, Sugar Land, TX (US)

(72) Inventors: Mohan Kanaka Raju Panga, Sugar Land, TX (US); Christopher Daeffler, Houston, TX (US); Andrey Yakovlev, Primorsk (RU)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 15/757,379

(22) PCT Filed: Aug. 31, 2016

(86) PCT No.: PCT/US2016/049538
§ 371 (c)(1),
(2) Date: Mar. 5, 2018

(87) PCT Pub. No.: WO2017/040553
PCT Pub. Date: Mar. 9, 2017

(65) Prior Publication Data
US 2018/0244981 A1 Aug. 30, 2018

Related U.S. Application Data

(60) Provisional application No. 62/214,055, filed on Sep. 3, 2015.

(51) Int. Cl.
*E21B 43/26* (2006.01)
*C09K 8/74* (2006.01)
(Continued)

(52) U.S. Cl.
CPC ............... *C09K 8/74* (2013.01); *C09K 8/602* (2013.01); *E21B 37/06* (2013.01); *E21B 41/02* (2013.01);
(Continued)

(58) Field of Classification Search
CPC ...... C09K 8/74; C09K 8/602; C09K 2208/08; C09K 2208/30; E21B 37/06; E21B 41/02; E21B 43/25; E21B 43/26
(Continued)

(56) References Cited

U.S. PATENT DOCUMENTS

| 3,681,240 A | 8/1972 | Fast et al. |
| 4,466,893 A * | 8/1984 | Dill ..................... C09K 8/74 |
| | | 166/307 |

(Continued)

FOREIGN PATENT DOCUMENTS

| RU | 2247833 C1 | 3/2005 |
| WO | 0019062 A | 4/2000 |

(Continued)

OTHER PUBLICATIONS

Scherubel, G. A; Crowe, C. W "Foamed Acid, a New Concept in Fracture Acidizing" paper SPE 7568, presented at the Annual Fall Technical Conference and Exhibition, Houston, TX, USA, Oct. 1978, 8 pages.
(Continued)

*Primary Examiner* — Silvana C Runyan
(74) *Attorney, Agent, or Firm* — Cameron Sneddon

(57) ABSTRACT

Described herein are methods for on the fly mixing of retarded acidizing fluids containing acid, a water-soluble acid retarding agent (RA), and optionally a viscoelastic surfactant (VES), and for on the fly mixing of diversion fluids containing VES and RA in the same equipment. Also
(Continued)

described are methods of controlling the preparation of such fluids based on feedback composition analyses.

16 Claims, 41 Drawing Sheets

(51) Int. Cl.
*E21B 43/25* (2006.01)
*C09K 8/60* (2006.01)
*E21B 37/06* (2006.01)
*E21B 41/02* (2006.01)

(52) U.S. Cl.
CPC .............. *E21B 43/25* (2013.01); *E21B 43/26* (2013.01); *C09K 2208/08* (2013.01); *C09K 2208/30* (2013.01)

(58) Field of Classification Search
USPC ........................................................ 166/307
See application file for complete search history.

(56) References Cited

U.S. PATENT DOCUMENTS

| | | | |
|---|---|---|---|
| 4,703,797 A | 11/1987 | Djabbarah | |
| 4,730,676 A | 3/1988 | Luers et al. | |
| 4,807,703 A * | 2/1989 | Jennings, Jr. .......... | C09K 8/685 166/307 |
| 5,310,002 A | 5/1994 | Blauch et al. | |
| 5,773,024 A | 6/1998 | Unger et al. | |
| 7,148,184 B2 | 12/2006 | Francini et al. | |
| 7,237,608 B2 | 7/2007 | Fu et al. | |
| 7,350,572 B2 | 4/2008 | Fredd et al. | |
| 7,603,261 B2 | 10/2009 | Tardy | |
| 7,615,516 B2 | 11/2009 | Yang et al. | |
| 7,635,028 B2 | 12/2009 | Li et al. | |
| 7,696,393 B2 | 4/2010 | Rivers et al. | |
| 7,774,183 B2 | 8/2010 | Tardy et al. | |
| 9,034,806 B2 | 5/2015 | Gurmen et al. | |
| 9,085,975 B2 | 7/2015 | Abad | |
| 2002/0023752 A1* | 2/2002 | Qu ........................... | C09K 8/68 166/308.1 |
| 2002/0147114 A1 | 10/2002 | Dobson, Sr. et al. | |
| 2005/0124500 A1 | 6/2005 | Chen et al. | |
| 2006/0042797 A1* | 3/2006 | Fredd ....................... | C09K 8/72 166/282 |
| 2007/0293404 A1 | 12/2007 | Hutchins et al. | |
| 2008/0139412 A1* | 6/2008 | Fuller ....................... | C09K 8/72 507/219 |
| 2008/0200353 A1 | 8/2008 | Dahayanake et al. | |
| 2010/0022418 A1 | 1/2010 | Milne et al. | |
| 2010/0224365 A1* | 9/2010 | Abad ....................... | E21B 43/26 166/275 |
| 2010/0243242 A1 | 9/2010 | Boney et al. | |
| 2010/0248996 A1 | 9/2010 | Sawdon | |
| 2010/0331223 A1 | 12/2010 | Li et al. | |
| 2013/0327531 A1 | 12/2013 | Dahayanake et al. | |
| 2014/0174742 A1* | 6/2014 | Mirakyan ................. | C09K 8/12 166/300 |
| 2014/0256604 A1 | 9/2014 | Wadekar et al. | |
| 2014/0367100 A1 | 12/2014 | Oliveira et al. | |
| 2015/0034315 A1* | 2/2015 | Jiang ........................ | C09K 8/68 166/280.2 |
| 2015/0200147 A1 | 7/2015 | Lien et al. | |
| 2015/0240147 A1* | 8/2015 | Jiang ........................ | C09K 8/68 166/308.3 |
| 2016/0298024 A1 | 10/2016 | Panga et al. | |

FOREIGN PATENT DOCUMENTS

| | | |
|---|---|---|
| WO | 2000019062 A1 | 4/2000 |
| WO | 2004005672 A1 | 1/2004 |
| WO | 2011148282 A1 | 12/2011 |
| WO | 2015020688 A1 | 2/2015 |
| WO | 2017040434 A1 | 3/2017 |

OTHER PUBLICATIONS

Chemicalland21, "Lauryl alcohol ethoxlates", http://www.chamicalland21.com/specialtychem/perchem/lauryl%20alcohol%20ethoxylate.htm, Jan. 17, 2015, 5 pages.

Bonn, M.; Bakker, H. J.; Rago, G.; Pouzy, F.; Siekierzycka, J. R.; Brouwer, A. M.; Bonn, D. "Suppression of Proton Mobility by Hydrophobic Hydration" J. Am. Chem. Soc. 2009, 131, pp. 17070-17071.

Xu, J.; Yamashita, T.; Agmon, N.; Voth, G. A. "On the Origin of Proton Mobility Suppression in Aqueous Solutions in Amphiphiles", J. Phys. Chem. B. 2013, 117, pp. 15426-15435.

Crowe, C.W.; McGowan, G. R.; Baranet, S. E. "Investigation of Retarded Acids Provides Better Understanding of Their Effectiveness and Potential Benefits", SPE 18222, SPE Production Engineering, May 1990, pp. 166-170.

Lungwitz, B.; Fredd, C.; Brady, M.; Miller, M.; Ali, S.; Hughes, K. "Diversion and Cleanup Studies of Viscoelastic Surfactant-Based Self-Diverting Acid", SPE 86504, SPE International Symposium and Exhibition on Formation Damage Control, Feb. 18-20, 2004, 10 pages.

Al-Ghamdi, A. H.; Mahmoud, M. A.; Wang, G.; Hill, A. D.; Nasr-El-Din, H. A. "Acid Diversion by Use of Viscoelastic Surfactants: The Effects of Flow Rate and Initial Permeability Contrast", SPE 142564, SPE Journal, Dec. 2014, pp. 1203-1216.

Mou, J.; Liu, M.; Zheng, K.; Zhang, S. "Diversion Conditions for Viscoelastic-Surfactant-Based Self-Diversion Acid in Carbonate Acidizing", SPE 173898, SPE Production & Operations, May 2015, pp. 121-129.

P. M. J Tardy, B. Lecert, Y. Christanti "An Experimentally Validated Wormhole Model for Self-Diverting and Conventional Acids in Carbonate Rocks Under Radial Flow Conditions" paper SPE 107854, presented at the European Formation Damage Conference held in Scheveningen, The Netherlands, May 30-Jun. 1, 2007, 17 pages.

International Search Report and Written Opinion issued in International Patent Application No. PCT/US2016/049538 dated Nov. 10, 2016; 10 pages.

Eurasian Office Action issued in Eurasian Patent Application No. 201890637 dated Mar. 27, 2019; 12 pages (with English Translation).

Examination Report issued in the related GC Application GC/2016/31966 dated Nov. 26, 2018 (4 pages).

Examination Report issued in the related GC Application GC/2016/31967 dated Nov. 20, 2018 (4 pages).

Eurasian Office Action issued in Eurasian Patent Application No. 201890638 dated Oct. 2, 2018; 6 pages (with English Translation).

* cited by examiner

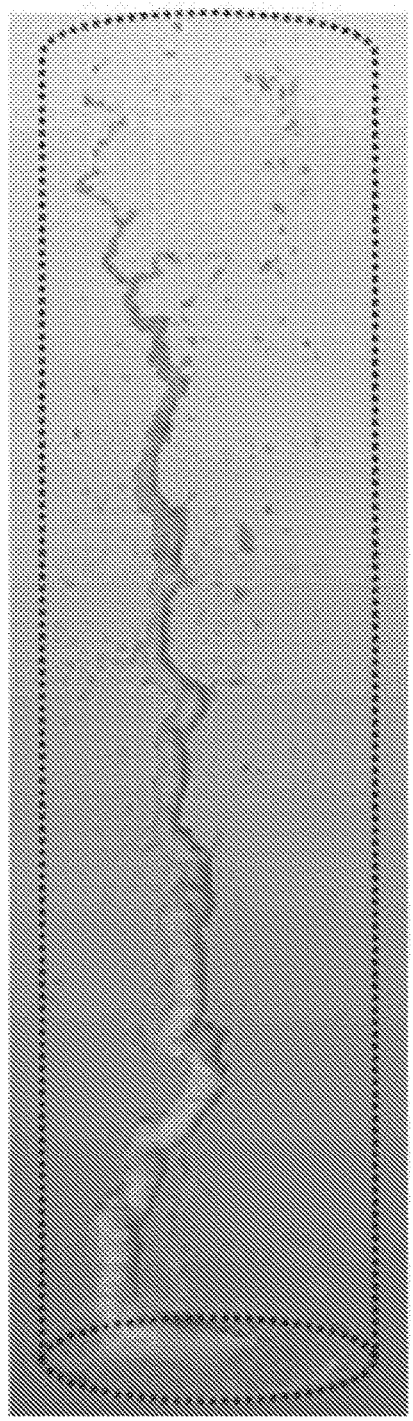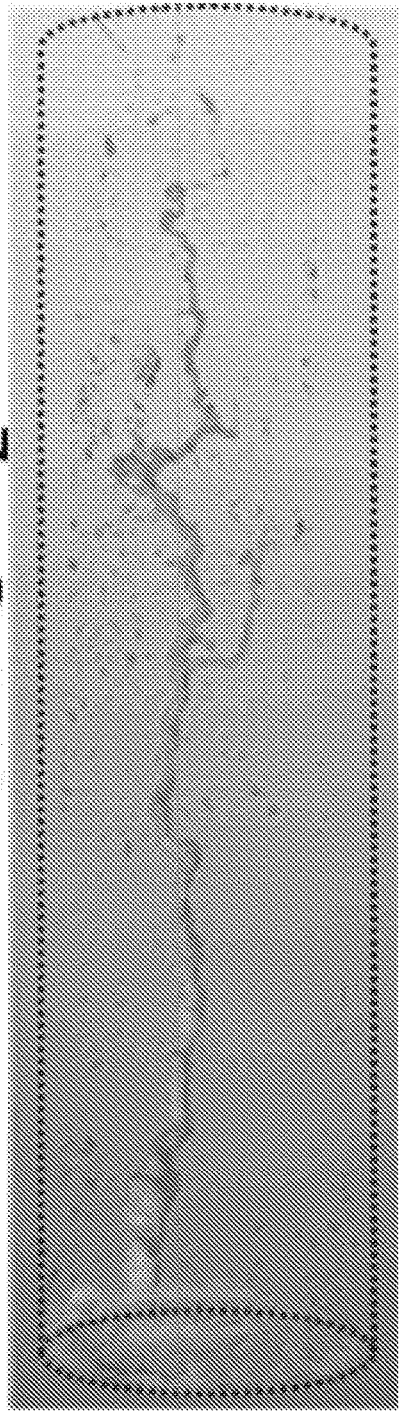
FIG. 9

100 md/50 md; 0.5 bbl/min injection rate 100 md/50 md; 5 bbl/min injection rate

ON THE FLY MIXING OF ACIDS AND DIVERSION FLUIDS WITH WATER-SOLUBLE RETARDING AGENTS

RELATED APPLICATION INFORMATION

This application claims the benefit of U.S. Provisional Application Ser. No. 62/214,055 filed Sep. 3, 2015, which is incorporated herein in its entirety.

FIELD

The disclosure relates to on the fly mixing of acids and diversion fluids containing water-soluble acid retarding agents.

BACKGROUND

This section provides background information to facilitate a better understanding of the various aspects of the disclosure. It should be understood that the statements in this section of this document are to be read in this light, and not as admissions of prior art.

The maintenance and stimulation of oil and gas wells with specially designed fluids is critical to the efficient extraction of these resources. Well treatment fluids have many roles: hydraulic fracturing, gravel packing, water flooding and acidizing. Acid treatment is considered the oldest well stimulation technology, having first been applied in 1895. When injected at low rates into carbonate formations, hydrochloric acid (HCl) can form conductive wormholes that extend radially from the well bore. Acids can also be injected into subterranean formations at rates high enough to cause fracturing. In this case, the acid unevenly dissolves the walls of the fracture, so that when the injection is stopped and the fracture closes, conductive channels extending the length of the fracture remain.

HCl is very reactive, and at higher temperatures (>200° F.) and/or low injection rates favor facial dissolution over wormholing in matrix treatments. For this reason, less reactive acid formulations were pursued. One approach is to use organic acids such as formic and acetic acid. Organic acids have higher pKa's than HCl, and will not completely spend in the reservoir. A second approach is to suspend the acid as a water-in-oil emulsion, which restricts aqueous acid contact with the reservoir and thus slows the reaction rate.

During an acid treatment, the highest permeability parts of the formation will accept the largest volumes of acid, thus increasing the permeability of these high permeability zones even further. Continued treatment of these same zones does little to stimulate production in other parts of the reservoir. To redirect acid flow to less permeable parts of the reservoir, diversion fluids are often pumped between acid stages. The diversion fluids are designed to enter the most permeable sections of the formation and create a temporary plug. The following acid stage will be sent to another part of the formation, and these stages can iterate to achieve optimal fluid placement.

A variety of materials can serve as diversion agents. Simple compounds such as benzoic acid flakes are used to plug the formation very close to the wellbore, and then dissolve into the natural hydrocarbons as the well is put into production. Oil-soluble resins also work in this manner. Other fluids, often containing polymer or surfactants, are designed to viscosify in the formation, setting a thick plug that will break after the treatment is complete.

In recent work, we have developed a method whereby HCl reactivity is attenuated by certain water soluble compounds to create single-phase retarded acid systems. We have also extended the water-soluble retarding agents to diversion technologies. The fully aqueous systems enable on-the-fly mixing of the stimulation fluid components, which in turn allows for real-time tunable systems and more efficient wellsite operations. We will describe a system herein where acid and/or diversion fluid could be mixed with a water-soluble retarding agent immediately before entering the wellbore during a stimulation treatment.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In a first aspect of the disclosure, methods are provided including a) mixing, at a wellsite, acid from an acid source with water from a water source and water-soluble acid retarding agent (RA) from a RA source to form a retarded acidizing fluid; and b) introducing the retarded acidizing fluid to a subterranean formation through a wellbore in fluid communication with the subterranean formation. A viscoelastic surfactant (VES) from a VES source can also be mixed with the acid, the water and the RA in step a) to form the retarded acidizing fluid.

In another aspect of the disclosure, systems are provided including a subterranean formation having a wellbore in fluid communication with the subterranean formation; a treatment fluid line connected in fluid flow communication with the wellbore; an acid source connected in fluid flow communication with the treatment fluid line; a water source connected in fluid flow communication with the treatment fluid line; and a water-soluble acid retarding agent source (RA source) connected in fluid flow communication with the treatment fluid line. The system can also include a viscoelastic surfactant source (VES source) connected in fluid flow communication with the treatment fluid line.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and:

FIG. 9 depicts wormhole patterns in the limestone cores after the treatment with VDA's containing viscoelastic surfactant and HCl with and without $MgCl_2$, and at the same flow rate 0.2 ml/min

DETAILED DESCRIPTION

Figure 1:
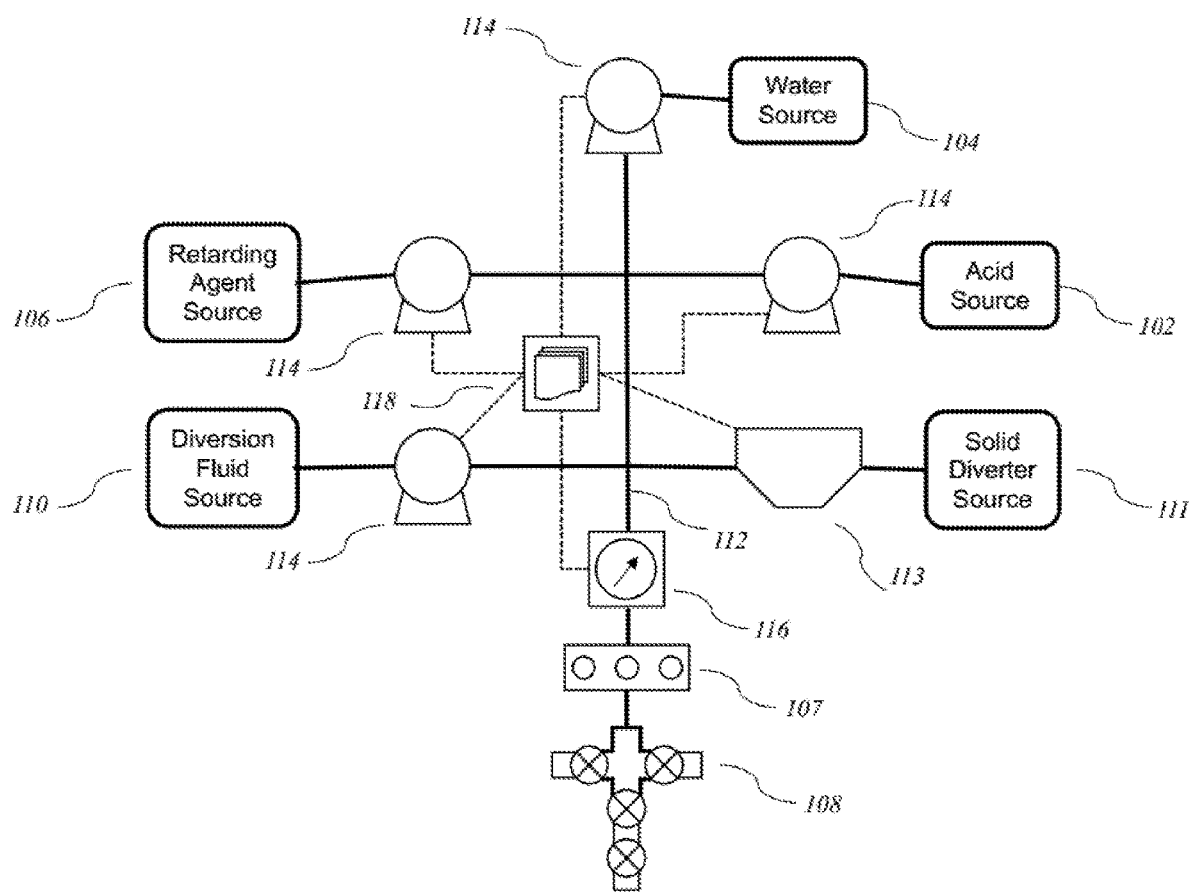
FIG. 1 depicts an example of equipment used to treat a wellbore and/or a formation fluidly coupled to the wellbore according to some embodiments of the disclosure.

The following description of the variations is merely illustrative in nature and is in no way intended to limit the scope of the disclosure, its application, or uses. The description and examples are presented herein solely for the purpose of illustrating the various embodiments of the disclosure and should not be construed as a limitation to the scope and applicability of the disclosure. While the compositions of the present disclosure are described herein as comprising certain materials, it should be understood that the composition could optionally comprise two or more chemically different materials. In addition, the composition can also comprise some components other than the ones already cited. In the summary of the disclosure and this detailed description, each numerical value should be read once as modified by the term "about" (unless already expressly so modified), and then read again as not so modified unless otherwise indicated in context. Also, in the summary of the disclosure and this detailed description, it should be understood that a concentration or amount range listed or described as being useful, suitable, or the like, is intended that any and every concentration or amount within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors had possession of the entire range and all points within the range.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of concepts according to the disclosure. This description should be read to include one or at least one and the singular also includes the plural unless otherwise stated.

The terminology and phraseology used herein is for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited.

Also, as used herein any references to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment.

The terms "formation" or "subterranean formation" as utilized herein should be understood broadly, and are used interchangeably. A formation includes any underground fluidly porous formation, and can include without limitation any oil, gas, condensate, mixed hydrocarbons, paraffin, kerogen, water, and/or $CO_2$ accepting or providing formations. A formation can be fluidly coupled to a wellbore, which may be an injector well, a producer well, and/or a fluid storage well. The wellbore may penetrate the formation vertically, horizontally, in a deviated orientation, or combinations of these. The formation may include any geology, including at least a sandstone, limestone, dolomite, shale, tar sand, and/or unconsolidated formation. The wellbore may be an individual wellbore and/or a part of a set of wellbores directionally deviated from a number of close proximity surface wellbores (e.g. off a pad or rig) or single initiating wellbore that divides into multiple wellbores below the surface.

The term "oilfield treatment fluid" as utilized herein should be understood broadly. In certain embodiments, an oilfield treatment fluid includes any fluid having utility in an oilfield type application, including a gas, oil, geothermal, or injector well. In certain embodiments, an oilfield treatment fluid includes any fluid having utility in any formation or wellbore described herein. In certain embodiments, an oilfield treatment fluid includes a matrix acidizing fluid, a wellbore cleanup fluid, a pickling fluid, a near wellbore damage cleanup fluid, a surfactant treatment fluid, an unviscosified fracture fluid (e.g. slick water fracture fluid), and/or any other fluid consistent with the fluids otherwise described herein. An oilfield treatment fluid may include any type of additive known in the art, which are not listed herein for purposes of clarity of the present description, but which may include at least friction reducers, inhibitors, surfactants and/or wetting agents, fluid diverting agents, particulates, acid retarders (except where otherwise provided herein), organic acids, chelating agents, energizing agents (e.g. $CO_2$ or $N_2$), gas generating agents, solvents, emulsifying agents, flowback control agents, resins, breakers, and/or non-polysaccharide based viscosifying agents.

The term "high pressure pump" as utilized herein should be understood broadly. In certain embodiments, a high pressure pump includes a positive displacement pump that provides an oilfield relevant pumping rate—for example at least 0.5 barrels per minute (bpm), although the specific example is not limiting. A high pressure pump includes a pump capable of pumping fluids at an oilfield relevant pressure, including at least 500 psi, at least 1,000 psi, at least 2,000 psi, at least 5,000 psi, at least 10,000 psi, up to 15,000 psi, and/or at even greater pressures. Pumps suitable for oilfield cementing, matrix acidizing, and/or hydraulic fracturing treatments are available as high pressure pumps, although other pumps may be utilized.

The term "treatment concentration" as utilized herein should be understood broadly. A treatment concentration in the context of an HCl concentration is a final concentration of the fluid before the fluid is positioned in the wellbore and/or the formation for the treatment, and can be any concentration necessary to provide sufficient acidic function. The treatment concentration may be the mix concentration available from the HCl containing fluid at the wellsite or other location where the fluid is provided from. The treatment concentration may be modified by dilution before the treating and/or during the treating. Additionally, the treatment concentration may be modified by the provision of additives to the fluid. In certain embodiments, a treatment concentration is determined upstream of additives delivery (e.g. at a blender, hopper, or mixing tub) and the concentration change from the addition of the additives is ignored. In certain embodiments, the treatment concentration is a liquid phase or acid phase concentration of a portion of the final fluid—for example when the fluid is an energized or emulsified fluid.

Retarded acidizing fluids described below and useful in accordance with the disclosure exhibit a retarded acid reactivity that facilitates greater depth of fracture and/or matrix acidizing. The retarded acidizing fluid can comprise, consist essentially of, or consist of: water; an acid; and a water-soluble acid retarding agent. The retarded acidizing fluid can further comprise a viscoelastic surfactant (VES). The acid can be selected from the group consisting of hydrochloric acid (HCl), nitric acid, phosphoric acid, sulfuric acid, hydrofluoric acid, hydrobromic acid, perchloric acid, hydrogen iodide, alkanesulfonic acids, arylsulfonic acids, acetic acid, formic acid, alkyl carboxylic acids, acrylic acid, lactic acid, glycolic acid, malonic acid, fumaric acid, citric acid, tartaric acid, or their derivatives, and mixtures thereof. Generally, an acid is transported to a wellsite. According to some embodiments, the acid is present in the retarded acidizing fluids in an amount up to about 36 wt %, or from about 7.5 to about 36 wt %, or from about 7.5 to about 28 wt %, or from about 7.5 to about 20 wt %, based on the total weight of the composition. In some other embodiments, acid is present in the retarded acidizing fluids in an amount of at least about 37 wt %, In some embodiments, an acid that has shown particular utility in the retarded acidizing fluid according to the disclosure is hydrochloric acid. In some other embodiments, the retarded acidizing fluid may include an amount of hydrofluoric acid (HF). HF exhibits distinct reactions from HCl, and is useful in certain applications to enhance the activity of the resulting aqueous solution. For example, HF is utilized in the cleanup of sandstone formations where HCl alone is not effective for removing certain types of formation damage. It is believed that the present retarded acidizing fluid will have effects with HF similarly to the observed effects with HCl. Accordingly, solutions can be formulated with a total acid amount that is much higher than presently attainable formulations. In yet another embodiment, the HF is present in the retarded acidizing fluid in an amount of at least 0.25% by weight. The HF may be present in addition to the amount of HCl, and/or as a substitution for an amount of the HCl.

Another component of the retarded acidizing fluid useful according to this disclosure are water-soluble acid retarding agents (RA), which have utility in retarding the rate at which the acid solution reacts with carbonate-mineral, or other surfaces inside the formation. Thus, a water-soluble acid retarding agent may slow the reactivity of the acid towards the carbonate-mineral surfaces, without compromising its acid capacity. Such retardation is useful in the context of stimulating or improving production from subterranean formations that contain hydrocarbons, steam, geothermal brines and other valuable materials as known in the art. Slowing the rate of reaction may allow deeper penetration of the acid into the subterranean formations than regular acid, thereby increasing the formation permeability and productivity. Water-soluble acid retarding agents, as used herein, includes any material that reduces acid activity through a mechanism other than mere dilution. The water-soluble acid retarding agent can comprise a component selected from the group consisting of a salt, urea or one if its derivatives, an alpha-amino acid, a beta-amino acid, a gamma-amino acid, an alcohol with one to five carbons, a surfactant having a structure in accordance with Formula I or Formula II below, and combinations thereof.

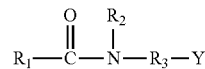

Formula I in which $R_1$ is a hydrocarbyl group that may be branched or straight chained, aromatic, aliphatic or olefinic and contains from about 1 to about 26 carbon atoms and may include an amine, $R_2$ is hydrogen or an alkyl group having from 1 to about 4 carbon atoms; $R_3$ is a hydrocarbyl group having from 1 to about 5 carbon atoms; and Y is an electron withdrawing group. As an example of this embodiment, the zwitterionic surfactant has the betaine structure:

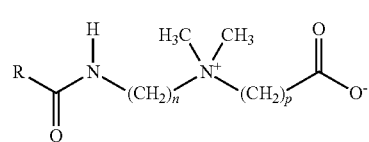

Formula II in which R is a hydrocarbyl group that may be branched or straight chained, aromatic, aliphatic or olefinic and has from about 1 to about 26 carbon atoms and may contain an amine; n=about 2 to about 4; and p=1 to about 5.

The salt can comprise: i) a cation selected from the group consisting of lithium, sodium, potassium, rubidium, cesium, beryllium, magnesium, calcium, strontium, barium, scandium, yttrium, titanium, zirconium, hafnium, vanadium, niobium, tantalum, chromium, molybdenum, tungsten, manganese, technetium, rhenium, iron, ruthenium, osmium, cobalt, rhodium, iridium, nickel, palladium, platinum, copper, silver, gold, zinc, cadmium, mercury, boron, aluminum, gallium, indium, thallium, tin, ammonium, alkylammonium, dialkylammonium, trialkylammonium and tetraalkylammonium, and combinations thereof; and ii) an anion selected from the group consisting of fluoride, chloride, bromide, iodide, sulfate, bisulfate, sulfite, bisulfite nitrate, alkanesulfonates, arylsulfonates, acetate, formate, and combinations thereof. According to the present embodiments, the retarding agent is added to the retarded acidizing fluid in an amount up to its solubility limit in the retarded acidizing fluid. According to some embodiments, the water-soluble acid retarding agent is present in the retarded acidizing fluid(s) in an amount of up to about 40 wt %, or from about 1 to about 40 wt %, or from about 5 to about 35 wt %, or from about 5 to about 20 wt %, based on the total weight of the retarded acidizing fluid.

In some embodiments, the retarded acidizing fluid may include HCl as the acid in a weight fraction exceeding 37%. The retarding agent present in some retarded acidizing fluids useful in accordance with the disclosure allows the HCl fraction to exceed the 37% normally understood to be the limit of HCl solubility at atmospheric pressure. Such retarding agents include at least one salt compound and urea, or urea derivative. Above 37%, normally, the evolution of HCl gas from the solution prevents the HCl fraction from getting any higher. In one or more embodiments, the HCl weight fraction of the retarded acidizing fluid may be as high as 45.7 wt %.

In some embodiments, the retarded acidizing fluid may include HCl as the acid in a weight fraction exceeding 37%. The retarding agent present in some retarded acidizing fluids useful in accordance with the disclosure allows the HCl fraction to exceed the 37% normally understood to be the limit of HCl solubility at atmospheric pressure. Such retarding agents include at least one salt compound and urea, or urea derivative. Above 37%, normally, the evolution of HCl gas from the solution prevents the HCl fraction from getting any higher. In one or more embodiments, the HCl weight fraction of the retarded acidizing fluid may be as high as 45.7 wt %.

Without being bound by any particular theory, inventors envisage mechanisms that inhibit acid activity. The first involves the disruption of the hydrogen-bonded network of water. In the Grotthuss proton-hopping mechanism, protons move in water not through Brownian motion, but rather charge transport through shifting hydrogen bonds. Solutes are known to disrupt the Grotthuss mechanism by interacting with water themselves, rather than allowing protons to associate freely. This slows the proton transport to the wormhole wall during a matrix acidizing treatment. The introduction of salt solutes also has a similar second effect by simply replacing water. The lack of water molecules crowds the fluid and limits the diffusion of protons. The amount of RA present in the composition can be any concentration necessary to provide sufficient acid retardation function.

A second mechanism involves the dissociation of acids in solution. As mentioned, organic acids have higher pKa's than HCl, making the protons from these acids less available for reaction. In some aspects of the disclosure, compounds that lower the polarizability (as indicated by the dielectric constant) of water are used, which therefore decrease the proton dissociation of acids. It is believed that aqueous solutes can modify the activity of acids in water in one or both of these mechanisms.

A parameter that quantifies the retardation of the acid is the retardation factor. As described herein, the retardation factor indicates the ratio of apparent surface reaction rates. According to the present embodiments, the retardation factor of the retarded acidizing fluid is higher or equal to a retardation factor of a second solution of acid of a same concentration as the acid comprised in the retarded acidizing fluid without the retarding agent. For example, in various embodiments, the retarded acidizing fluid may exhibit an acid retardation factor higher than or equal to about 3, at least about 5, or at least about 11 at about 70° F. At about 200° F., the retarded acidizing fluid may exhibit an acid retardation factor higher than or equal to about 3, higher than or equal to about 5, or even higher than or equal to about 7.

Water is present in the retarded acidizing fluid in an amount sufficient to dissolve the acid and the retarding agent. According to embodiments according to the disclosure, the water concentration included in the retarded acidizing fluid may be greater than 0 wt % and lower or equal to 80 wt %. In various embodiments, the water concentration may be lower than 60 wt %, or lower than 40 wt % or lower than 20 wt %, and equal to or higher than 8 wt %, or equal to or higher than 10 wt %. In yet other embodiments, the water concentration may even be lower than 8 wt %.

According to some embodiments, an amount of water is mixed with a retarding agent, where the amount of water is present in an amount between 0.3 and 5 times the mass of the RA, where any lower limit can be 0.35, 0.4, or 0.45 and any upper limit can be 1.0, 1.2, 1.25, where any lower limit can be combined with any upper limit. The procedure further includes dissolving an amount of acid into the combined amount of water and RA. The acid, such as HCl, may be added by any method, such as bubbling HCl gas through the solution. The dissolving of the HCl may occur after dissolving of the RA, simultaneous with the dissolving of the RA, or at least partially before the dissolving of the RA. The amount of HCl gas is in a molar ratio of between 4.0 and 0.5 times the amount of the RA. In yet another embodiment, the procedure includes dissolution of at least a portion of the RA in the water during the dissolution of the HCl in the combined water and RA. Example operations include beginning the dissolution of the HCl and adding the RA as a solid or a solution, providing some of the RA in solution with the water and some of the RA as a solid, and/or providing the RA as a solid in the water and dissolving the HCl into the water while dissolving the RA.

Viscoelastic surfactants (VES) create aqueous gels that are employed as oil well treatments for hydraulic fracturing, sand migration control and diversion. U.S. Pat. No. 7,237, 608, Fu et al., SELF DIVERTING MATRIX ACID filed in the U. S. Patent Office on Oct. 20, 2004, granted Jul. 3, 2007 is incorporated herein by reference in its entirety, and discloses viscoelastic surfactants, among other things, which are useful for the retarded acidizing fluid (s) disclosed herein. The viscoelastic surfactant can comprise a surfactant component selected from the group consisting of ???, ???, and combinations thereof. The viscoelastic surfactant can comprise a zwitterionic surfactant having a structure in accordance with Formula III or Formula IV below.

Formula III

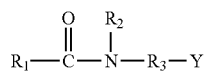

in which $R_1$ is a hydrocarbyl group that may be branched or straight chained, aromatic, aliphatic or olefinic and contains from about 17 to about 26 carbon atoms and may include an amine; $R_2$ is hydrogen or an alkyl group having from 1 to about 4 carbon atoms; $R_3$ is a hydrocarbyl group having from 1 to about 5 carbon atoms; and Y is an electron withdrawing group. As an example of this embodiment, the zwitterionic surfactant has the betaine structure:

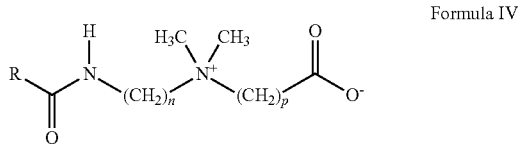

Formula IV in which R is a hydrocarbyl group that may be branched or straight chained, aromatic, aliphatic or olefinic and has from about 17 to about 26 carbon atoms and may contain an amine; n=about 2 to about 4; and p=1 to about 5.

The viscoelastic surfactant can be erucic amidopropyl dimethyl betaine. According to some embodiments, the viscoelastic surfactant is present in the retarded acidizing fluid(s) in an amount of up to about 6% v/v or from about 0.02 to about 6% v/v, or from about 0.04 to about 4% v/v, or from about 0.2 to about 3% v/v, based on the total volume of the retarded acidizing fluid.

The retarded acidizing fluid can be in the form of a gel. The retarded acidizing fluid can have a lower viscosity at a pH below about 0 as compared to a viscosity of an equivalent retarded acidizing fluid which does not contain the water-soluble acid retarding agent. The retarded acidizing fluid can have a viscosity, at temperatures between about 70° F. to about 200° F. and a pH above about 3, which is higher than the viscosity of an equivalent retarded acidizing fluid which does not contain the water-soluble acid retarding agent.

Further, it is also within the scope of the present disclosure that the retarded acidizing fluids may be combined with one or more other additives known to those of skill in the art, such as, but not limited to, corrosion inhibitors, scale inhibitors, demulsifiers, foaming agents, hydrogen sulfide scavengers, reducing agents and/or chelants, and the like. For example, non-surface active substituted ammonium containing amino acid derivatives may be used as environmentally friendly corrosion inhibitors that effectively protect various tools employed in oilfield operations by surface treating these tools.

The corrosion inhibitor is typically provided in liquid form and is mixed with the other components of the treatment fluid at the surface and then introduced into the formation. The corrosion inhibitor system is present in the treatment fluid in an amount of from about 0.2% to about 3% by total weight of the treatment fluid. The corrosion inhibitor used with the fluids of the present disclosure includes an alkyl, alkenyl, alycyclic or aromatic substituted aliphatic ketone, which includes alkenyl phenones, or an aliphatic or aromatic aldehyde, which includes alpha, or beta-unsaturated aldehydes, or a combination of these. Alkyl, alycyclic or aromatic phenone and aromatic aldehyde compounds may also be used in certain applications. Other unsaturated ketones or unsaturated aldehydes may also be used. Alkynol phenone, aromatic and acetylenic alcohols and quaternary ammonia compounds, and mixtures of these may be used, as well. These may be dispersed in a suitable solvent, such as an alcohol, and may further include a dispersing agent and other additives.

Chelating agents are materials that are employed, among other uses, to control undesirable reactions of metal ions. In oilfield chemical treatments, chelating agents are frequently added to matrix stimulation acids to prevent precipitation of solids (metal control) as the acids spend on the formation being treated. These precipitates include iron hydroxide and iron sulfide. In addition, chelating agents are used as components in many scale removal/prevention formulations. Two different types of chelating agents may be used: polycarboxylic acids (including aminocarboxylic acids and polyaminopolycarboxylic acids) and phosphonates. The non-surface active substituted ammonium containing amino acid derivatives may act as chelating agents when present in the treatment fluid in amount of from about 0.05% to about 10% or from about 1 wt % to about 5 wt %, based upon total weight percent of the treatment fluid.

Diversion fluids are described below and useful in accordance with the disclosure. Diversion fluids can comprise, consist of, or consist essentially of water, a VES as described herein, an acid as described herein, and an RA, also as described herein.

According to some embodiments, the VES is present in the diversion fluid(s) in an amount of up to about 6% v/v, or from about 0.02 to about 6% v/v, or from about 0.04 to about 4% v/v, or from about 0.2 to about 3% v/v, based on the total volume of the diversion fluid. According to some embodiments, the RA is present in the diversion fluid(s) in an amount of up to about 40 wt %, or from about 1 to about 40 wt %, or from about 5 to about 35 wt %, or from about 5 to about 20 wt %, based on the total weight of the diversion fluid.

Water is present in the diversion fluid(s) in an amount sufficient to dissolve the VES and the RA. According to embodiments according to the disclosure, the water concentration included in the diversion fluid may be greater than 0 wt % and lower or equal to 80 wt %. In various embodiments, the water concentration may be lower than 60 wt %, or lower than 40 wt % or lower than 20 wt %, and equal to or higher than 8 wt %, or equal to or higher than 10 wt %. In yet other embodiments, the water concentration may even be lower than 8 wt %.

Some embodiments according to present disclosure are methods for treating a formation penetrated by a wellbore. The methods involve separately mixing, at the wellsite, the components of acidizing fluids, the retarded acidizing fluid and the diversion fluid.

In accordance with embodiments of the disclosure, and with reference to FIG. 1, a method for treating a subterranean formation comprises, consists of, or consists essentially of:

a) mixing, at a wellsite 100, add from an acid source 102 with water from a water source 104 and water-soluble acid retarding agent (RA) from a RA source 106 to form a retarded acidizing fluid; and b) introducing the retarded acidizing fluid to a subterranean formation through a wellbore 108 in fluid communication with the subterranean formation (not shown). The subterranean formation may be any type of formation with a bottom hole temperature up to about 204° C. (400° F.). In various embodiments the temperature is at least 38° C. (100° F.). The temperature may also range from about 38° C. to about 204° C.

In accordance with an embodiment, VES from a VES source 110 can also be mixed with the acid, the water and the RA in step a) to form the retarded acidizing fluid.

In accordance with an embodiment, a solid diverter from a solid diverter source can also be mixed with the acid, the water and the RA in step a) to form the retarded acidizing fluid, wherein the solid diverter is selected from the group consisting of fiber, particulates, and combinations thereof. The particulates can comprise polylactic acid.

In accordance with an embodiment, following the introduction of the retarded acidizing fluid in step b):
c) forming a diversion fluid by mixing, at the wellsite, a VES from the VES source 110 with water from the water source 104 and RA from the RA source 106; and
d) introducing the diversion fluid to the subterranean formation through the wellbore 108.

In accordance with an embodiment, prior to the introduction of the retarded acidizing fluid in step b):
c) forming a diversion fluid by mixing, at the wellsite, a viscoelastic surfactant (VES) from a VES source with water from a water source, acid from the acid source and RA from the RA source; and
d) introducing the diversion fluid to the subterranean formation through the wellbore.

In accordance with an embodiment, step e) can include repeating steps a) and b) following step d). In accordance with an embodiment, steps a)-e) can be repeated at least once. In addition, an acidizing fluid can be formed by mixing acid from the acid source 102 with water from the water source 104; and introducing the acidizing fluid to the subterranean formation through the wellbore 108 prior to the first introducing of the retarded acidizing fluid in step b).

In accordance with an embodiment, the acid, the water and the RA can each be separately introduced into a treatment fluid line 112 within which the retarded acidizing fluid is formed and the treatment fluid line 112 is connected in fluid flow communication with the wellbore 108.

In accordance with an embodiment, the VES, the water and the RA are each separately introduced into the treatment fluid line 112 within which the diversion fluid is formed.

In accordance with an embodiment, an acidizing fluid is formed by mixing acid from the acid source 102 with water from the water source 104; and introducing the acidizing fluid to the subterranean formation through the wellbore 108 prior to the introducing of the retarded acidizing fluid in step b).

In accordance with an embodiment, pumps 114 and associated valves (not shown) are connected in fluid flow communication between the treatment fluid line 112 and each of the i) the acid source 102, ii) the water source 104, iii) the RA source 106, and iv) the VES source 110.

In accordance with an embodiment, any one or more of the acidizing fluid, the retarded acidizing fluid and the diversion fluid can be analyzed in an analyzer 116 prior to introduction to the wellbore 108 for fluid composition and properties, the fluid composition is compared to a fluid composition set point, and the composition of the one or more of the acidizing fluid, the retarded acidizing fluid and the diversion fluid is adjusted by adjusting flow rates of one or more of the acid, the water, the RA, and the VES through the pumps 114 and associated valves based on the comparison.

With further reference to FIG. 1, systems comprise, consist of or consist essentially of:
a subterranean formation (not shown) having a wellbore 108 in fluid communication with the subterranean formation;
a treatment fluid line 112 connected in fluid flow communication with the wellbore 108;
an acid source 102 connected in fluid flow communication with the treatment fluid line 112;
a water source 104 connected in fluid flow communication with the treatment fluid line 112; and
a water-soluble acid retarding agent source (RA source) 106 connected in fluid flow communication with the treatment fluid line 112.

In accordance with an embodiment, the system can further comprise a viscoelastic surfactant source (diversion fluid or VES source) 110 connected in fluid flow communication with the treatment fluid line 112.

In accordance with an embodiment, the system can further comprise a solid diverter source 111 connected in fluid flow communication with the treatment fluid line 112.

In accordance with an embodiment, pumps 114 and associated valves (not shown) are connected in fluid flow communication between the treatment fluid line 112 and each of the i) the acid source 102, ii) the water source 104, iii) the RA source 106, and iv) the VES source 110. In accordance with an embodiment, solid diverter source 111 is connected in fluid flow communication with a solid diverter addition system 113, and solid diverter addition system 113 is connected in fluid flow communication with the treatment fluid line 112.

In accordance with an embodiment, the system can further comprise an analyzer 116 connected in fluid flow communication with the treatment fluid line 112, and a controller 118 operably connected to the analyzer 116 for receiving a control signal and operably connected to the solid diverter addition system 113 and the pumps 114 and associated valves for controlling the flow of one or more of the acid, the water, the RA, the VES, and the solid diverter.

The operation of the pumps 114 may be connected in fluid flow communication with a high pressure pump 107 connected in fluid flow communication with the treatment fluid line 112. The operation of the high pressure pump 107 can include at least one of (i) injecting the treatment fluid into the formation at matrix rates; (ii) injecting the treatment fluid into the formation at a pressure equal to a pressure that fractures the formation; and (iii) contacting at least one of the wellbore and the formation with the oilfield treatment fluid.

The following examples are presented to further illustrate the preparation and properties of the wellbore fluids of the present disclosure and should not be construed to limit the scope of the disclosure, unless otherwise expressly indicated in the appended claims.

EXAMPLES

Example 1

Various formulations were prepared using different retarding agents and HCl as the acid. A series of tests were conducted to evaluate these formulations. To fully assess the properties of the prepared formulations, the tests were conducted in an autoclave under up to 3000 psi hydrostatic pressure, with the thermal energy transmitted through a silicone oil bath. To determine the retardation factor (RF) of certain additives, formation response tests were conducted with different acid formulations. In the experiments, Indiana limestone cores, which were 1 inch in diameter by 6 inches in length, were held at ~2800 psi confining pressure to ensure that no fluids channeled around the sides, and were heated to desired temperature. The acid fluids were flowed through the core, with a ~1200 psi back pressure, which were conditions provided so the acid will preferentially form wormholes. When the wormhole extended the entire length of the core, the pressure drops across the core approached zero, which was indicative that the fluid was no longer flowing through porous medium, but rather what approximated a tortuous pipe.

Figure 2:
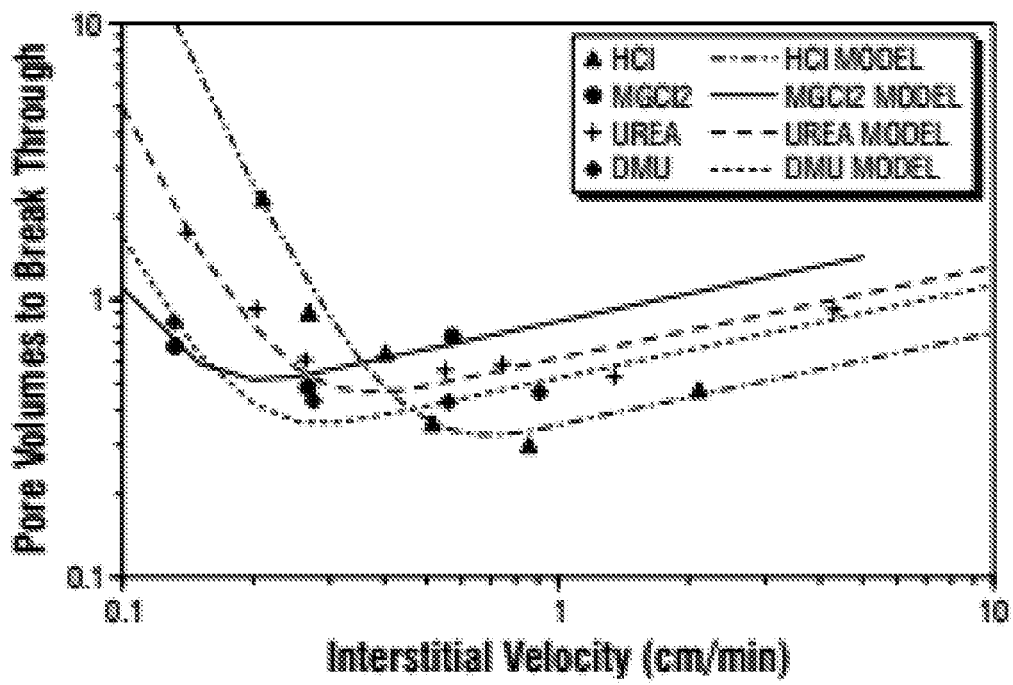
FIG. 2 shows pore volumes to break through versus interstitial velocity curves for aqueous acid solutions based upon tests performed at 70° F., according to the disclosure.
Figure 3:
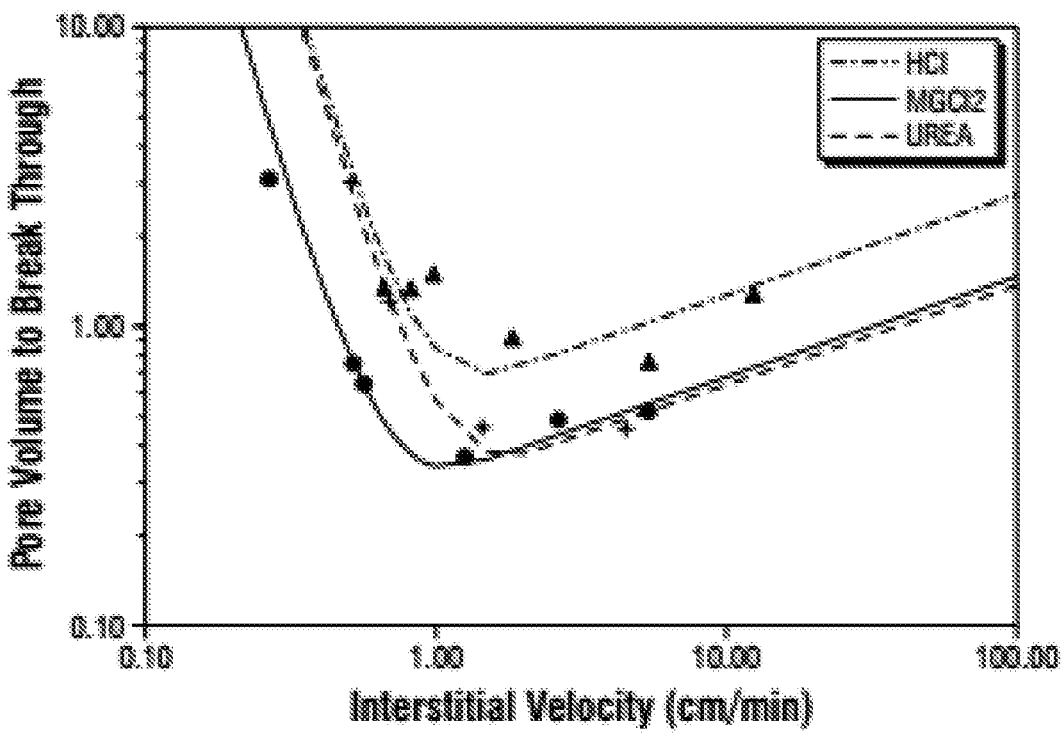
FIG. 3 shows pore volumes to break through versus interstitial velocity curves for aqueous acid solutions based upon tests performed at 200° F., according to the disclosure.

The number of pore volumes of fluid required to create the wormholes was a function of the acid injection velocity ($u_i$, FIGS. 2 and 3). The optimal injection velocity ($u_{i-opt}$) is that which requires the lowest number of pore volumes for the wormhole to break through the core. Using this approach, pore volume to break through (PVBT) curves versus interstitial velocity curves were generated and the $u_{i-opt}$ and RF calculated for each acid formulation (Table 1) at 70° F. (FIG. 2) and 200° F. (FIG. 3).

TABLE 1

Retardation Factors of Acid Formulations

| Entry | Temperature (° F.) | Retarding Agent Additive | Retarding Agent concentration (% by weight) | Estimated retardation factor (RF) |
|---|---|---|---|---|
| 1 | 70 | none | — | — |
| 2 | | urea | 18.5 | 3.3 |
| 3 | | N,N'-dimethyl urea (DMU) | 27 | 5.8 |
| 4 | | MgCl$_2$ | 19 | 10.9 |
| 5 | 200 | none | — | — |
| 6 | | urea | 18.5 | 1.3 |
| 7 | | MgCl$_2$ | 19 | 3.1 |

The estimated retardation factor was calculated according to the following equation:

$$RF_x \sim \left(\frac{u_{i-opt,HCl}}{u_{i-opt,x}}\right)^2$$

All aqueous fluids evaluated contained hydrochloric acid (15% weight/volume) and a corrosion inhibitor (0.6% by volume). The results demonstrate that compounds which disrupt the hydrogen bonding network of water and its dielectric constant are able to retard the activity of acid in subterranean formations. In particular, magnesium chloride (MgCl$_2$) used as a retarding agent showed significant retardation at similar or lower concentrations than the other retarding evaluated.

Figure 4A:
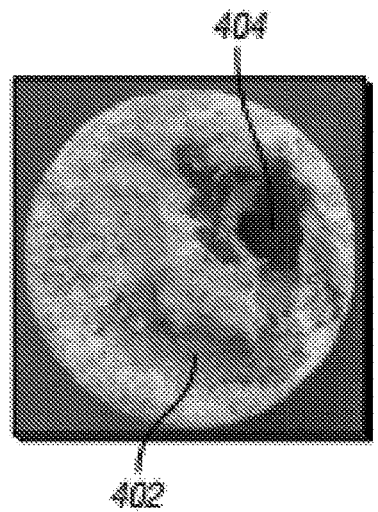
FIGS. 4A-4E depict face dissolution of core samples evaluated in accordance with the disclosure; and, FIG. 5 shows calcium generation concentration versus time curves for some aqueous acid solutions evaluated, according to the disclosure.
Figure 4B:
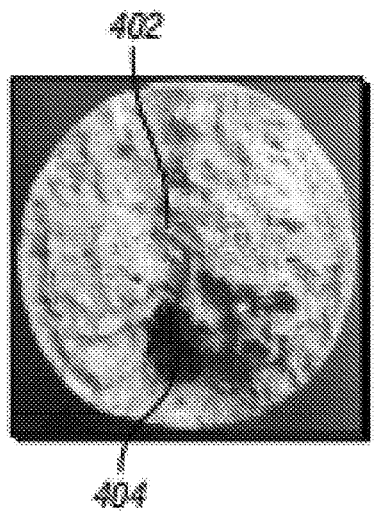
Figure 4C:
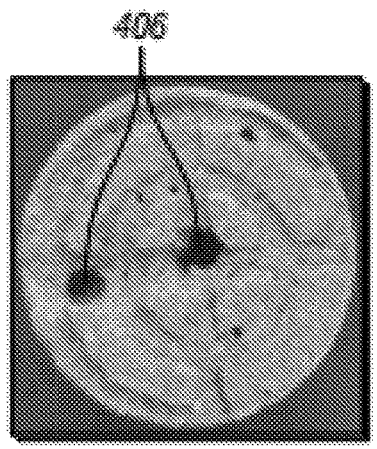

Wormholes in carbonate formations can acquire different structures depending on the rate of acid injection. At very low injection rates, there is no wormhole at all, as only the face of the formation dissolves. Wormholes that do form at low injection rates tend to be broad and conical. Close to the optimum injection rate, a dominant, narrow wormhole forms with a small amount of branching. When the injection rate is increased past the optimum injection rate, the acid is forced into less permeable zones and creates a ramified (highly branched) wormhole. Ramified structures will transition to uniformly dissolved rock at very high injection rates. By comparing the characteristics of the injection face of the cores from the acid injection experiment described in evaluations above, estimates of the wormhole characteristics can be made. Table 2 provides the low acid injection rates, break through times and pore volumes, from the evaluations above at 200° F., and FIGS. 4A-4C graphically illustrate the core face images and break through characteristics at low acid injection rates at 200° F. (photographic representations are provided in U.S. Provisional Application Ser. No. 62/154,945, and included herein by incorporation).

TABLE 2

Core face images and break through characteristics at low acid injection rates at 200° F.

| | Fluid => | | |
|---|---|---|---|
| | 15% HCl | 15% HCl + 18.5% urea | 15% HCl + 19% MgCl$_2$ |
| Injection rate (ml/min) | 0.2 | 0.3 | 0.2 |
| Break through time (h:mm) | >3:30 | >1:30 | 0:34 |
| Pore volumes to break through | >3.4 | >3 | 0.53 |

Figure 4D:
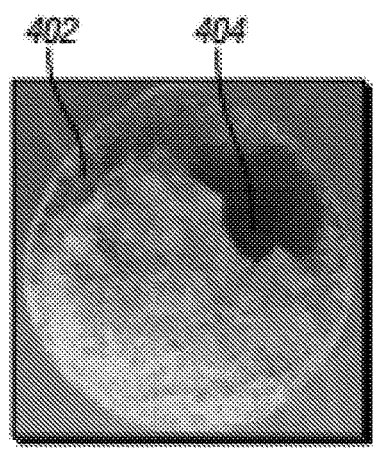
Figure 4E:
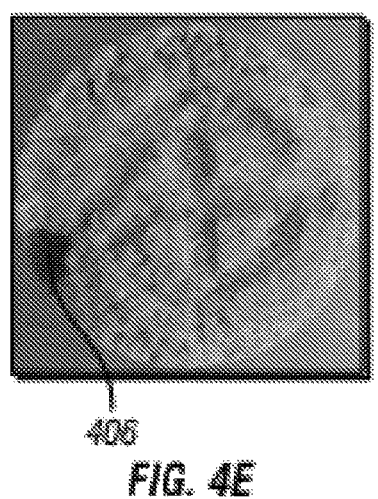

In the tests performed at 200° F., the core faces treated with 15% HCl (FIG. 4A) and 15% HCl with urea (FIG. 4B), both showed a large amount of core facial dissolution 402 and developing conical wormholes 404. In both cases, however, the confining pressure punctured the sleeve holding the core because too much of the rock face dissolved. For the 15% HCl with MgCl$_2$ fluid (FIG. 4C), the entry wormhole was much smaller and the wormholes 406 broke through to the opposite face in a timely fashion, 34 minutes with 0.53 pore volumes to break through. These indicate that at lower injection rates, retarded acid with MgCl$_2$ was effective. Table 3 provides the results of the same experiment conducted at 250° F., with similar comparative results both in data and facial dissolution as shown in FIG. 4D (for HCl alone) and FIG. 4E (for HCl with MgCl$_2$). A large amount of core facial dissolution 402 and a developing conical wormholes 404 occurred with HCl alone, while little facial dissolution and a narrower wormhole 406 resulted with the HCl and MgCl$_2$ mixture.

TABLE 3

Core break through characteristics at low acid injection rates at 250° F.

| | Fluid => | |
|---|---|---|
| | 15% HCl | 15% HCl + 19% MgCl$_2$ |
| Injection rate (ml/min) | 0.4 | 0.4 |
| Break through time (h:mm) | >2:05 | 0:13 |
| Pore volumes to break through | >4 | 0.34 |

Example 2

Figure 5:
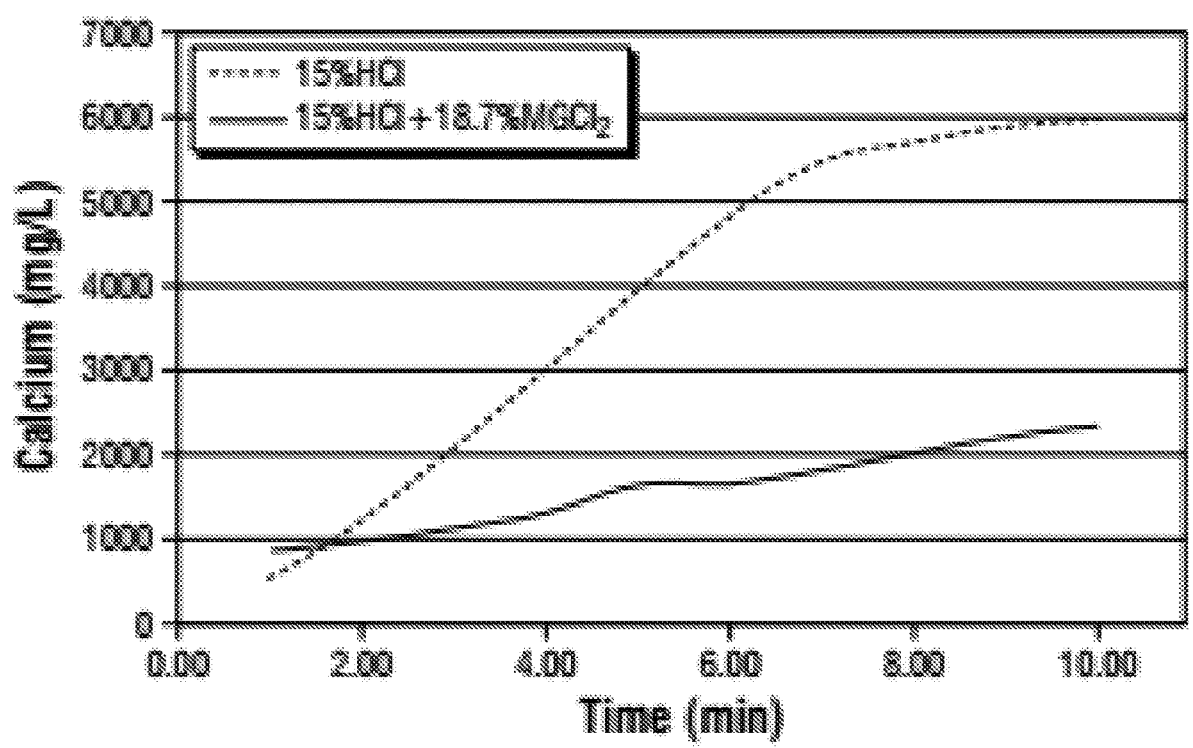

In another example, rotating disk experiments were performed to characterize the relative surface reaction rates of acidic solutions. The experiment was conducted by spinning a marble or limestone disk, at ambient temperature and 1250 rpm, in an acid formulation, and periodically sampling the solution. The samples were then analyzed for the calcium concentration as a function of time, which gives the rate constant of calcite (CaCO$_3$) dissolution by hydrochloric acid containing solutions. A decrease in rate constant indicates an acid retarding agent formulation whose surface reaction is retarded relative to hydrochloric acid alone, without any retarding agent. The plot in FIG. 5 illustrates slower dissolution rate, or slower rate of Ca$^{2+}$ ions liberation over time, for the 15% HCl solution containing MgCl$_2$ compared with unmodified 15% HCl within 10 minutes. The results in FIG. 5 are a comparison of 15% HCl alone to 15% HCl mixed with 18.7% MgCl$_2$ retarding agent.

Example 3

Viscoelastic diverting acids (VDAs) consists of two main components: a viscoelastic surfactant) and hydrochloric acid. The viscosity of VDA significantly increases when the acid starts reacting with the carbonate reservoir (that is, when the pH increases)—this is due at least in part to the molecules of the viscoelastic surfactant rearranging to worm-like micelles and forming a gel structure.

For this example, the fresh VDA included 36 v/v HCl (37 wt % solution), 49 v/v $MgCl_2$ (35 wt % solution), 5% v/v alcohol-containing solvent, 1.6% v/v corrosion inhibitor, and 7.9% v/v viscoelastic surfactant (with 39 wt % active component). The VES used was erucic amidopropyl dimethyl betaine. The rheology of "fresh" VDA (full HCl capacity) and "spent" VDA (null HCl capacity) are measured at ambient temperature with a Fann 35 viscometer and compared with VDA fluid which doesn't contain MgCl2 salt in the composition. Spent VDA was obtained by fully neutralizing the HCl with a sufficient amount of calcium carbonate powder.

Figure 6:
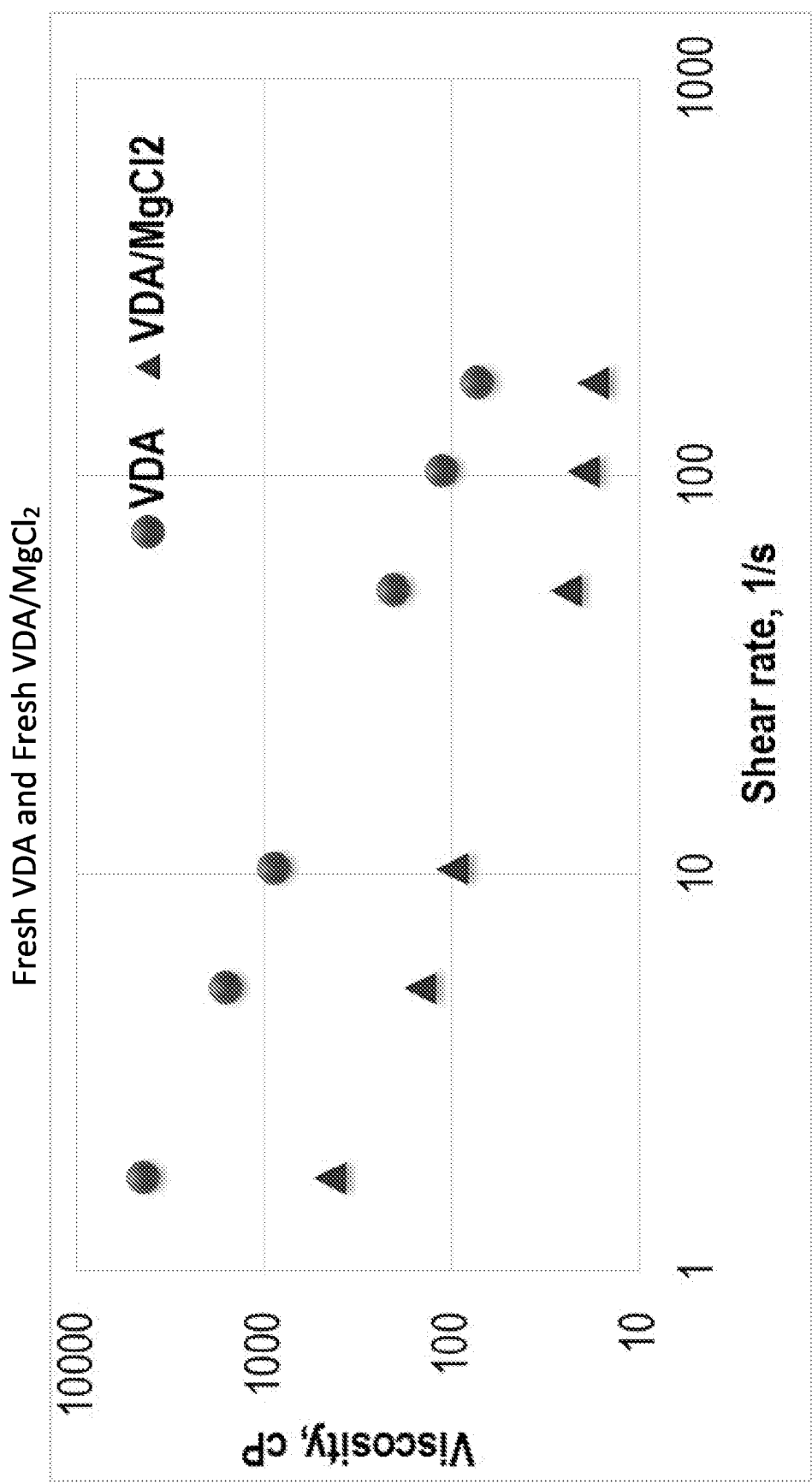
FIG. 6 shows viscosity versus shear rate for fresh VDA's containing viscoelastic surfactant and HCl with and without $MgCl_2$.

As shown in FIG. 6, the viscosity of the "fresh" VDA containing magnesium chloride was about one order of magnitude lower than the "fresh" VDA which did not have magnesium chloride. Thus, addition of the retarder to VDA reduces friction losses when the fluid is pumped.

Figure 7:
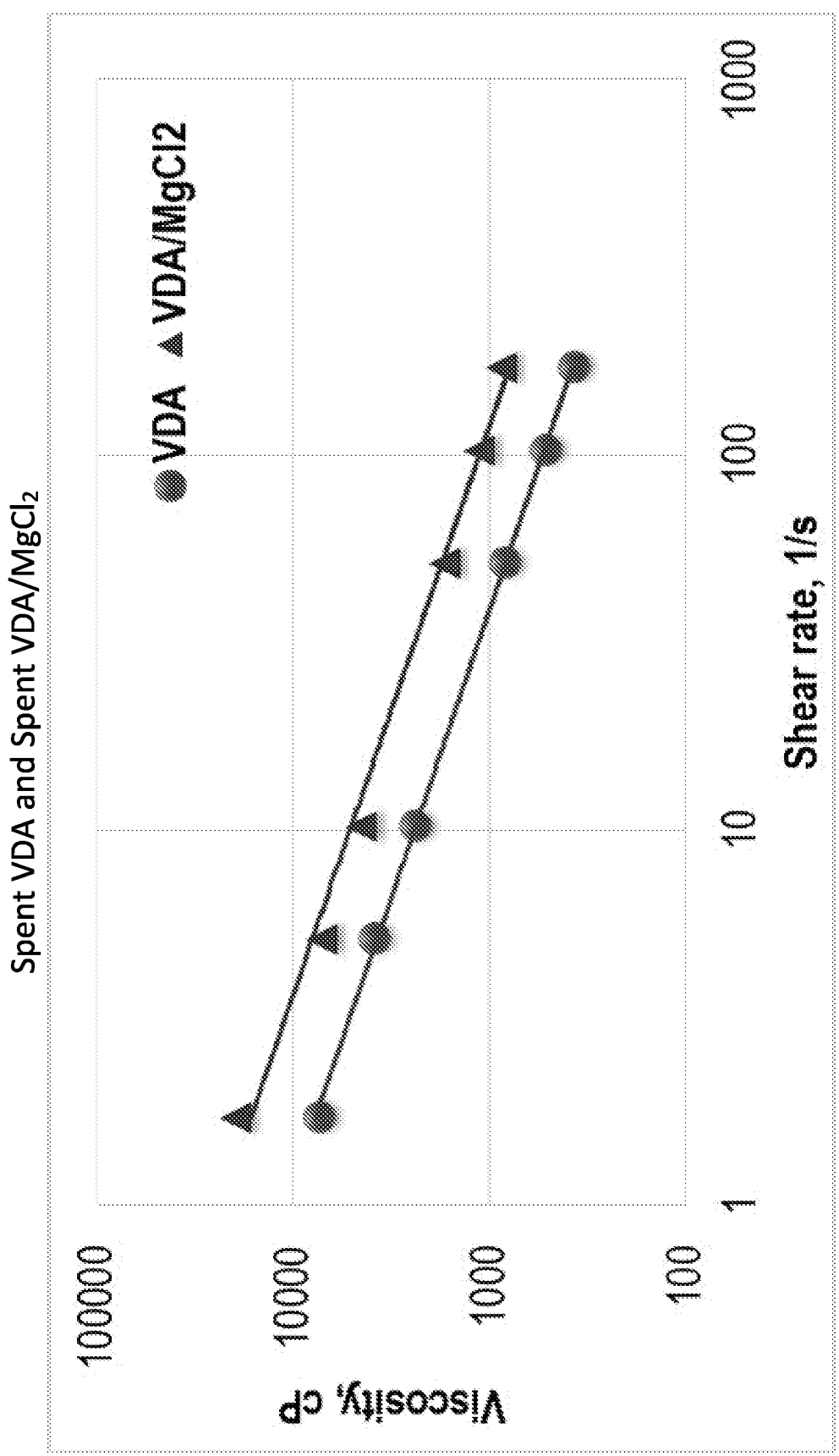
FIG. 7 shows viscosity versus shear rate for spent VDA's containing viscoelastic surfactant and HCl with and without $MgCl_2$.

As shown in FIG. 7, spent VDA containing magnesium chloride demonstrates higher viscosity than spent VDA without magnesium chloride. Thus, the presence of magnesium chloride could possibly improve diversion properties of VDA.

Mechanistically, it is thought that magnesium chloride and urea can each separately disrupt the hydrogen bond network of water that free protons diffuse through to reach the surface of the porous media of the formation. This slows the diffusion of the acid. Furthermore, it is known that magnesium chloride can lower the dielectric constant of water. Acids tend to have lower dissociation constants in lower dielectric media. The activity of the proton could be lowered in this way by forcing it to associate with its counteranion.

Example 4

Core flooding experiments with modified VDA (as described in Example 3) were conducted using Indiana limestone cores with permeability of 70 mD and porosity of 17%. Each core had a 6" length and 1" diameter. The cores were saturated with 2% KCl brine prior to the test. The test temperature was 200° F. VDA is injected at a constant rate into the core until it broke through the other end of the core (PVBT). The injection rate of VDA was varied in range of 0.1-6 ml/min. Dependence of PVBT on acid injection rate is shown in FIG. 8.

Figure 8:
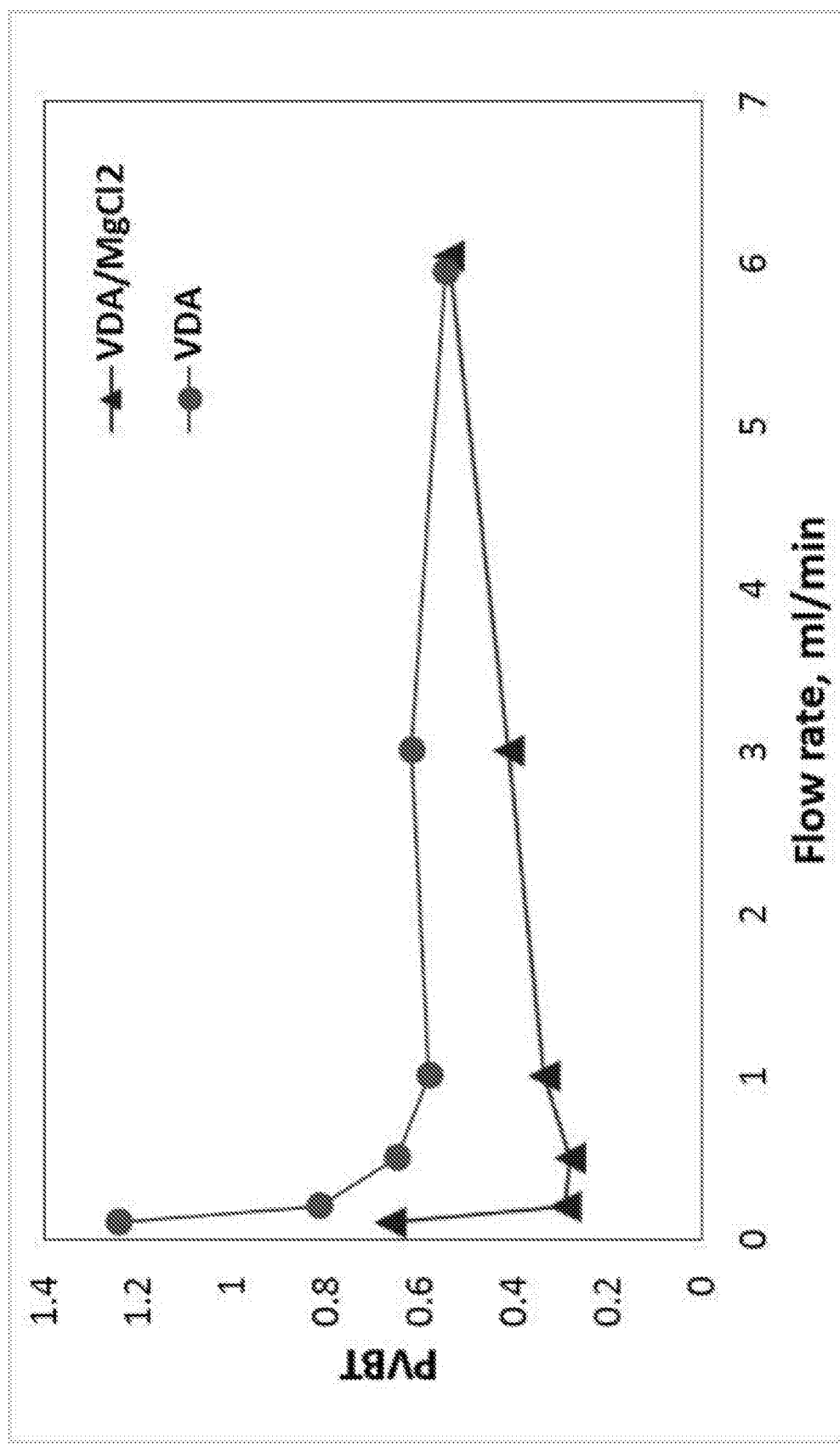
FIG. 8 shows pore volume to breakthrough (PVBT) versus flow rate for a VDA containing viscoelastic surfactant and HCl with and without $MgCl_2$.

As one can see in FIG. 8, the addition of magnesium chloride makes VDA more efficient (less fluid is required to break through the core). In particular, better efficiency of modified VDA is observed at low injection rates (below 6 ml/min). As shown in FIG. 9, the wormhole pattern also changes when the retarding agent (magnesium chloride) is present in VDA. The wormhole gets thinner and less core surface is dissolved with VDA containing magnesium chloride.

Example 5

VDA forms a viscous gel while penetrating the core and reacting with limestone. The viscous gel creates resistance for fluid to flow through the core and the injection pressure builds up. Diversion ability of VDA can be determined as a maximum pressure achieved in core flooding experiments before the fluid breaks through ($dP_{max}/dP_0$, where $dP_0$ is brine permeability).

Figure 10:
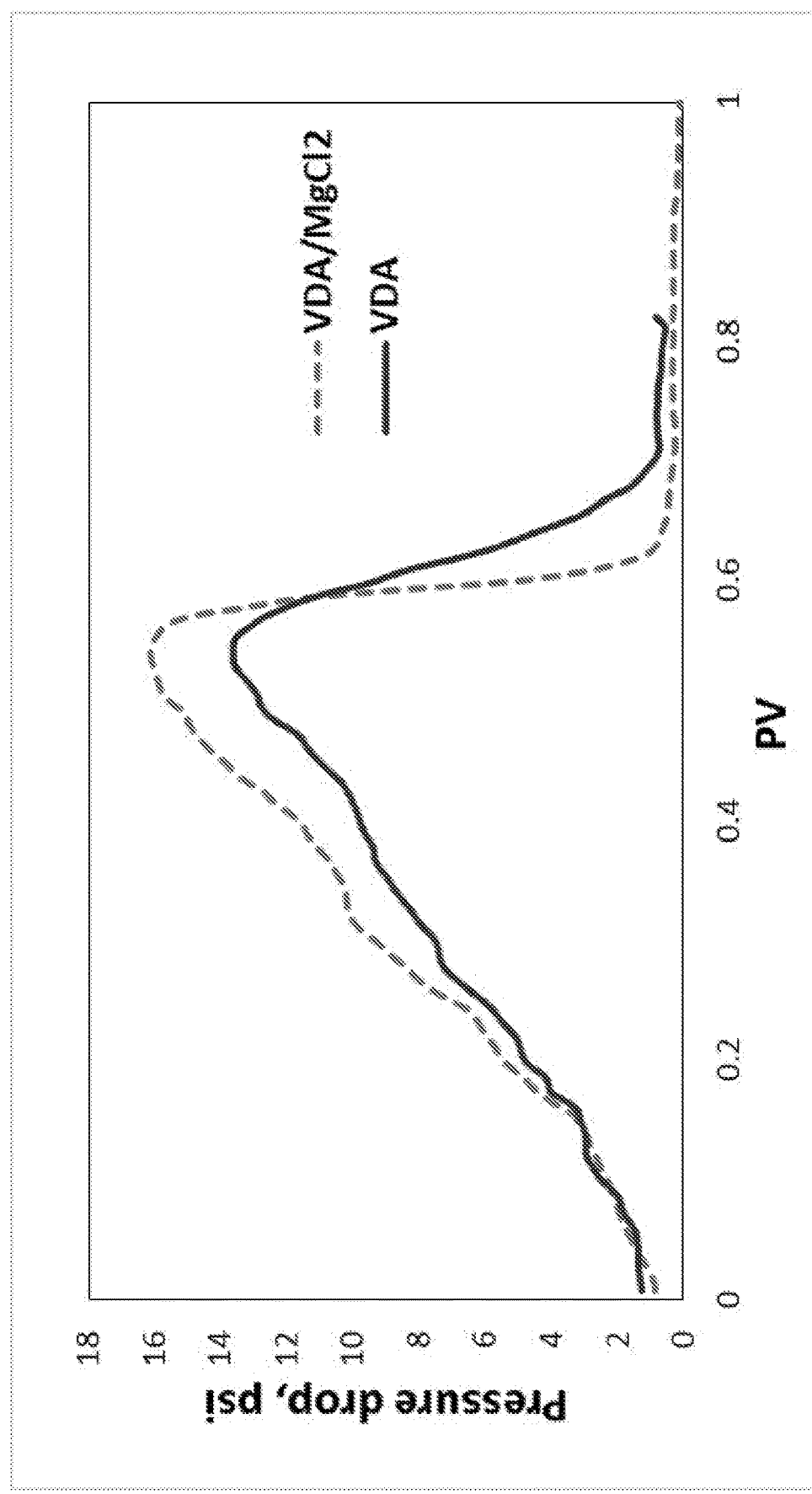
FIG. 10 shows normalized pressure versus pore volume (PV) for a VDA containing viscoelastic surfactant and HCl with and without $MgCl_2$ at flow rate 6 ml/min.
Figure 11:
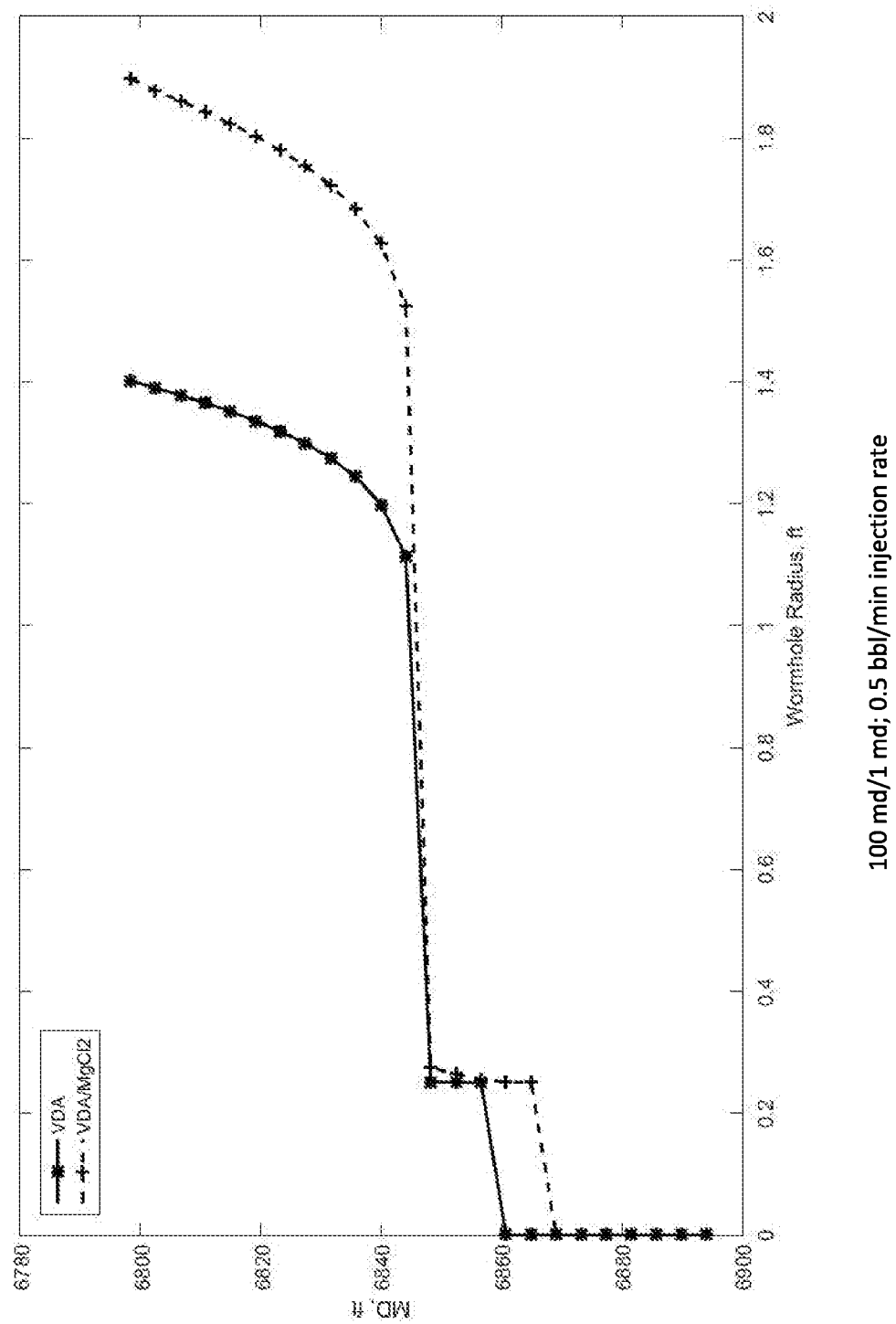
FIG. 11 shows a computer simulated graph of MD (measured depth) versus wormhole radius (at 100 md (millidarcy)/1 md permeability contrast) with 0.5 bbl/min total injection rate of a VDA containing viscoelastic surfactant and HCl with and without $MgCl_2$.
Figure 12:
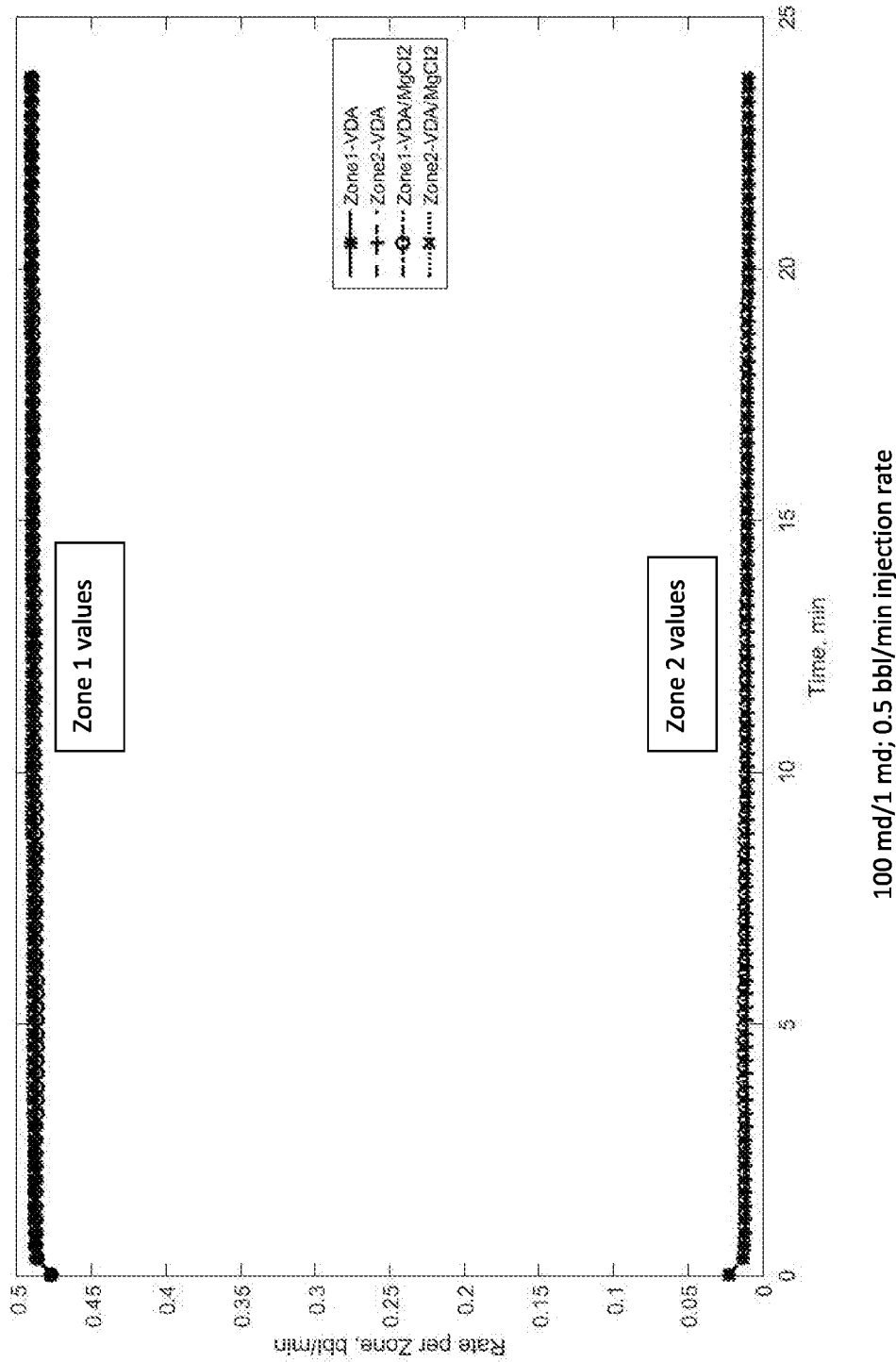
FIG. 12 shows a computer simulated graph of rate per zone versus time (at 100 md/1 md permeability contrast) with 0.5 bbl/min total injection rate of a VDA containing viscoelastic surfactant and HCl with and without $MgCl_2$.
Figure 13:
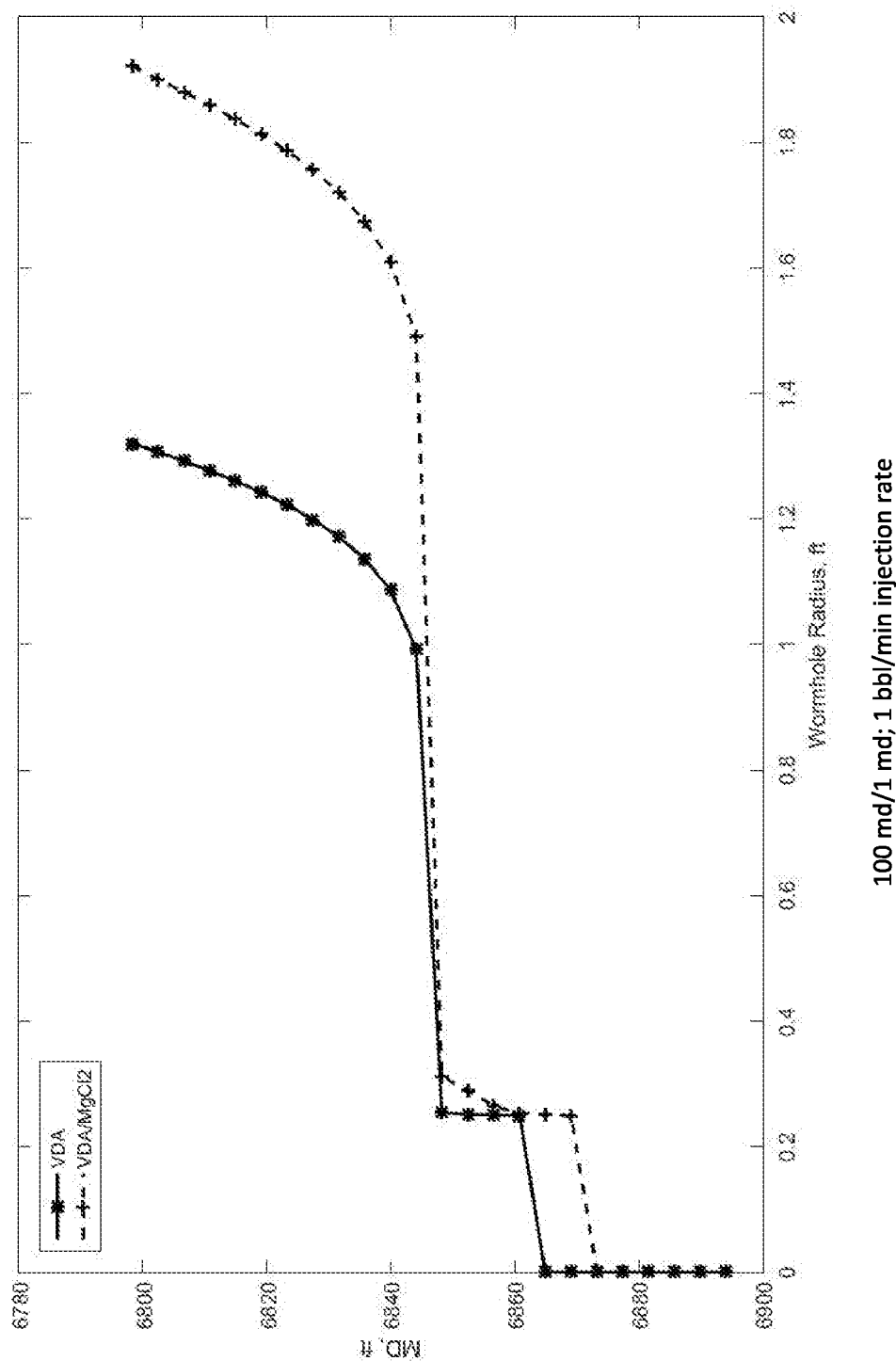
FIG. 13 shows a computer simulated graph of MD (length of the wellbore) versus wormhole radius (at 100 md/1 md permeability contrast) with 1 bbl/min total injection rate of a VDA containing viscoelastic surfactant and HCl with and without $MgCl_2$.
Figure 14:
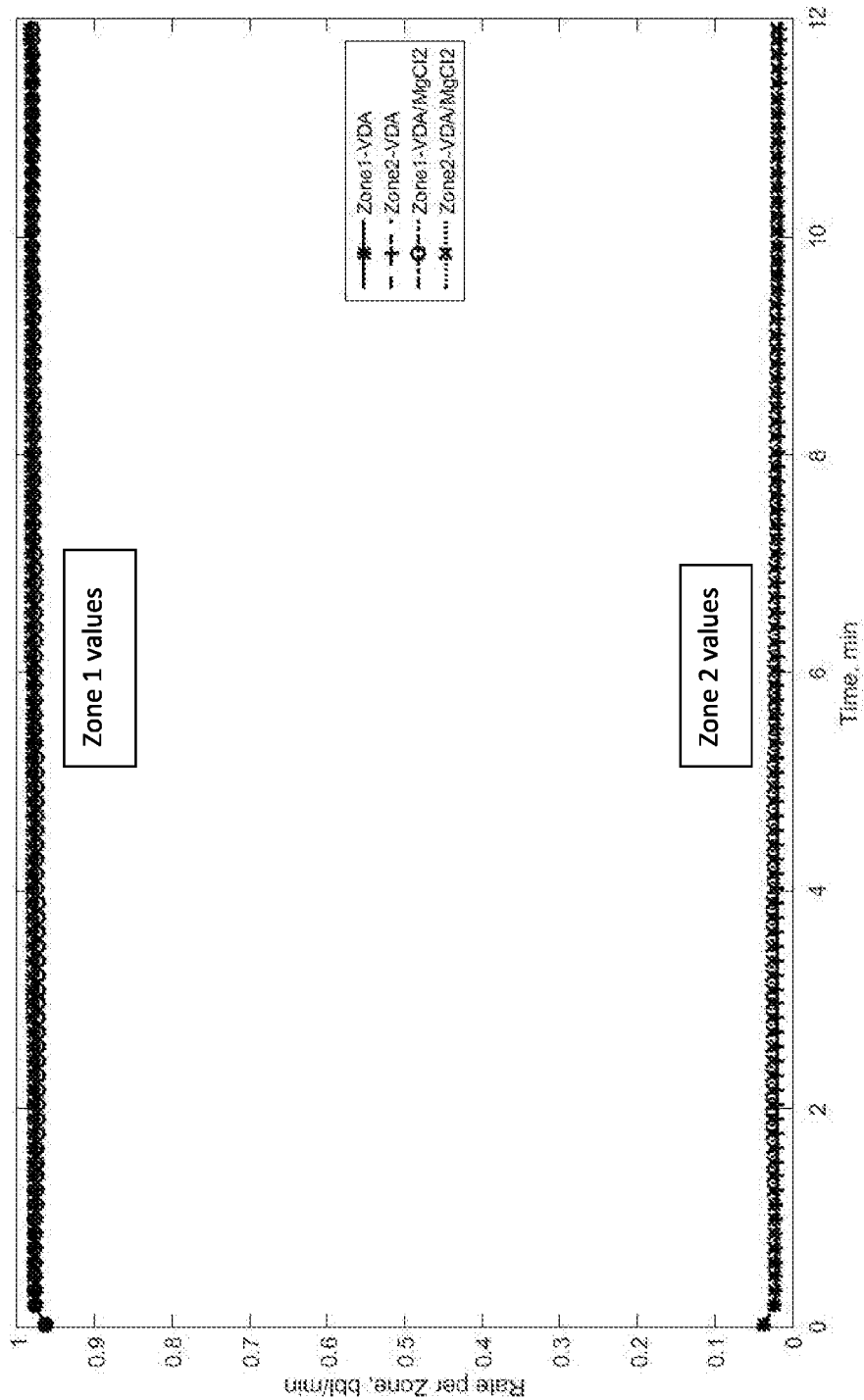
FIG. 14 shows a computer simulated graph of rate per zone versus time (at 100 md/1 md permeability contrast) with 1 bbl/min total injection rate of a VDA containing viscoelastic surfactant and HCl with and without $MgCl_2$.
Figure 15:
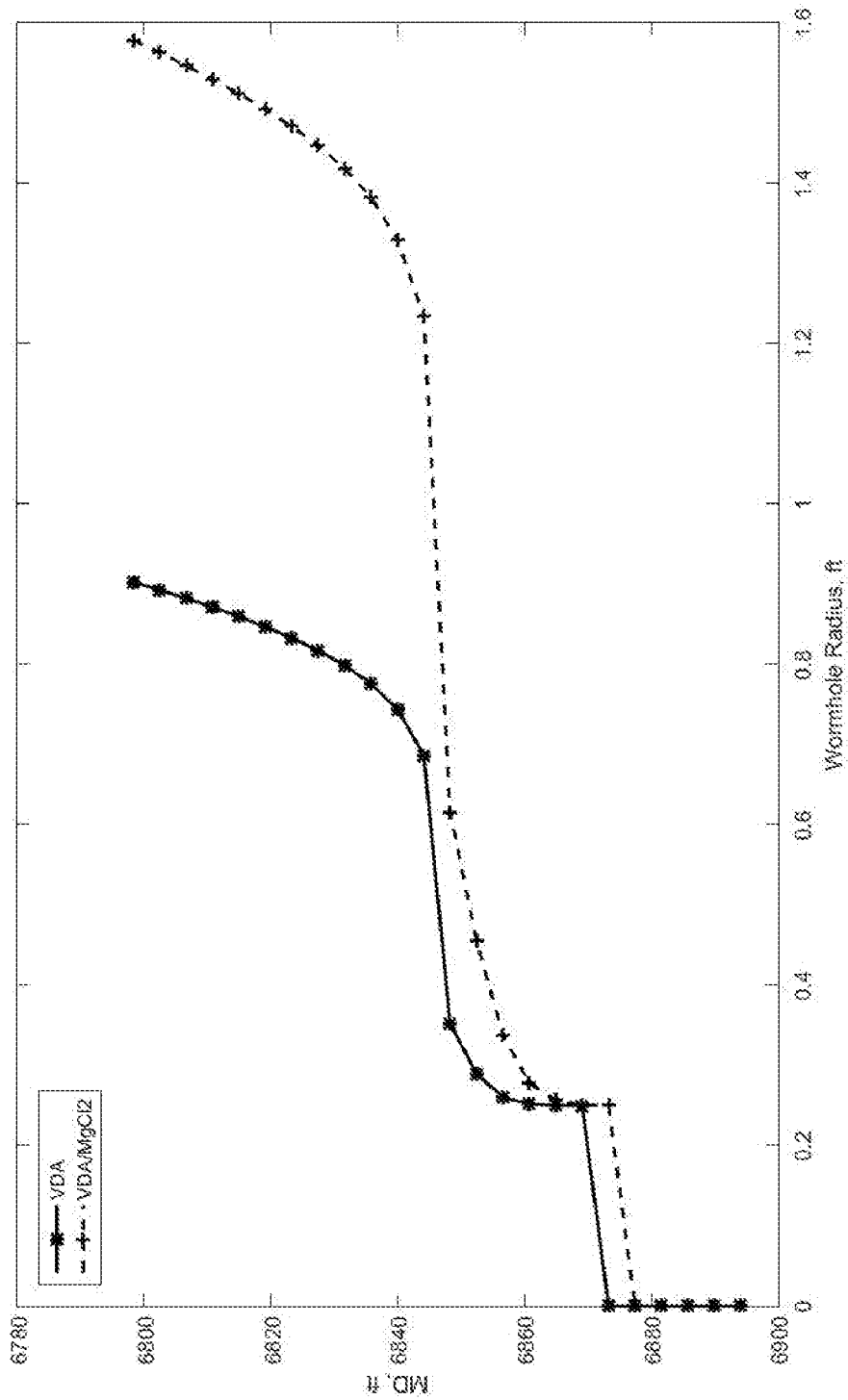
FIG. 15 shows a computer simulated graph of MD (length of the wellbore) versus wormhole radius (at 100 md/1 md permeability contrast) with 5 bbl/min total injection rate of a VDA containing viscoelastic surfactant and HCl with and without $MgCl_2$.
Figure 16:
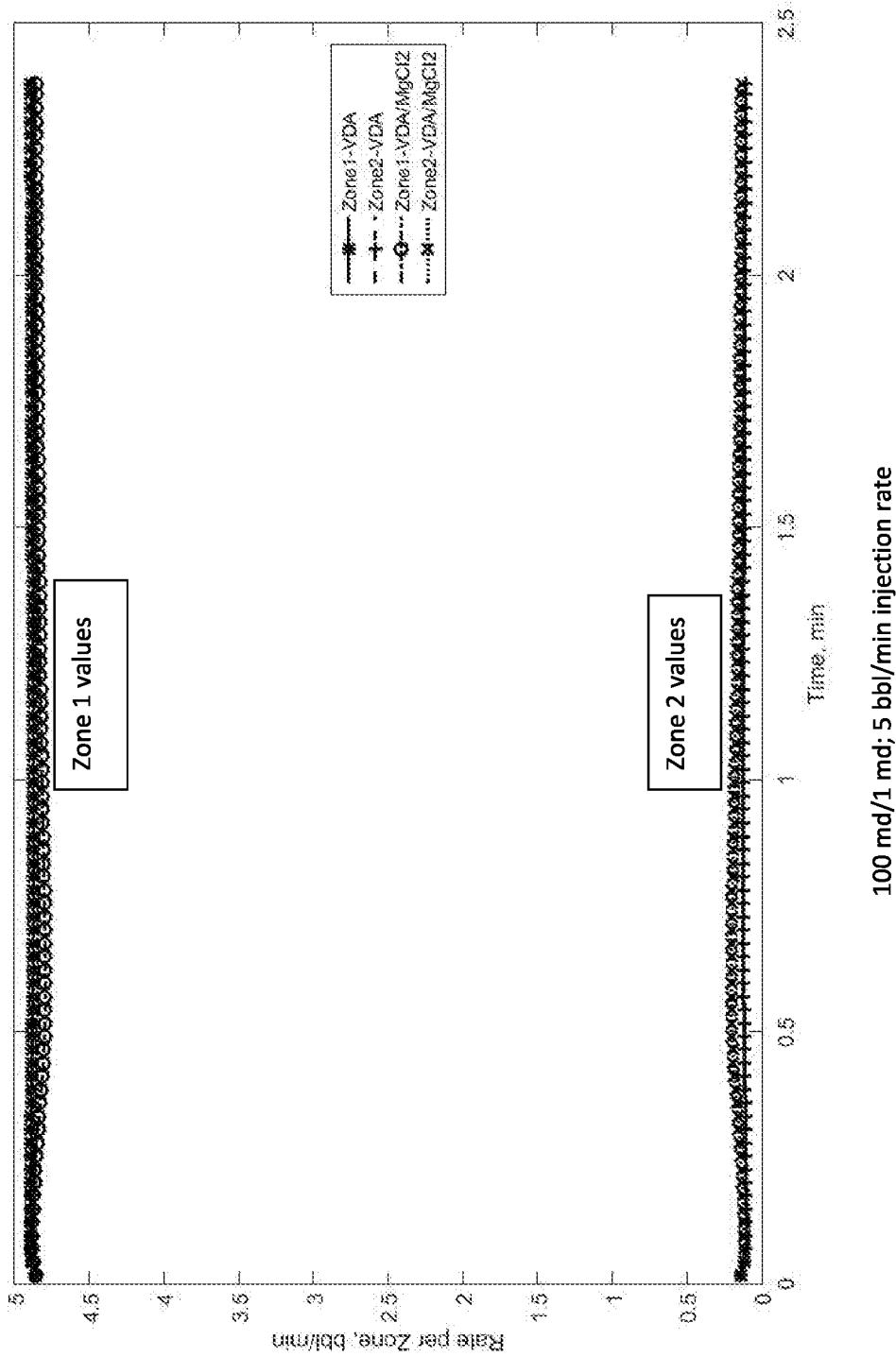
FIG. 16 shows a computer simulated graph of rate per zone versus time (at 100 md/1 md permeability contrast) with 5 bbl/min total injection rate of a VDA containing viscoelastic surfactant and HCl with and without $MgCl_2$.
Figure 17:
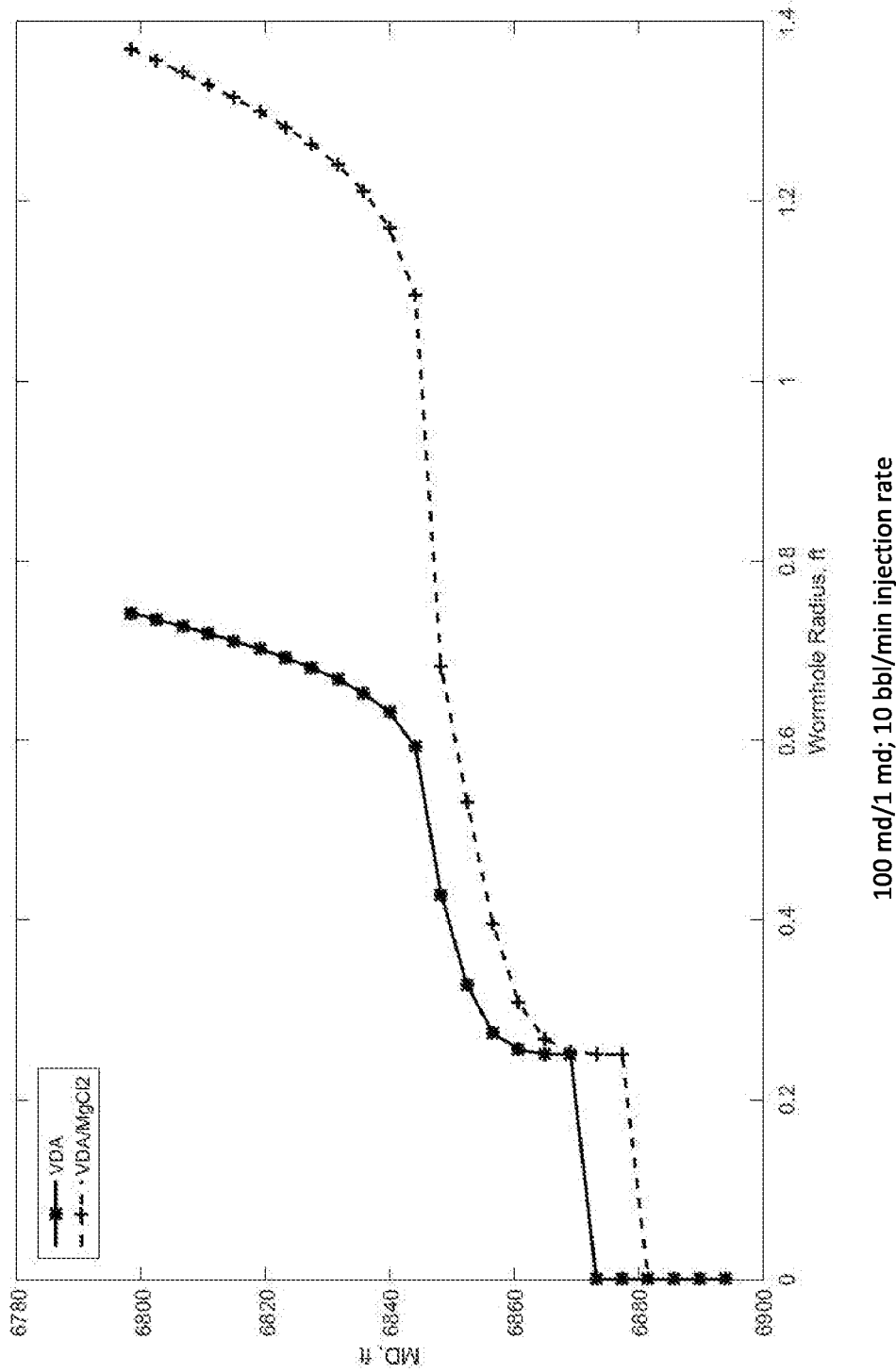
FIG. 17 shows a computer simulated graph of MD (length of the wellbore) versus wormhole radius (at 100 md/1 md permeability contrast) with 10 bbl/min total injection rate of a VDA containing viscoelastic surfactant and HCl with and without $MgCl_2$.
Figure 18:
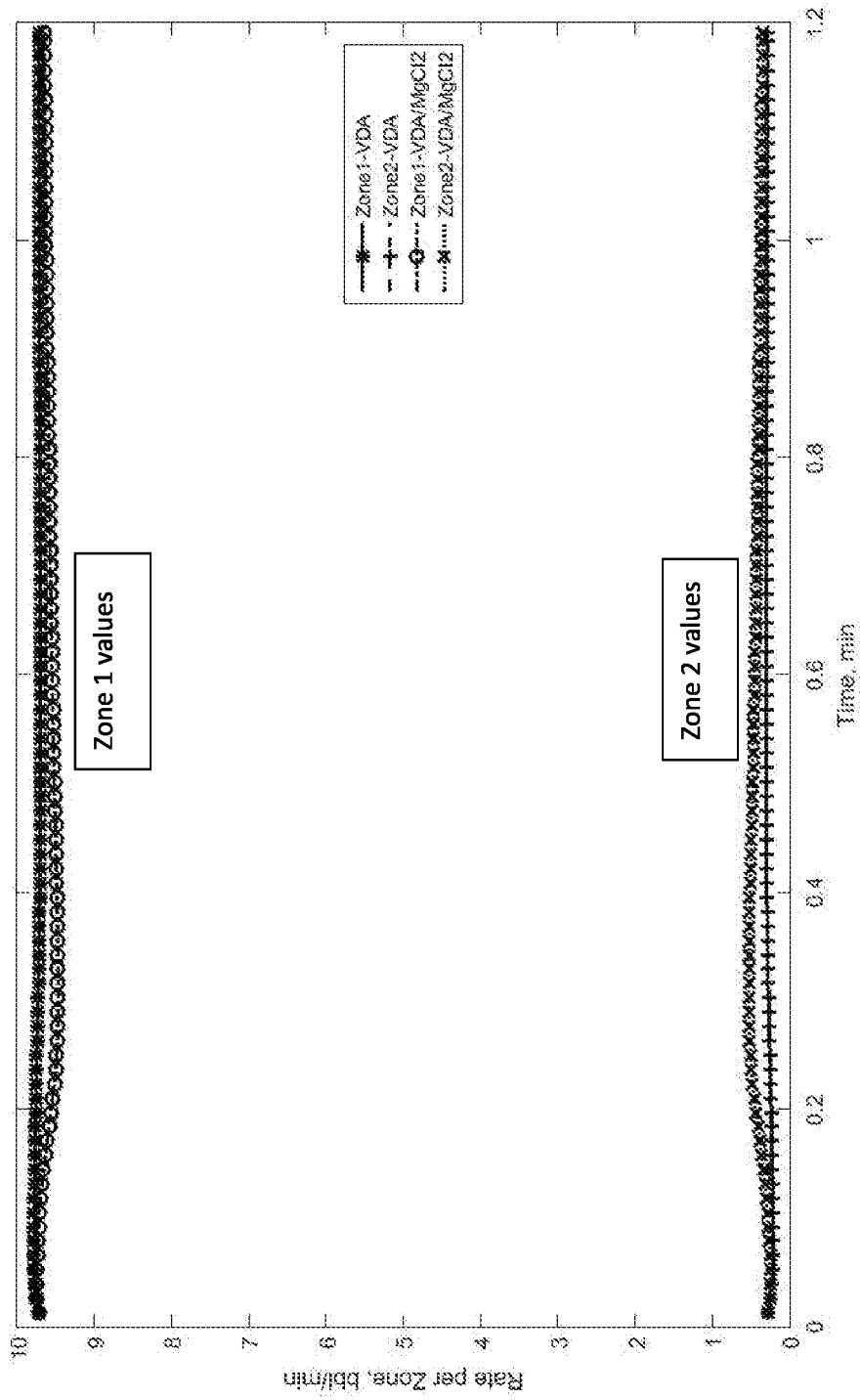
FIG. 18 shows a computer simulated graph of rate per zone versus time (at 100 md/1 md permeability contrast) with 10 bbl/min total injection rate of a VDA containing viscoelastic surfactant and HCl with and without $MgCl_2$.
Figure 19:
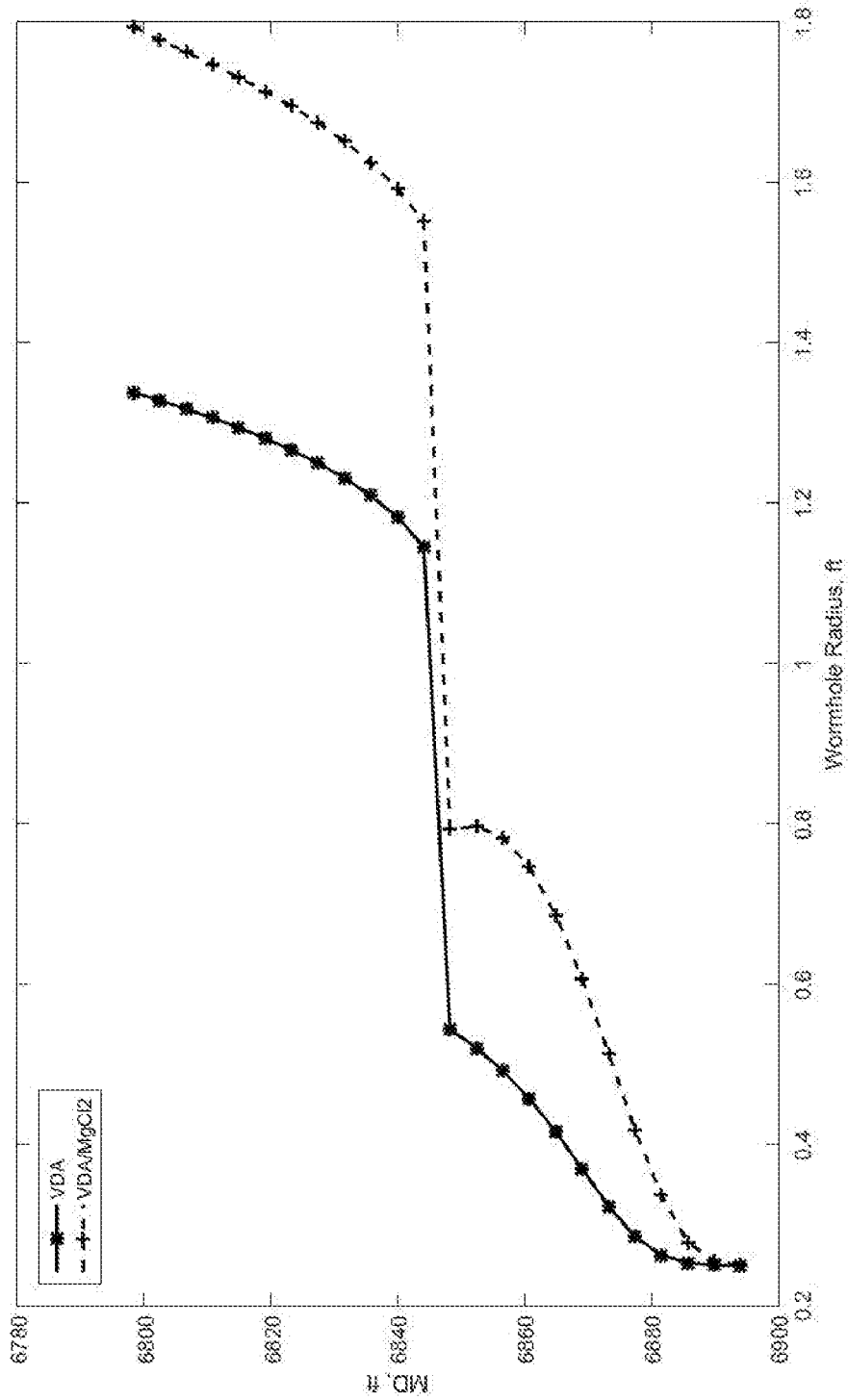
FIG. 19 shows a computer simulated graph of MD (length of the wellbore) versus wormhole radius (at 100 md/10 md permeability contrast) with 0.5 bbl/min total injection rate of a VDA containing viscoelastic surfactant and HCl with and without $MgCl_2$.
Figure 20:
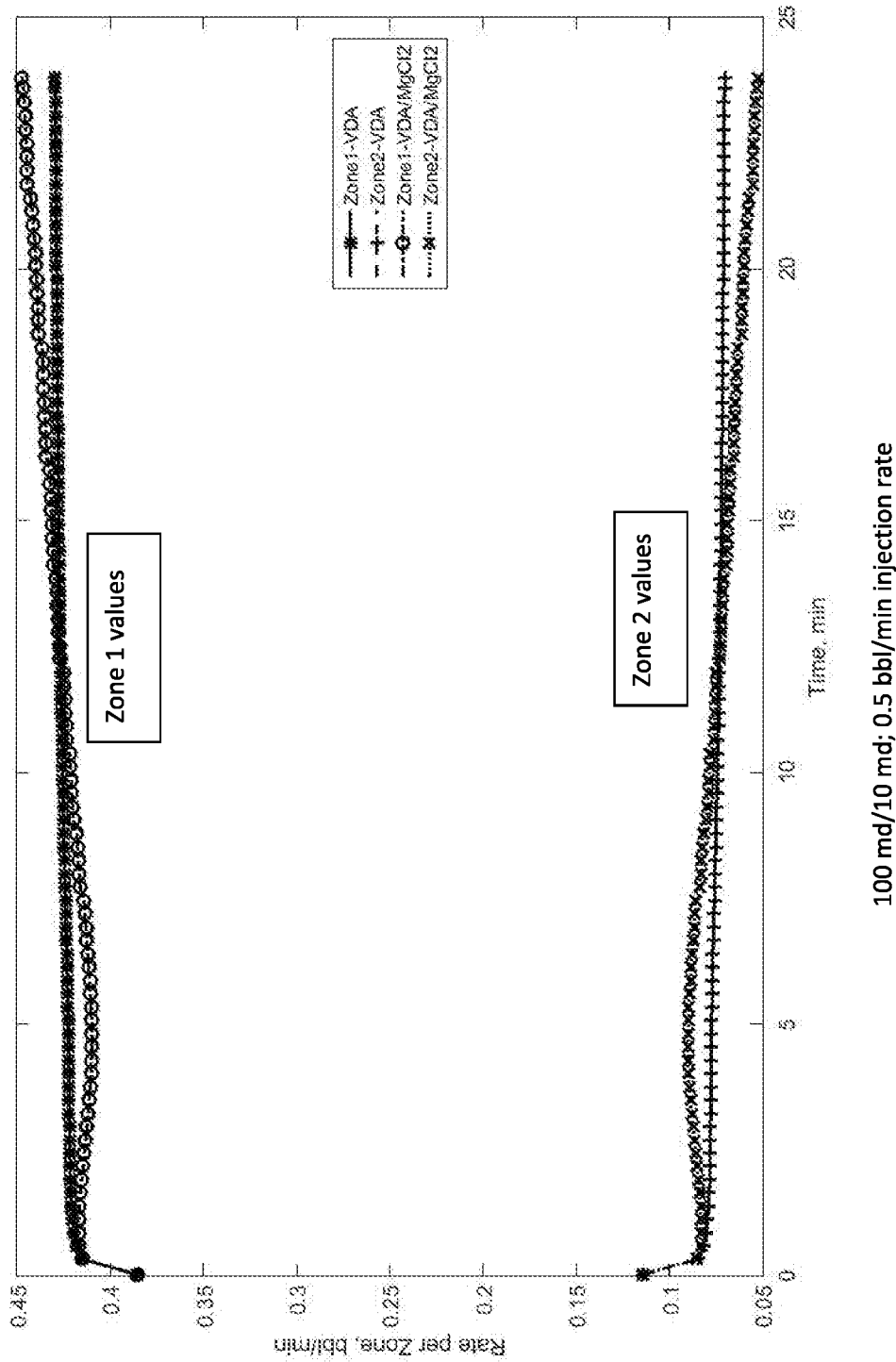
FIG. 20 shows a computer simulated graph of rate per zone versus time (at 100 md (millidarcy)/10 md permeability contrast) with 0.5 bbl/min total injection rate of a VDA containing viscoelastic surfactant and HCl with and without $MgCl_2$.
Figure 21:
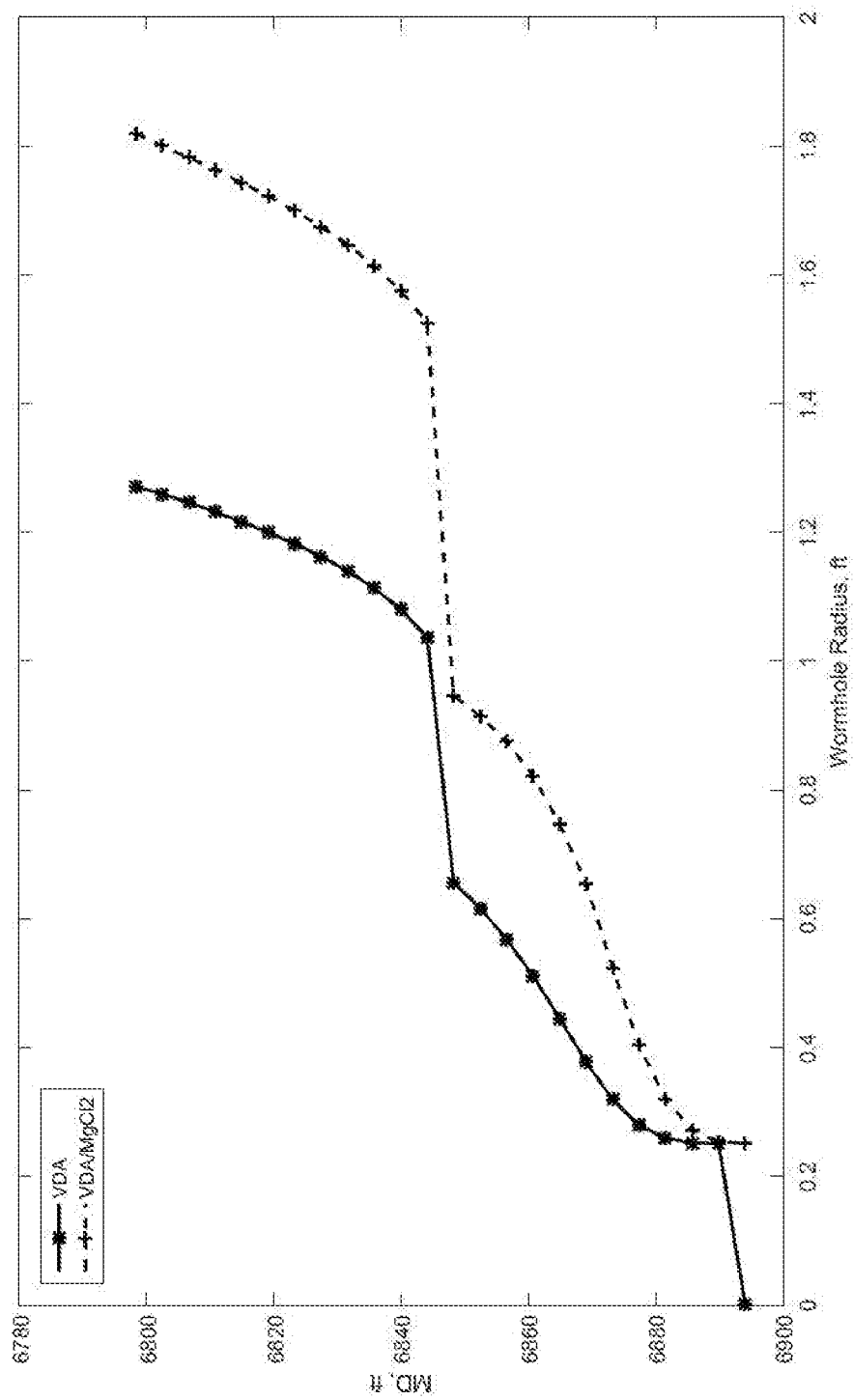
FIG. 21 shows a computer simulated graph of MD (length of the wellbore) versus wormhole radius (at 100 md/10 md permeability contrast) with 1 bbl/min total injection rate of a VDA containing viscoelastic surfactant and HCl with and without $MgCl_2$.
Figure 22:
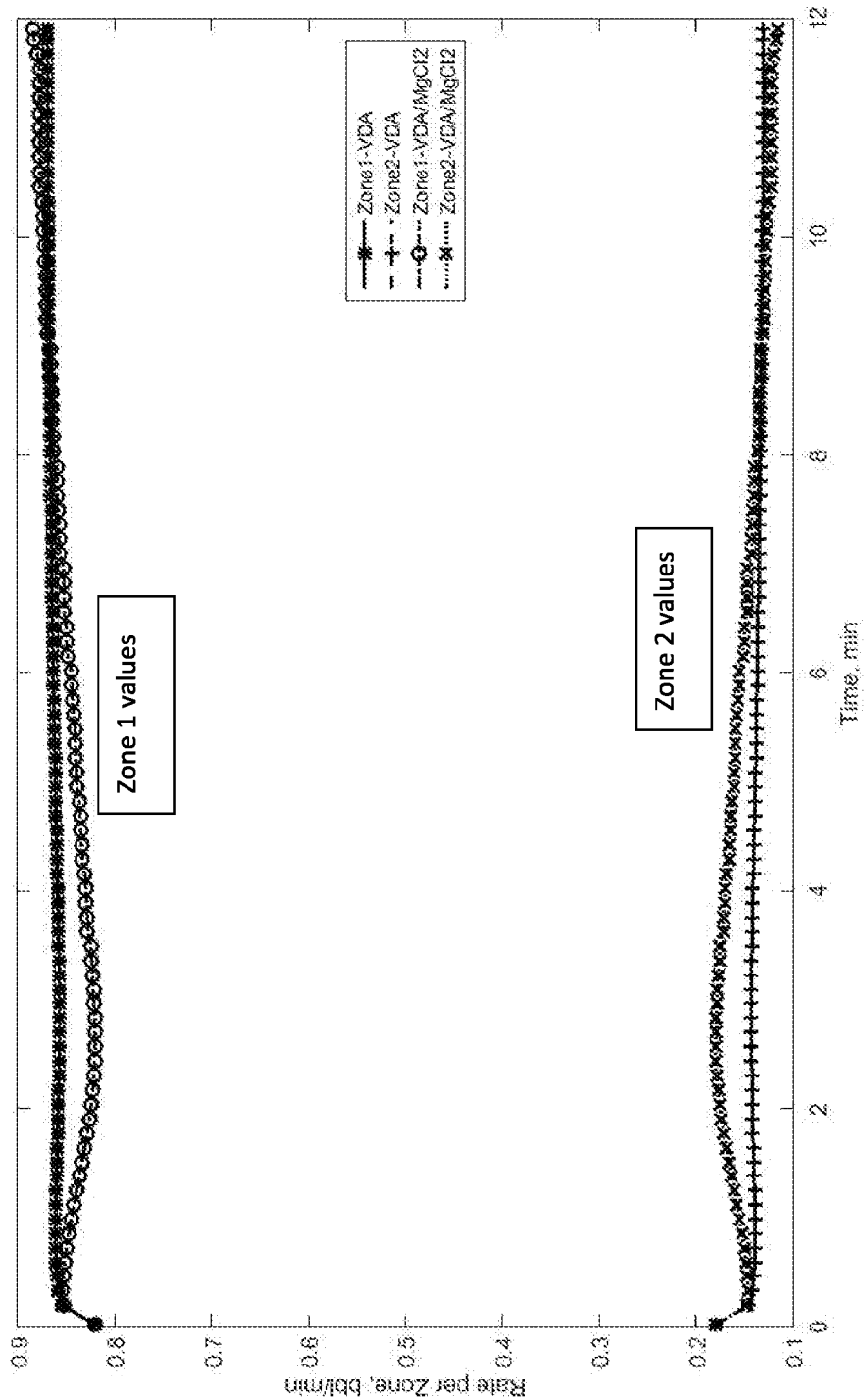
FIG. 22 shows a computer simulated graph of rate per zone versus time (at 100 md (millidarcy)/10 md permeability contrast) with 1 bbl/min total injection rate of a VDA containing viscoelastic surfactant and HCl with and without $MgCl_2$.
Figure 23:
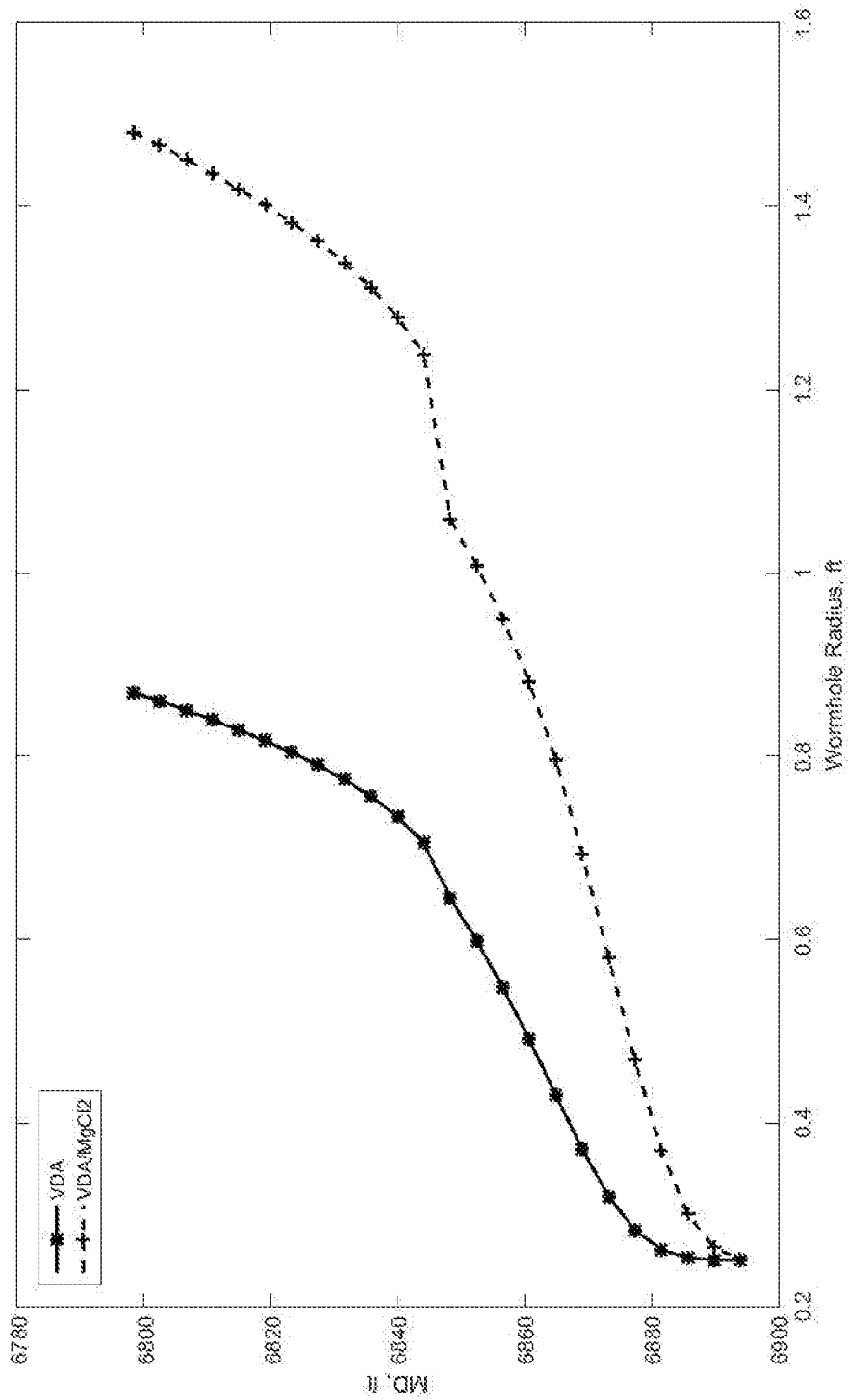
FIG. 23 shows a computer simulated graph of MD (length of the wellbore) versus wormhole radius (at 100 md/10 md permeability contrast) with 5 bbl/min total injection rate of a VDA containing viscoelastic surfactant and HCl with and without $MgCl_2$.
Figure 24:
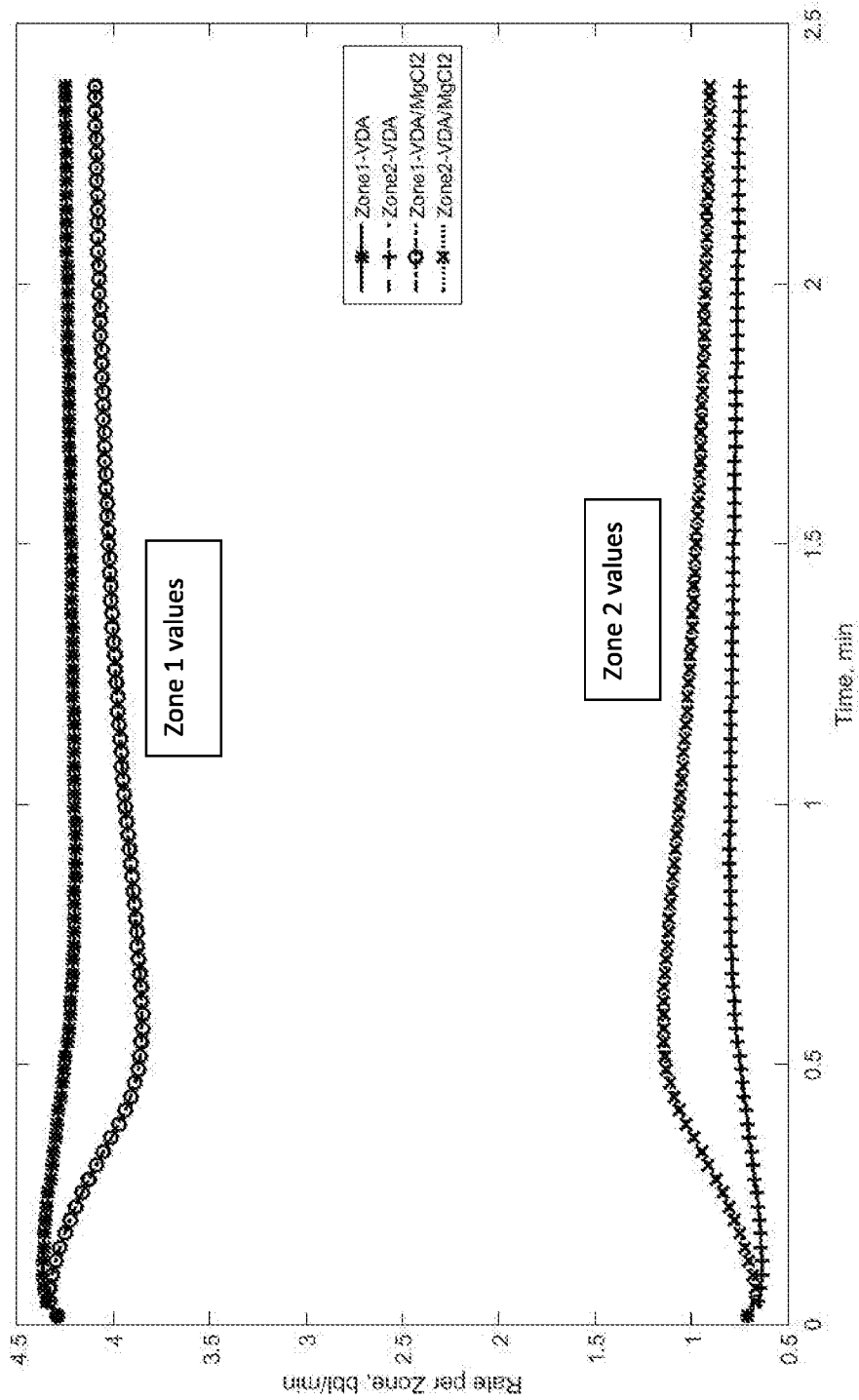
FIG. 24 shows a computer simulated graph of rate per zone versus time (at 100 md (millidarcy)/10 md permeability contrast) with 5 bbl/min total injection rate of a VDA containing viscoelastic surfactant and HCl with and without $MgCl_2$.
Figure 25:
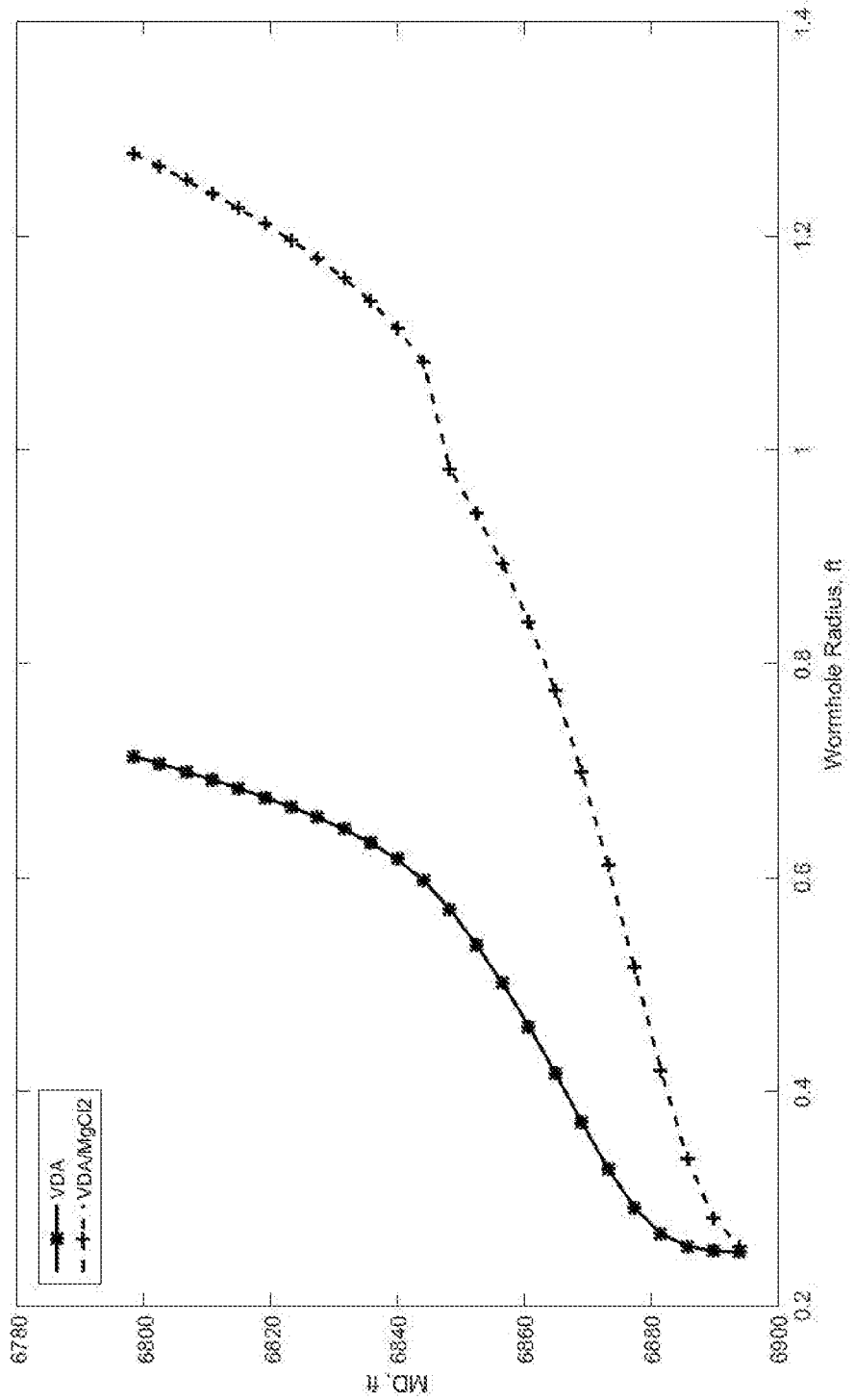
FIG. 25 shows a computer simulated graph of MD (length of the wellbore) versus wormhole radius (at 100 md/10 md permeability contrast) with 10 bbl/min total injection rate of a VDA containing viscoelastic surfactant and HCl with and without $MgCl_2$.
Figure 26:
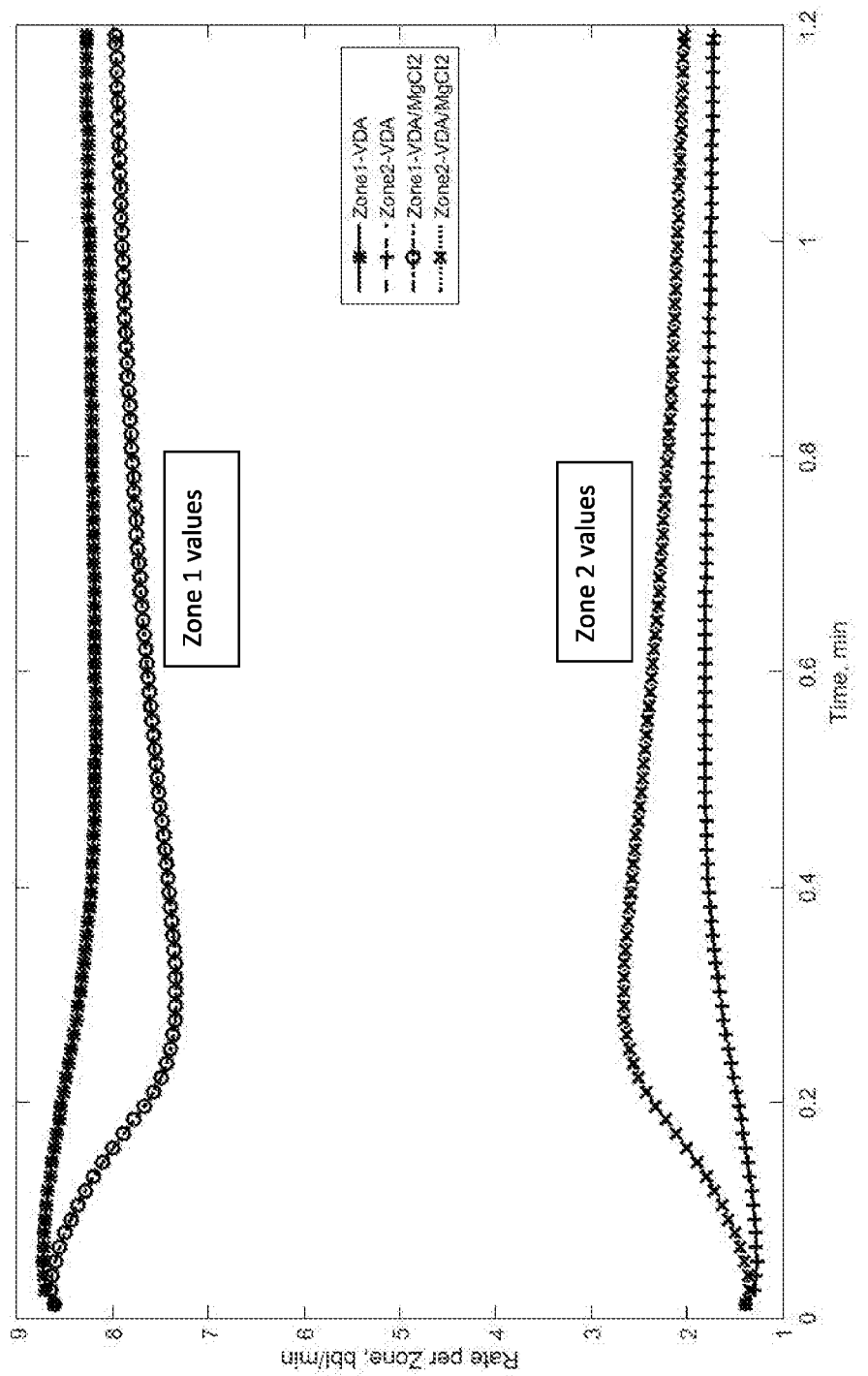
FIG. 26 shows a computer simulated graph of rate per zone versus time (at 100 md (millidarcy)/10 md permeability contrast) with 10 bbl/min total injection rate of a VDA containing viscoelastic surfactant and HCl with and without $MgCl_2$.
Figure 27:
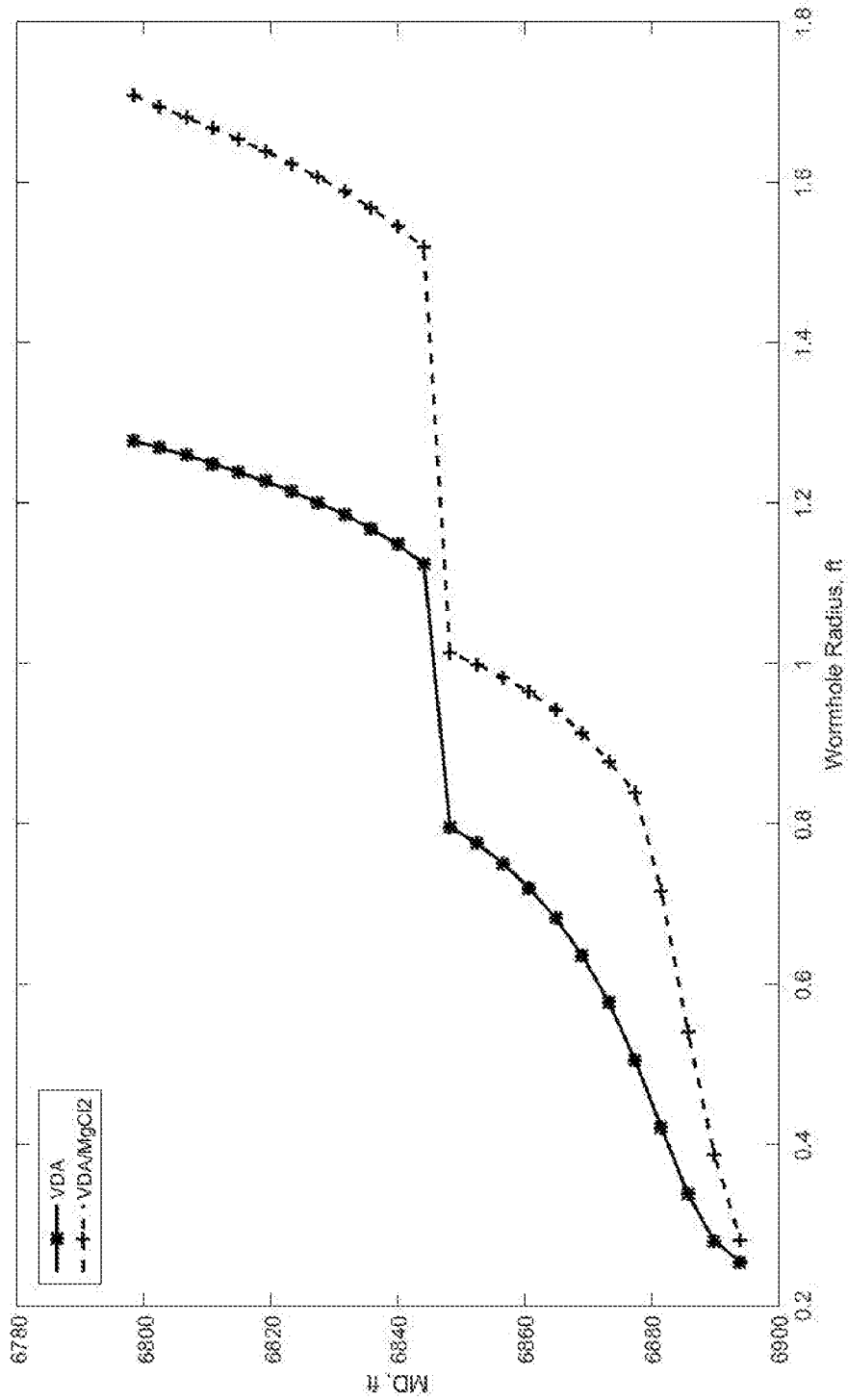
FIG. 27 shows a computer simulated graph of MD (length of the wellbore) versus wormhole radius (at 100 md/20 md permeability contrast) with 0.5 bbl/min total injection rate of a VDA containing viscoelastic surfactant and HCl with and without $MgCl_2$.
Figure 28:
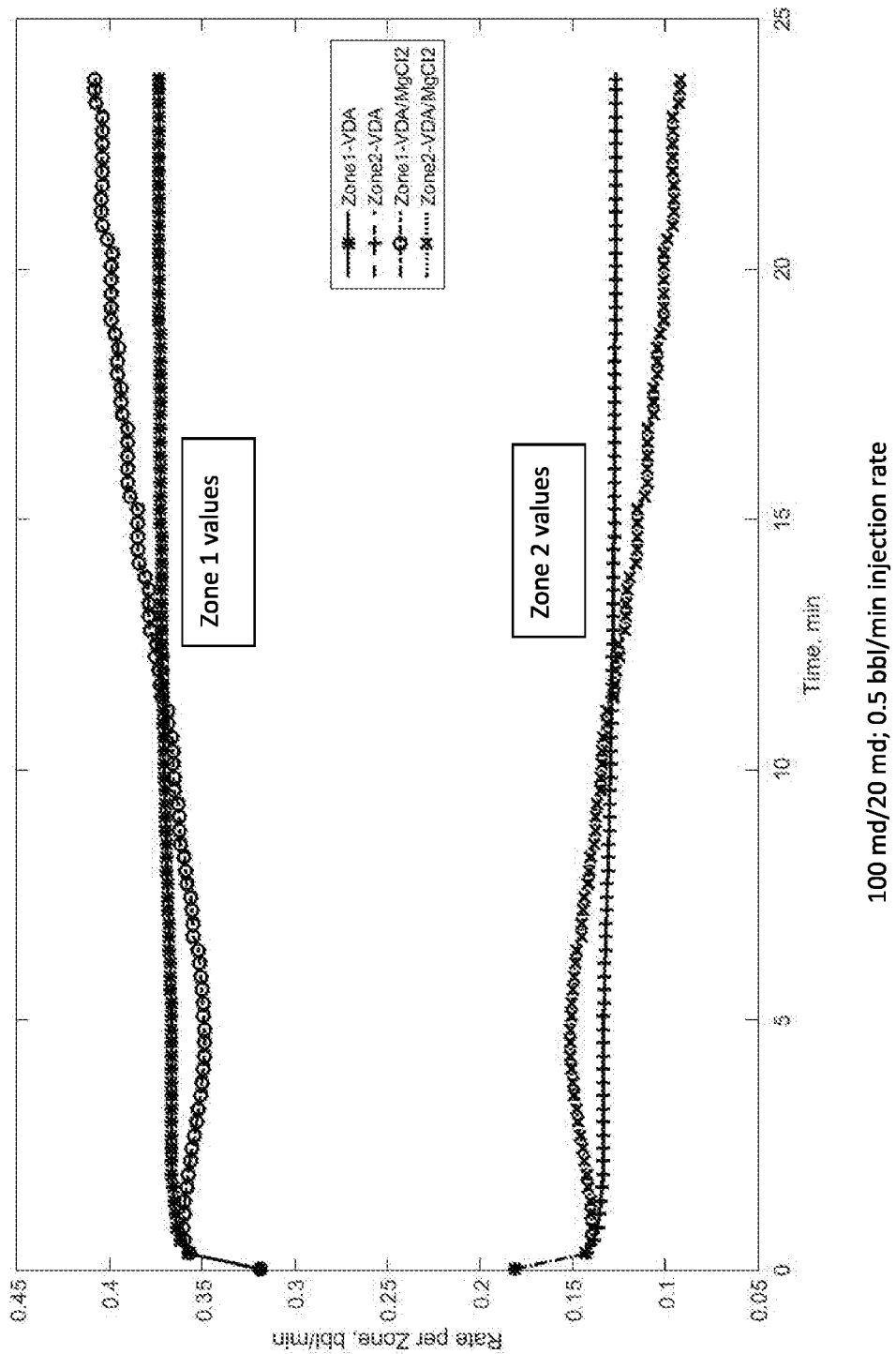
FIG. 28 shows a computer simulated graph of rate per zone versus time (at 100 md (millidarcy)/20 md permeability contrast) with 0.5 bbl/min total injection rate of a VDA containing viscoelastic surfactant and HCl with and without $MgCl_2$.
Figure 29:
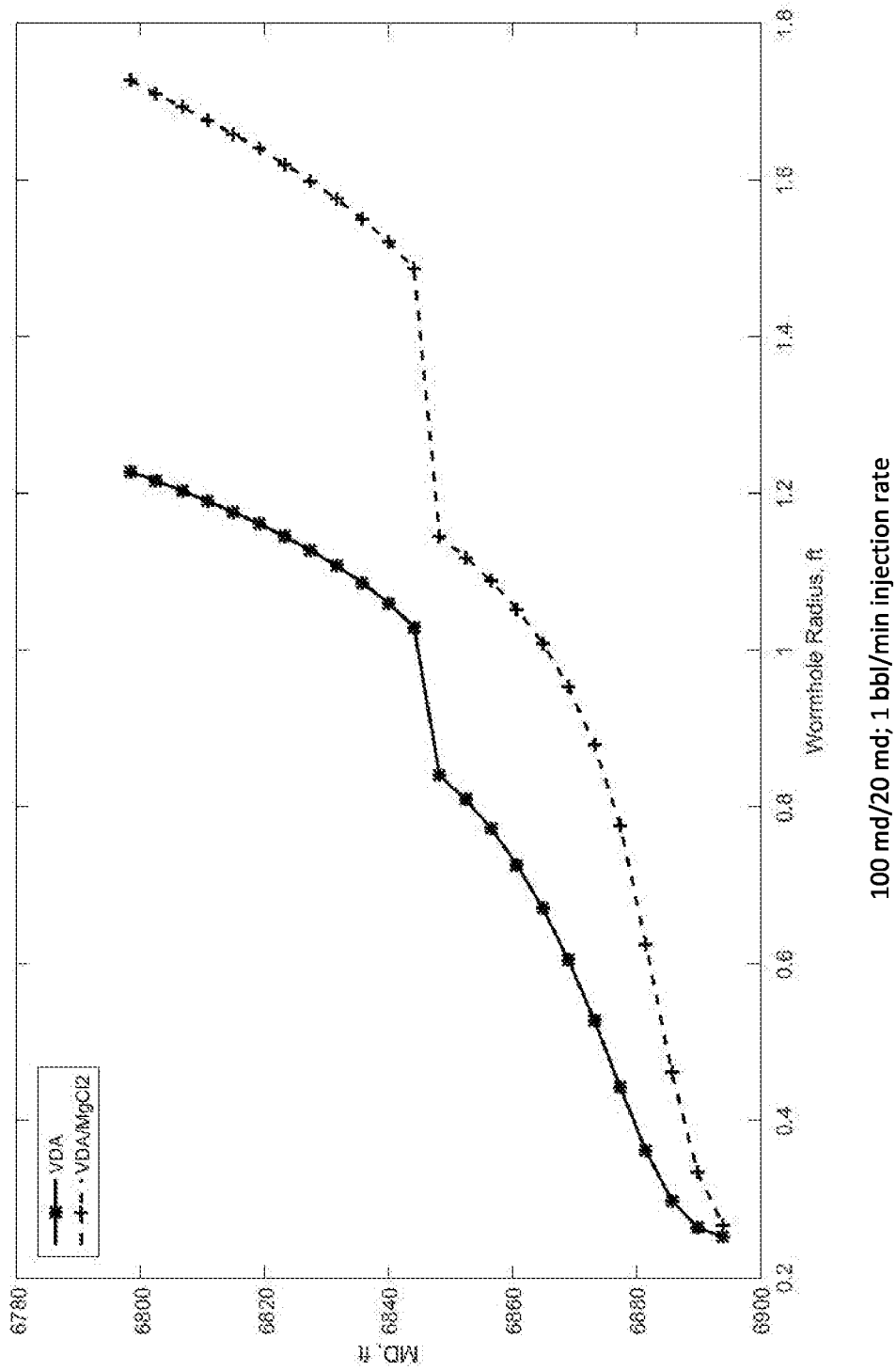
FIG. 29 shows a computer simulated graph of MD (length of the wellbore) versus wormhole radius (at 100 md/20 md permeability contrast) with 1 bbl/min total injection rate of a VDA containing viscoelastic surfactant and HCl with and without $MgCl_2$.
Figure 30:
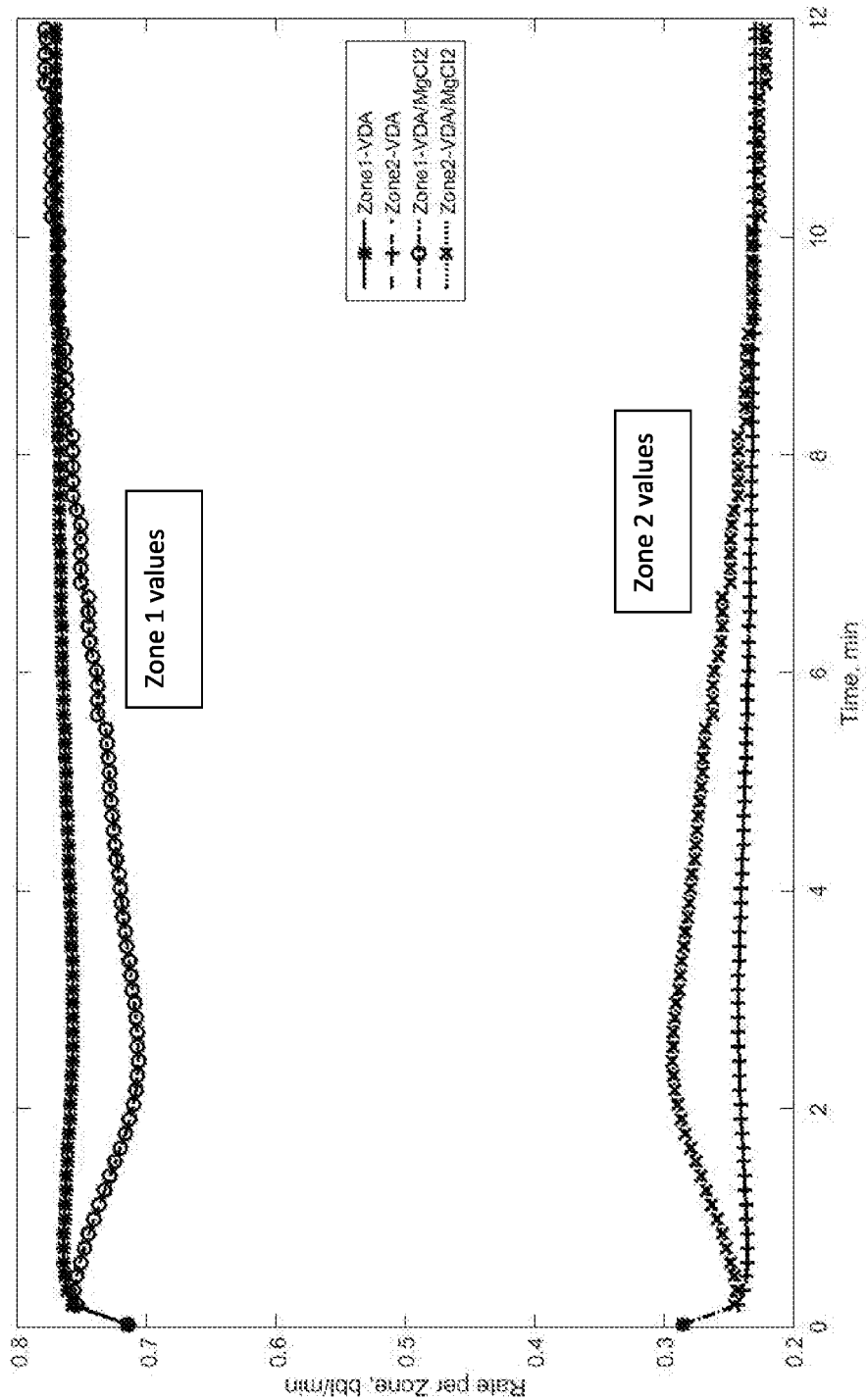
FIG. 30 shows a computer simulated graph of rate per zone versus time (at 100 md (millidarcy)/20 md permeability contrast) with 1 bbl/min total injection rate of a VDA containing viscoelastic surfactant and HCl with and without $MgCl_2$.
Figure 31:
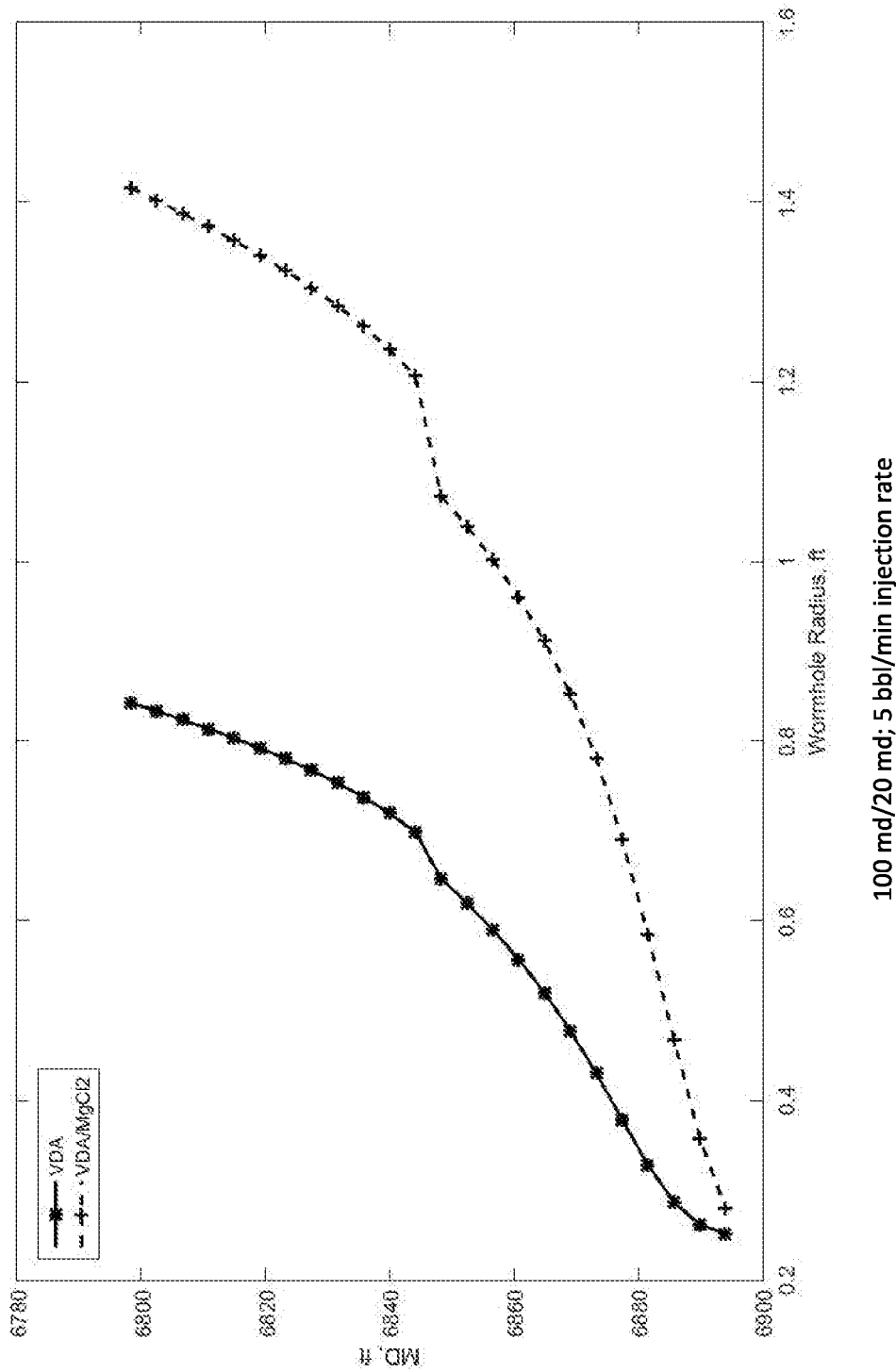
FIG. 31 shows a computer simulated graph of MD (length of the wellbore) versus wormhole radius (at 100 md/20 md permeability contrast) with 5 bbl/min total injection rate of a VDA containing viscoelastic surfactant and HCl with and without $MgCl_2$.
Figure 32:
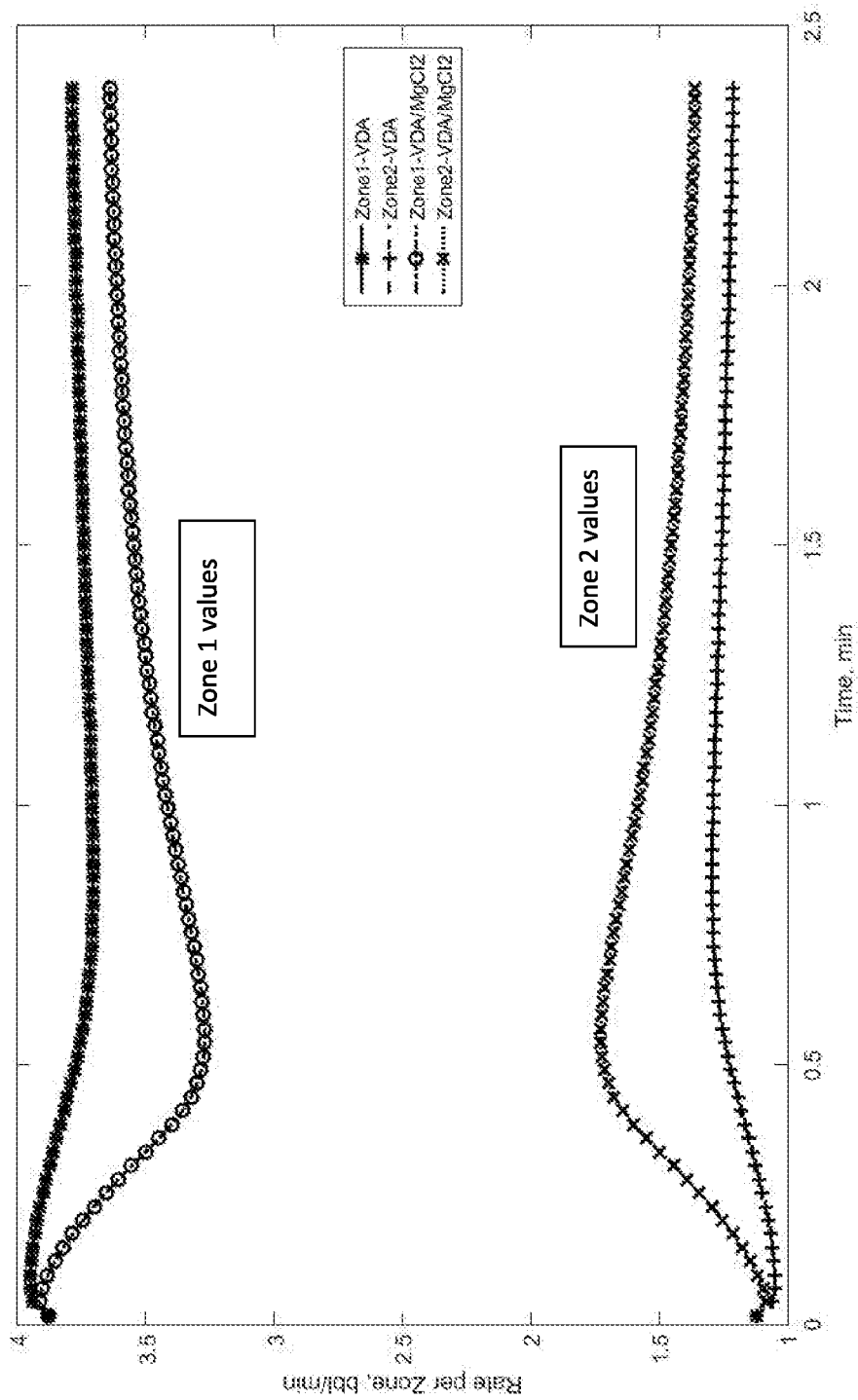
FIG. 32 shows a computer simulated graph of rate per zone versus time (at 100 md (millidarcy)/20 md permeability contrast) with 5 bbl/min total injection rate of a VDA containing viscoelastic surfactant and HCl with and without $MgCl_2$.
Figure 33:
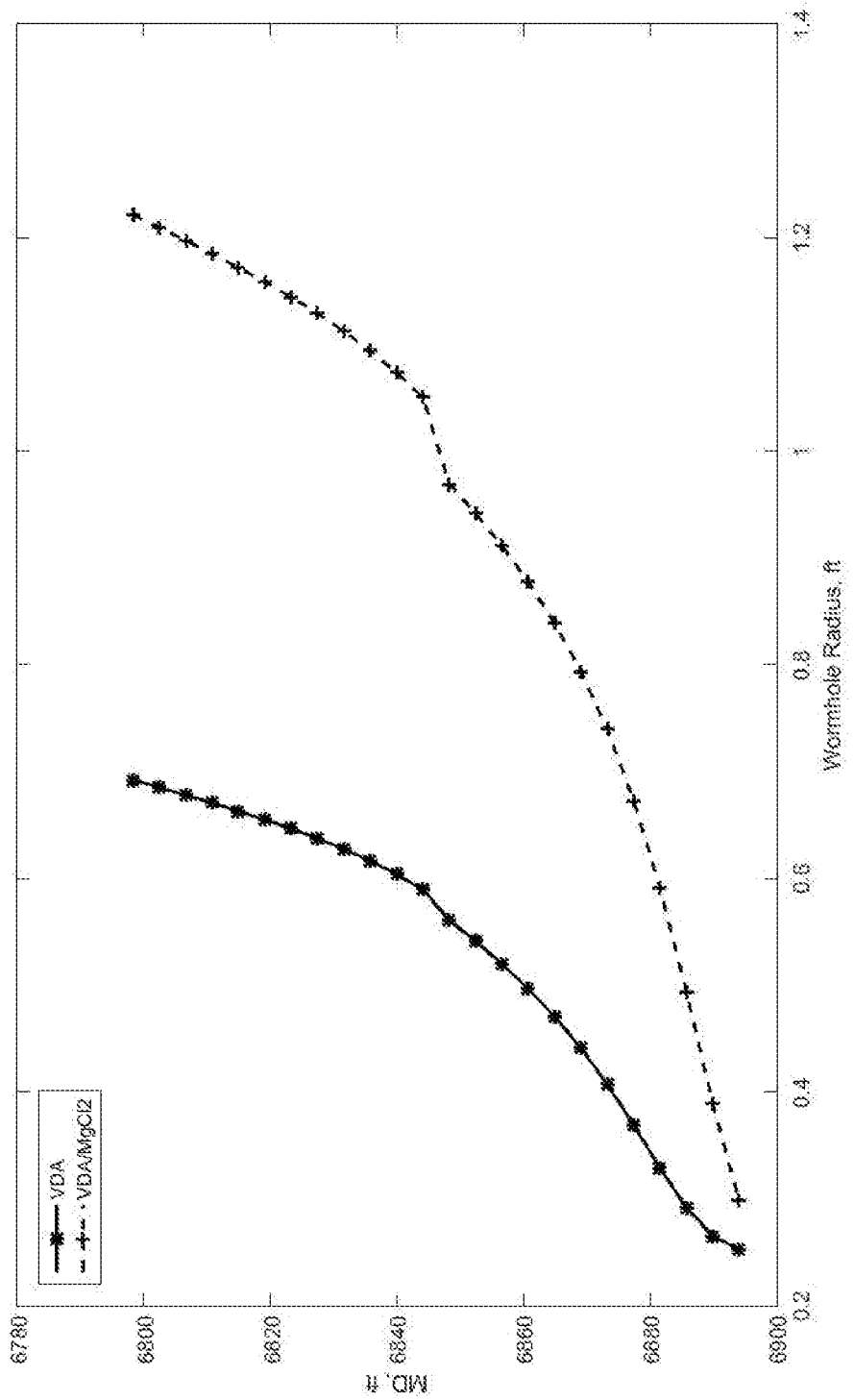
FIG. 33 shows a computer simulated graph of MD (length of the wellbore) versus wormhole radius (at 100 md/20 md permeability contrast) with 10 bbl/min total injection rate of a VDA containing viscoelastic surfactant and HCl with and without $MgCl_2$.
Figure 34:
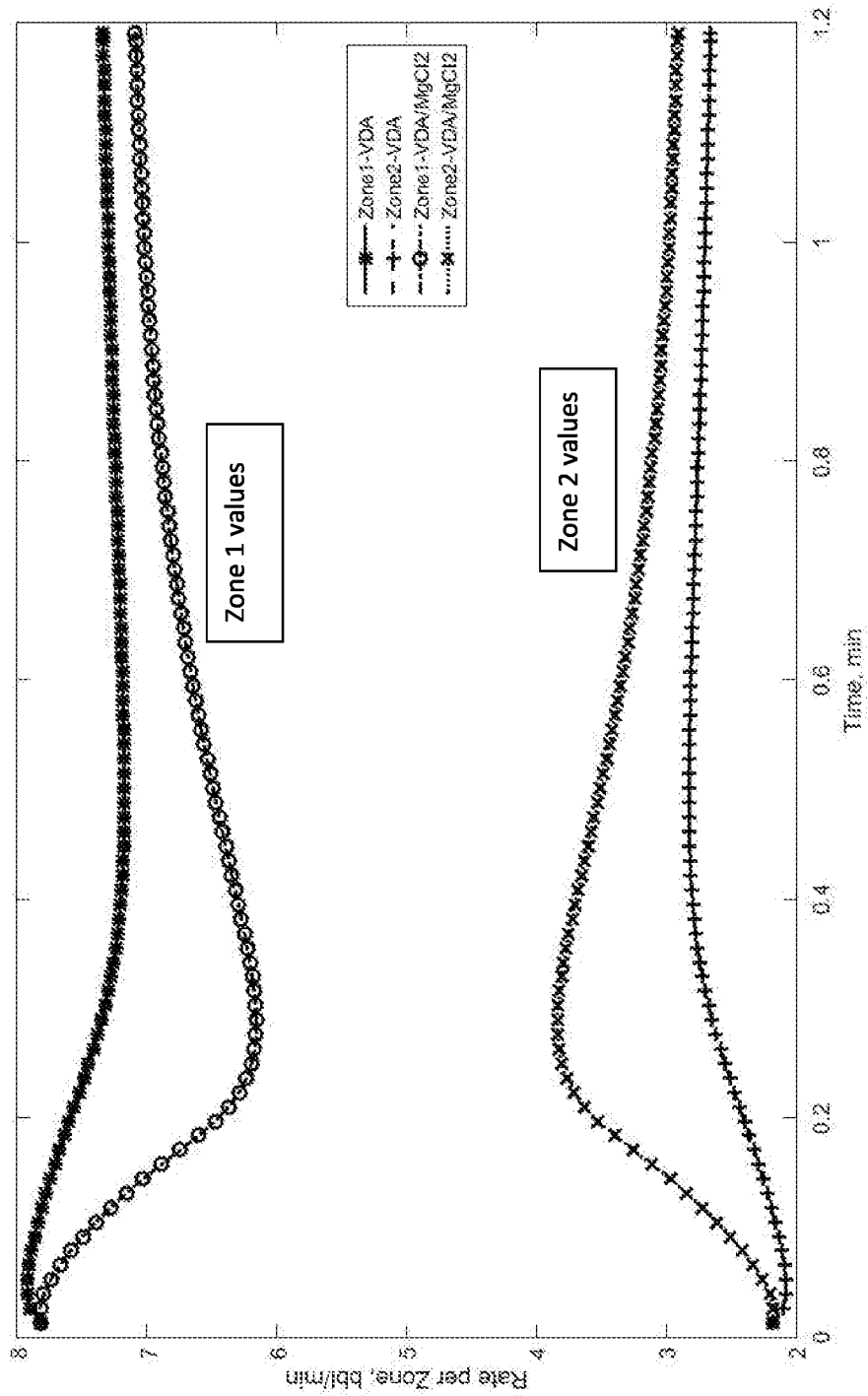
FIG. 34 shows a computer simulated graph of rate per zone versus time (at 100 md (millidarcy)/20 md permeability contrast) with 10 bbl/min total injection rate of a VDA containing viscoelastic surfactant and HCl with and without $MgCl_2$.
Figure 35:
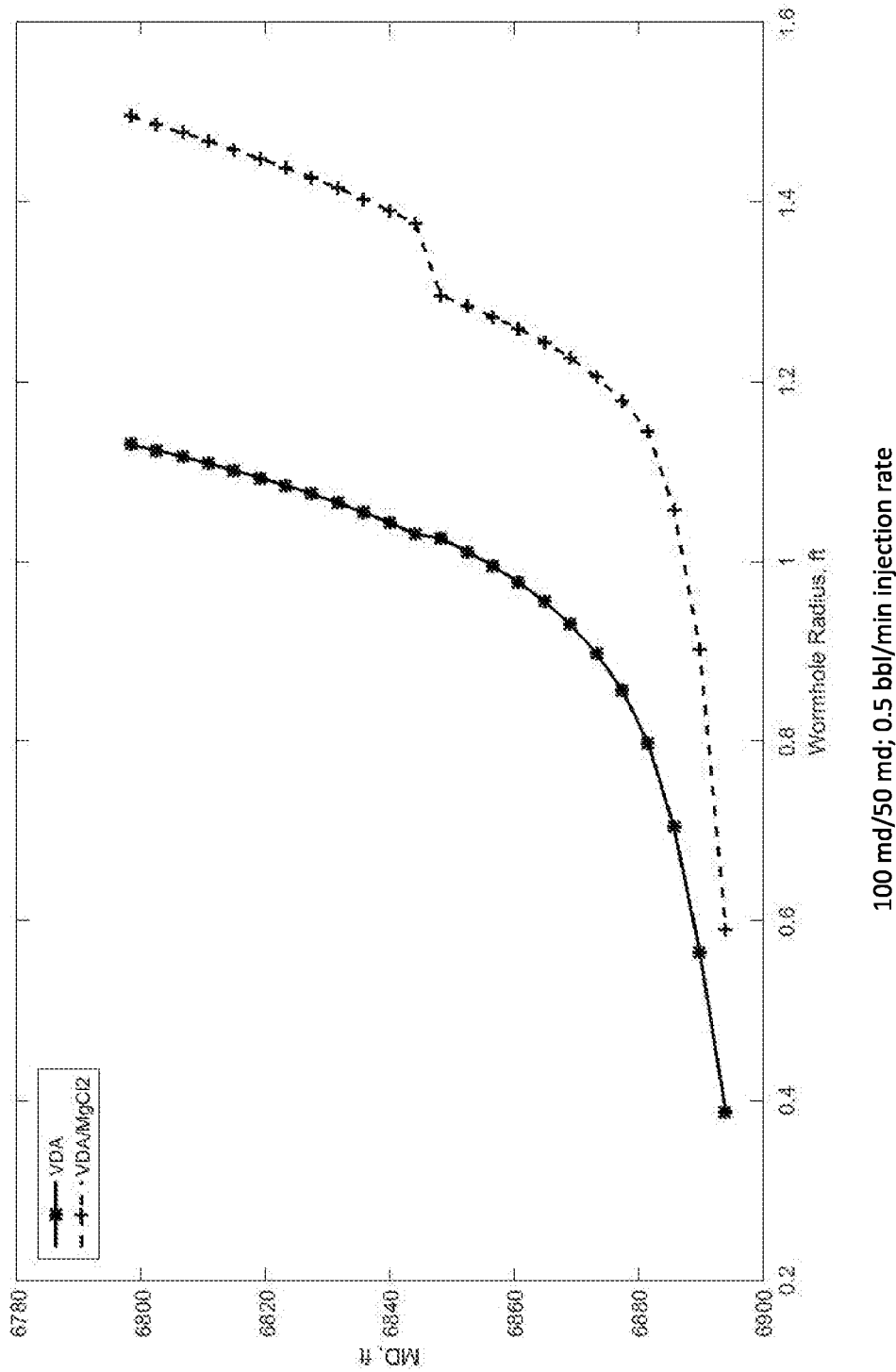
FIG. 35 shows a computer simulated graph of MD (length of the wellbore) versus wormhole radius (at 100 md/50 md permeability contrast) with 0.5 bbl/min total injection rate of a VDA containing viscoelastic surfactant and HCl with and without $MgCl_2$.
Figure 36:
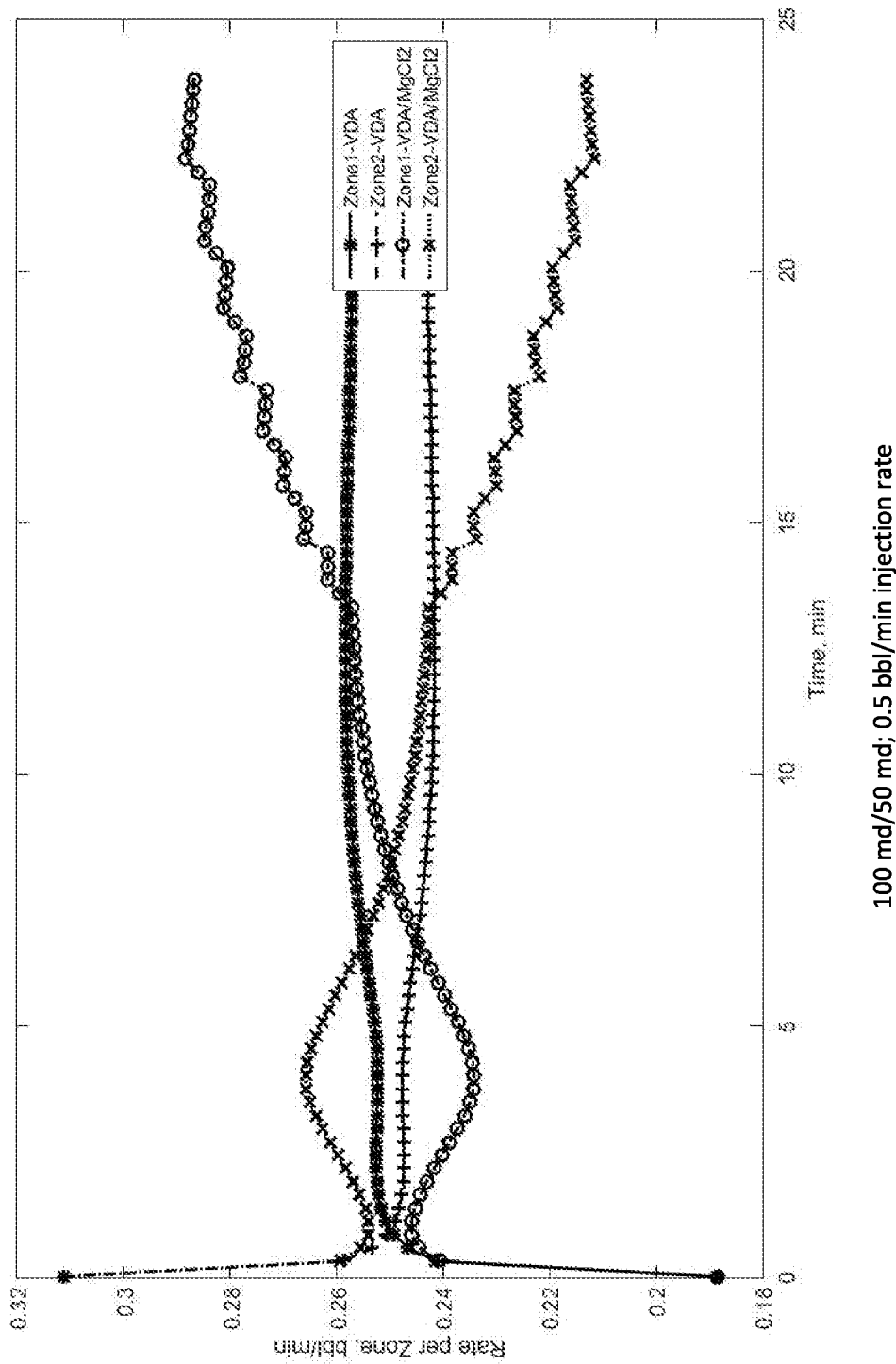
FIG. 36 shows a computer simulated graph of rate per zone versus time (at 100 md (millidarcy)/50 md permeability contrast) with 0.5 bbl/min total injection rate of a VDA containing viscoelastic surfactant and HCl with and without $MgCl_2$.
Figure 37:
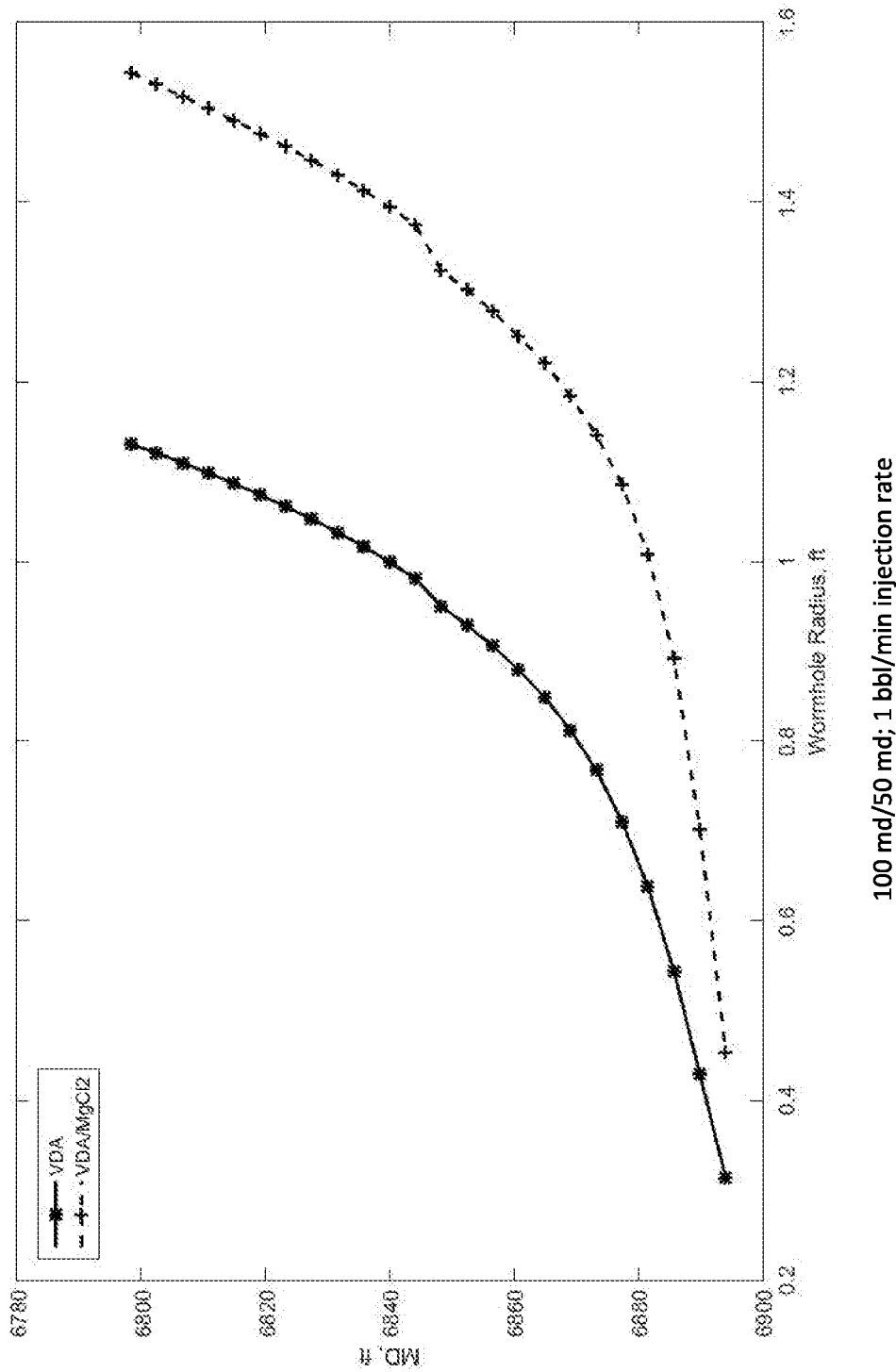
FIG. 37 shows a computer simulated graph of MD (length of the wellbore) versus wormhole radius (at 100 md/50 md permeability contrast) with 1 bbl/min total injection rate of a VDA containing viscoelastic surfactant and HCl with and without $MgCl_2$.
Figure 38:
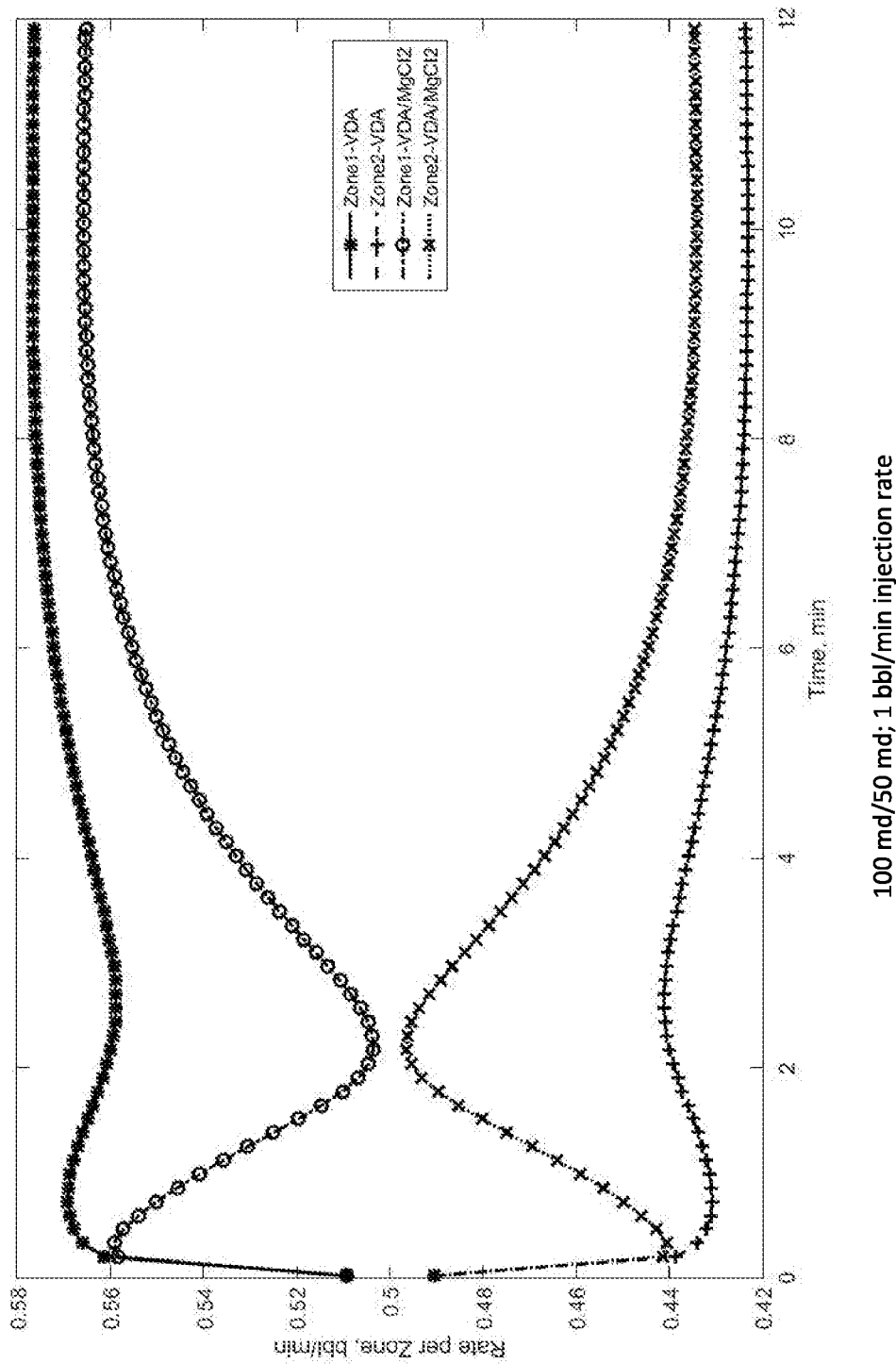
FIG. 38 shows a computer simulated graph of rate per zone versus time (at 100 md (millidarcy)/50 md permeability contrast) with 1 bbl/min total injection rate of a VDA containing viscoelastic surfactant and HCl with and without $MgCl_2$.
Figure 39:
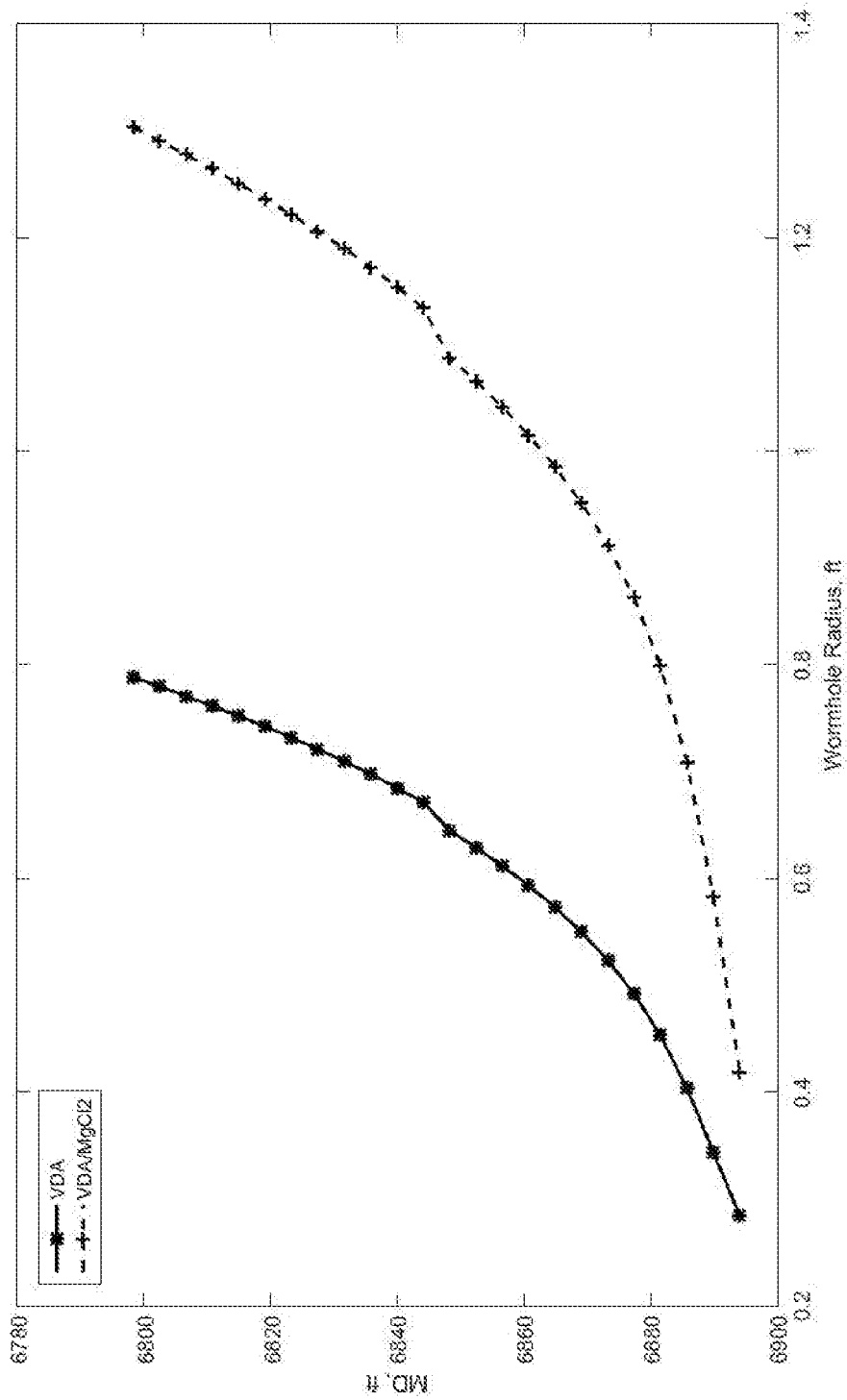
FIG. 39 shows a computer simulated graph of MD (length of the wellbore) versus wormhole radius (at 100 md/50 md permeability contrast) with 5 bbl/min total injection rate of a VDA containing viscoelastic surfactant and HCl with and without $MgCl_2$.
Figure 40:
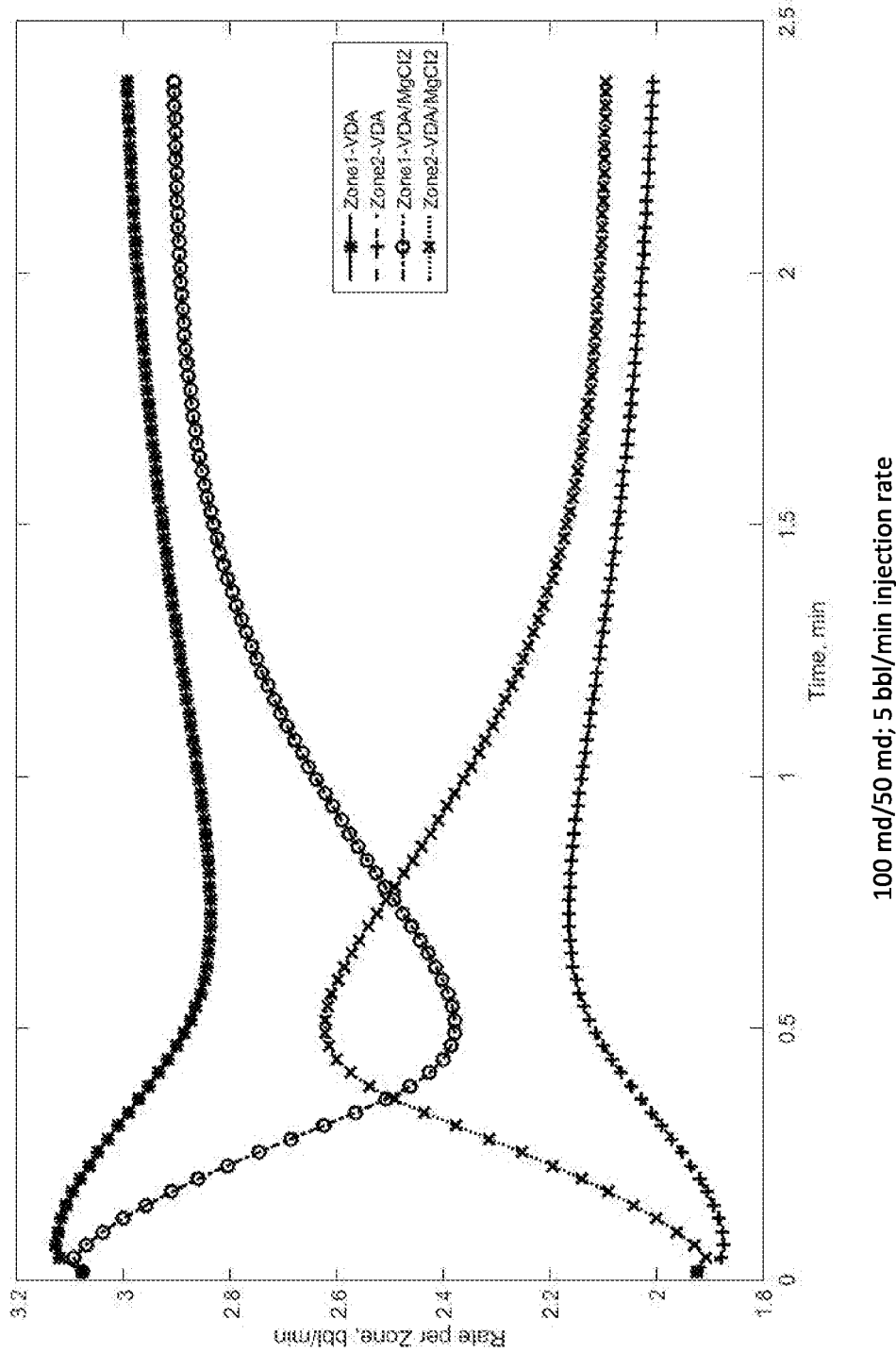
FIG. 40 shows a computer simulated graph of rate per zone versus time (at 100 md (millidarcy)/50 md permeability contrast) with 5 bbl/min total injection rate of a VDA containing viscoelastic surfactant and HCl with and without $MgCl_2$.
Figure 41:
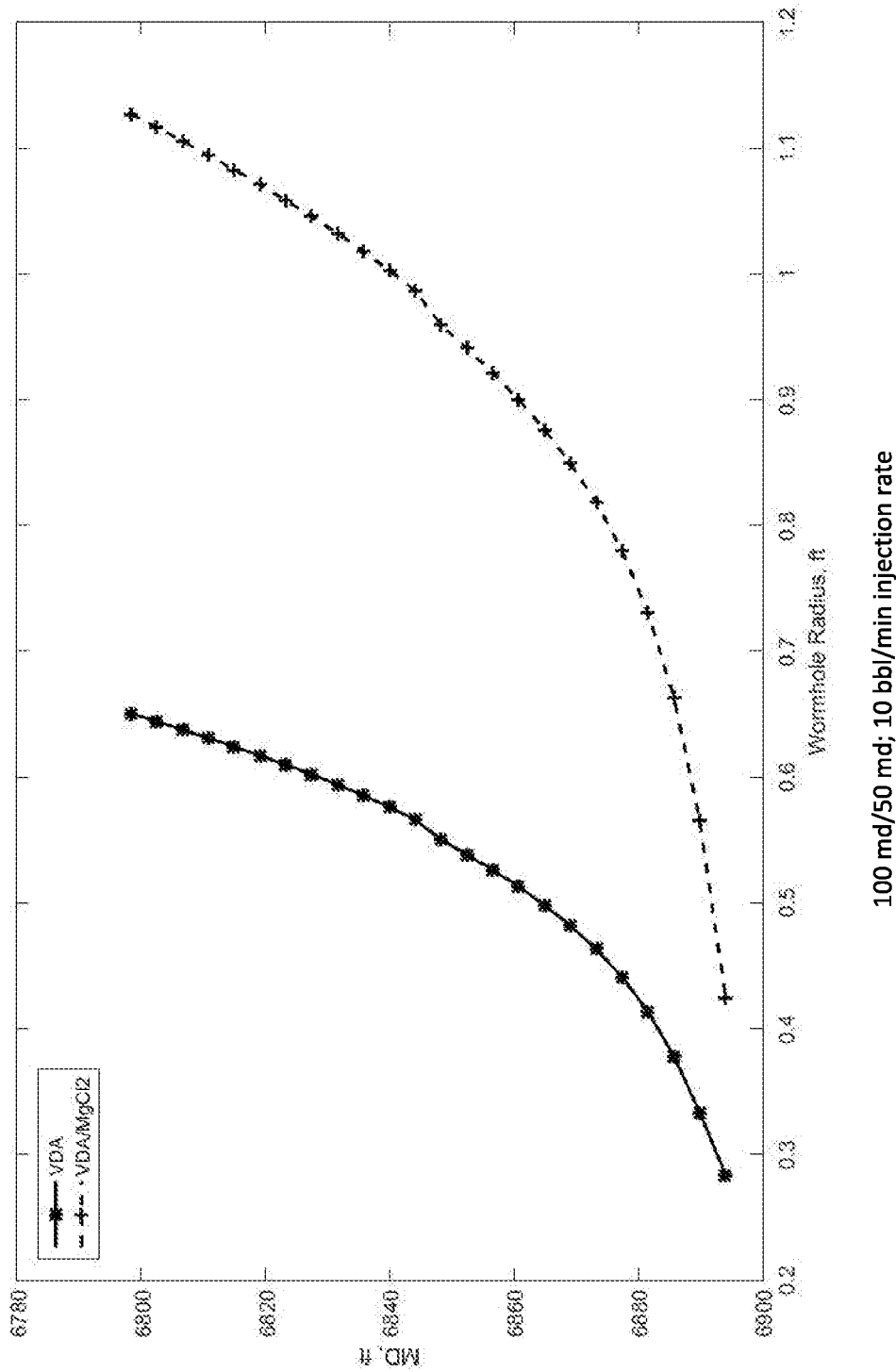
FIG. 41 shows a computer simulated graph of MD (length of the wellbore) versus wormhole radius (at 100 md/50 md permeability contrast) with 10 bbl/min total injection rate of a VDA containing viscoelastic surfactant and HCl with and without $MgCl_2$.
Figure 42:
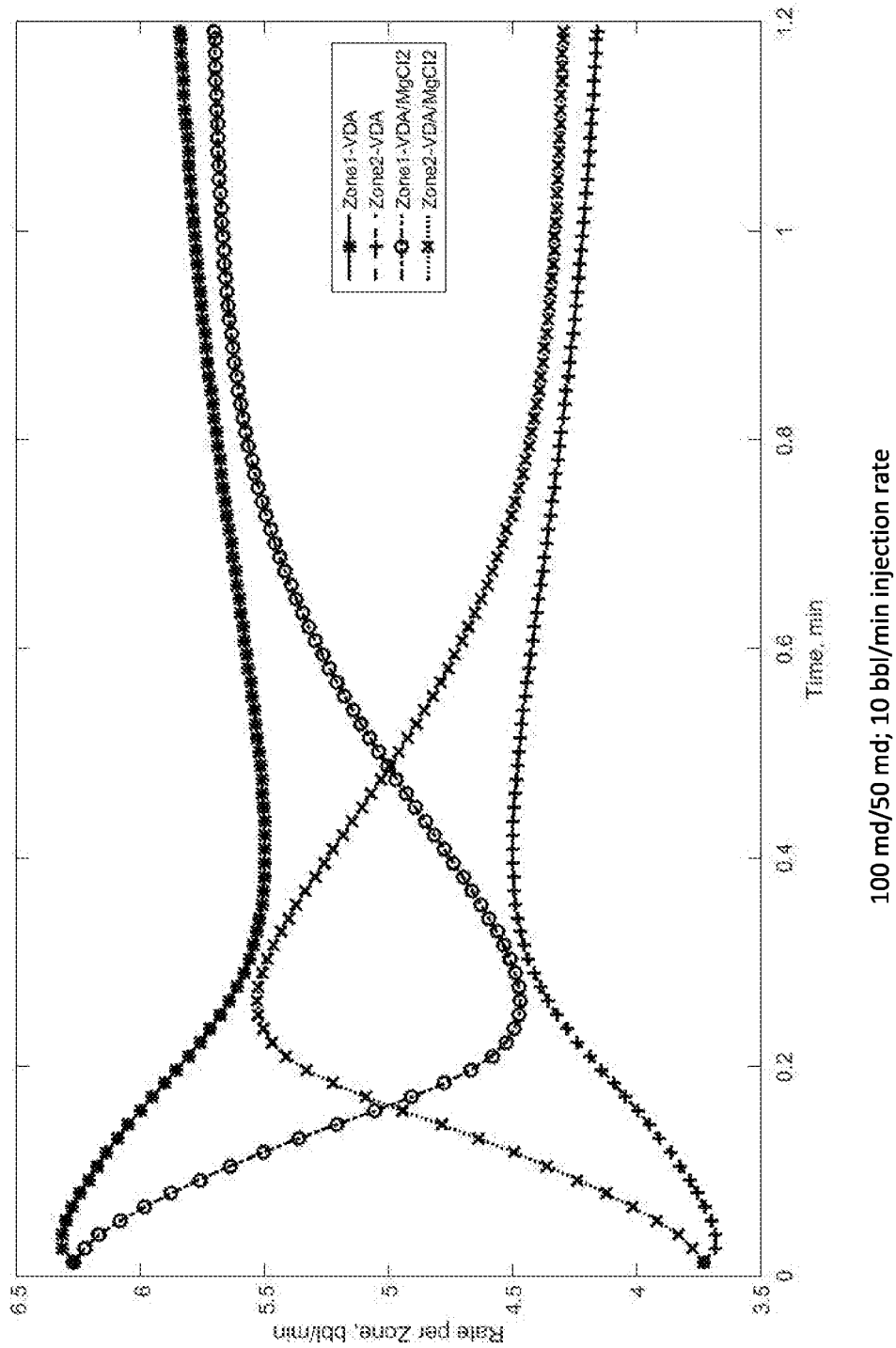
FIG. 42 shows a computer simulated graph of rate per zone versus time (at 100 md (millidarcy)/50 md permeability contrast) with 10 bbl/min total injection rate of a VDA containing viscoelastic surfactant and HCl with and without $MgCl_2$.

In FIG. 10 one can see the pressure build-up when original VDA and VDA modified with magnesium chloride (as described in Example 3) are pumped through the core. In fact, the addition of magnesium chloride to VDA generates slightly higher pressure to flow through the core at the same injection rate.

Example 6

By fitting the pressure build-up data and PVBT data with new updated correlations, we applied our in-house acidizing simulator for some simple examples to show the benefit of VDA with $MgCl_2$. The simulator used herein to provide the following simulation results is described in the following reference and patents which are each incorporated herein by reference in their entireties:

P. M. J Tardy, B. Lecerf, Y. Christanti "An Experimentally Validated Wormhole Model for Self-Diverting and Conventional Acids in Carbonate Rocks Under Radial Flow Conditions", paper SPE 107854, presented at the European Formation Damage Conference held in Scheveningen, The Netherlands, 30 May-1 Jun. 2007.

P. M. J Tardy METHOD FOR PREDICTING ACID PLACEMENT IN CARBONATE RESERVOIRS; U.S. Pat. No. 7,603,261, filed in the U. S. Patent Office on Nov. 29, 2006, granted Oct. 13, 2009.

P. M. J. Tardy, B. Lecerf FLOW OF SELF-DIVERTING ACIDS IN CARBONATE CONTAINING HYDROCARBON RESERVOIRS; U.S. Pat. No. 7,774,183 filed in the U. S. Patent Office on Jul. 11, 2006, granted on Aug. 10, 2010

This example has two layers with different permeability contrasts, varying from 100 md/1 md, 100 md/10 md, 100 md/20 md up to 100 md/50 md. For each of these permeability contrasts, different injection rates are applied, varying from 0.5 bbl/min, 1 bbl/min, 5 bbl/min up to 10 bbl/min. With the same volume of 500 gal VDA or $VDA/MgCl_2$ pumped into the formation, results of rate per zone and wormhole length are plotted to compare VDA/MgCl2 to original VDA. The data input for the example can be found in Table. 1. The data input to the model also included the composition of the fluids prepared for Examples 3 and 4, and the PVBT data from FIG. 8 and the pressure drop data from FIG. 10 for such fluids was also used in the model.

TABLE 1

| Input Data | | |
|---|---|---|
| | Zone 1 | Zone 2 |
| Thickness, ft. | 50 | 50 |
| Perm, md | 100 | 1-50 |
| Porosity | 15 | 15 |
| Zone Pressure, psi | 3206 | 3206 |

The simulation results are summarized from FIGS. 11 to 42.

From the simulation results, one can conclude that for all the cases run, $VDA/MgCl_2$ is showing a deeper wormhole penetration than original VDA due to the better retardation factor. In addition, when permeability contrast reduced to 10 or smaller, and rate increased to 1 bbl/min and above, diversion starts to affect the flow rate distribution between the two zones. Based on the simulation results, the VDA/MgCl$_2$ is showing a better diversion effect, due to the different pressure buildup behavior of these two fluids.

The foregoing description of the embodiments has been provided for purposes of illustration and description. Example embodiments are provided so that this disclosure will be sufficiently thorough, and will convey the scope to those who are skilled in the art. Numerous specific details are set forth such as examples of specific components, devices, and methods, to provide a thorough understanding of embodiments of the disclosure, but are not intended to be exhaustive or to limit the disclosure. It will be appreciated that it is within the scope of the disclosure that individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Also, in some example embodiments, well-known processes, well-known device structures, and well-known technologies are not described in detail. Further, it will be readily apparent to those of skill in the art that in the design, manufacture, and operation of apparatus to achieve that described in the disclosure, variations in apparatus design, construction, condition, erosion of components, gaps between components may present, for example.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A method, comprising:
a) mixing, at a wellsite, acid from an acid source with water from a water source and a water-soluble acid retarding agent (RA) from a RA source, that is present at a concentration sufficient to achieve a retarding factor higher than 3, thereby forming a retarded acidizing fluid; and
b) introducing the retarded acidizing fluid to a subterranean formation through a wellbore in fluid communication with the subterranean formation,
wherein the RA is a salt comprising:
i) a cation selected from the group consisting of lithium, rubidium, cesium, beryllium, magnesium, calcium, strontium, barium, scandium, yttrium, titanium, zirconium, hafnium, vanadium, niobium, tantalum, chromium, molybdenum, tungsten, manganese, technetium, rhenium, iron, ruthenium, osmium, cobalt, rhodium, iridium, nickel, palladium, platinum, copper, silver, gold, zinc, cadmium, mercury, boron, aluminum, gallium, indium, thallium, tin, ammonium, alkylammonium, dialkylammonium, trialkylammonium and tetraalkylammonium, and combinations thereof; and
ii) an anion selected from the group consisting of fluoride, chloride, bromide, iodide, sulfate, bisulfate, sulfite, bisulfate nitrate, alkanesulfonates, arylsulfonates, acetate, formate, and combinations thereof;
wherein a first acidizing fluid is formed by mixing the acid from the acid source with the water from the water source; and introducing the first acidizing fluid to the subterranean formation through the wellbore prior to introducing the retarded acidizing fluid in step b);
wherein pumps and associated valves are connected in fluid flow communication between a treatment fluid line and each of the i) the acid source, ii) the water source, iii) the RA source, and iv) a VES source;
wherein any one or more of the first acidizing fluid, the retarded acidizing fluid and a diversion fluid is analyzed prior to introduction to the wellbore for fluid composition and properties, the fluid composition is compared to a fluid composition set point, and the composition of the one or more of the first acidizing fluid, the retarded acidizing fluid and the diversion fluid is adjusted by adjusting flow rates of one or more of the acid, the water, the RA, and the VES through the pumps and associated valves based on the comparison.

2. The method of claim 1, wherein, prior to the introduction of the retarded acidizing fluid in step b):
c) forming the diversion fluid by mixing, at the wellsite, the viscoelastic surfactant (VES) from the VES source with the water from a water source, acid from the acid source and the RA from the RA source; and
d) introducing the diversion fluid to the subterranean formation through the wellbore.

3. The method of claim 1, wherein the acid is selected from the group consisting of hydrochloric acid (HCl), nitric acid, phosphoric acid, sulfuric acid, hydrofluoric acid, hydrobromic acid, perchloric acid, hydrogen iodide, alkanesulfonic acids, arylsulfonic acids, acetic acid, formic acid, alkyl carboxylic acids, acrylic acid, lactic acid, glycolic acid, malonic acid, fumaric acid, citric acid, tartaric acid, or their derivatives, and mixtures thereof.

4. The method of claim 1, wherein a solid diverter from a solid diverter source are also mixed with the acid, the water and the RA in step a) to form the retarded acidizing fluid, wherein the solid diverter is selected from the group consisting of fiber, particulates, and combinations thereof.

5. The method of claim 4, wherein the particulates comprise polylactic acid.

6. The method of claim 1, wherein the VES source is a viscoelastic surfactant (VES), and the viscoelastic surfactant is also mixed with the acid, the water and the RA in step a) to form the retarded acidizing fluid.

7. The method of claim 6, wherein the VES has a structure in accordance with Formula III:

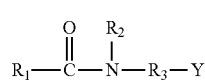

Formula III in which R$_1$ is a hydrocarbyl group that may be branched or straight chained, aromatic, aliphatic or olefinic and contains from about 17 to about 26 carbon atoms and may include an amine; $R_2$ is hydrogen or an alkyl group having from 1 to about 4 carbon atoms; $R_3$ is a hydrocarbyl group having from 1 to about 5 carbon atoms; and Y is an electron withdrawing group.

8. The method of claim 7, wherein the VES is erucic amidopropyl dimethyl betaine.

9. The method of claim 1, wherein, following the introduction of the retarded acidizing fluid in step b):
   c) forming the diversion fluid by mixing, at the wellsite, the viscoelastic surfactant (VES) from the VES source with the water from a water source, the acid from the acid source and the RA from the RA source; and
   d) introducing the diversion fluid to the subterranean formation through the wellbore.

10. The method of claim 9, further comprising:
   e) repeating steps a) and b) following step d).

11. The method of claim 10, wherein steps a)-e) are repeated at least once.

12. The method of claim 11, wherein the acidizing fluid is formed by mixing the acid from the acid source with the water from the water source; and introducing the acidizing fluid to the subterranean formation through the wellbore prior to the first introducing of the retarded acidizing fluid in step b).

13. The method of claim 9, wherein the acid, the water and the RA are each separately introduced into the treatment fluid line within which the retarded acidizing fluid is formed and the treatment fluid line is connected in fluid flow communication with the wellbore.

14. The method of claim 13, wherein the VES, the water and the RA are each separately introduced into the treatment fluid line within which the diversion fluid is formed.

15. A system, comprising:
   a subterranean formation having a wellbore in fluid communication with the subterranean formation;
   a treatment fluid line connected in fluid flow communication with the wellbore;
   an acid source connected in fluid flow communication with the treatment fluid line;
   a water source connected in fluid flow communication with the treatment fluid line; and
   a water-soluble acid retarding agent source (RA source) connected in fluid flow communication with the treatment fluid line mixed with water from the water source and acid from the acid source, wherein the RA source is present at a concentration sufficient to form a retarded acidizing fluid with a retarding factor higher than 3,
wherein the RA source is a salt comprising:
   i) a cation selected from the group consisting of lithium, rubidium, cesium, beryllium, magnesium, calcium, strontium, barium, scandium, yttrium, titanium, zirconium, hafnium, vanadium, niobium, tantalum, chromium, molybdenum, tungsten, manganese, technetium, rhenium, iron, ruthenium, osmium, cobalt, rhodium, iridium, nickel, palladium, platinum, copper, silver, gold, zinc, cadmium, mercury, boron, aluminum, gallium, indium, thallium, tin, ammonium, alkylammonium, dialkylammonium, trialkylammonium and tetraalkylammonium, and combinations thereof; and
   ii) an anion selected from the group consisting of fluoride, chloride, bromide, iodide, sulfate, bisulfate, sulfite, bisulfate nitrate, alkanesulfonates, arylsulfonates, acetate, formate, and combinations thereof;
further comprising a solid particle source connected in fluid flow communication with the treatment fluid line;
further comprising a viscoelastic surfactant source (VES source) connected in fluid flow communication with the treatment fluid line;
wherein pumps and associated valves are connected in fluid flow communication between the treatment fluid line and each of the i) the acid source, ii) the water source,
iii) the RA source, and iv) the VES source; and
further comprising an analyzer connected in fluid flow communication with the treatment fluid line, and a controller operably connected to the analyzer for receiving a control signal and operably connected to the pumps and associated valves for controlling the flow of one or more of the acid, the water, the RA source, and the VES source.

16. The system of claim 15, further comprising a solid particle source connected in fluid flow communication with the treatment fluid line.

* * * * *